US010351210B2

(12) United States Patent
Miyazaki et al.

(10) Patent No.: US 10,351,210 B2
(45) Date of Patent: Jul. 16, 2019

(54) BICYCLE OPERATING DEVICE

(71) Applicant: SHIMANO INC., Sakai (JP)

(72) Inventors: Kentaro Miyazaki, Sakai (JP); Kazutaka Fukao, Sakai (JP)

(73) Assignee: SHIMANO INC., Sakai (JP)

( * ) Notice: Subject to any disclaimer, the term of this patent is extended or adjusted under 35 U.S.C. 154(b) by 156 days.

(21) Appl. No.: 15/170,883

(22) Filed: Jun. 1, 2016

(65) Prior Publication Data

US 2017/0349238 A1 Dec. 7, 2017

(51) Int. Cl.
*B62L 3/02* (2006.01)
*B62M 25/04* (2006.01)
*B62K 23/06* (2006.01)
*B62J 1/08* (2006.01)

(52) U.S. Cl.
CPC ............ *B62M 25/04* (2013.01); *B62K 23/06* (2013.01); *B62L 3/02* (2013.01); *B62J 2001/085* (2013.01)

(58) Field of Classification Search
CPC . B62M 25/04; B62K 23/06; B62L 3/02; B62J 2001/085
See application file for complete search history.

(56) References Cited

U.S. PATENT DOCUMENTS

| 2009/0308194 A1* | 12/2009 | Shahana | ............... B62K 23/06 74/502.2 |
| 2014/0174241 A1 | 6/2014 | Lim | |
| 2017/0101154 A1* | 4/2017 | Kosaka | ............... B62K 23/06 |

FOREIGN PATENT DOCUMENTS

CN          103879509          6/2014

* cited by examiner

*Primary Examiner* — Vicky A Johnson
(74) *Attorney, Agent, or Firm* — Mori & Ward, LLP

(57) ABSTRACT

A bicycle operating device comprises a base member, a first operating structure, a second operating structure, and a prevention member. The first operating structure comprises a first take-up member, a first operating member, and a first actuating member. The second operating structure comprises a second take-up member and a second operating member. The prevention member is configured to move together with the second operating member to prevent the first actuating member from actuating the first take-up member to move in at least one of a first pulling actuation direction and a first releasing actuation direction during a movement of the first operating member from a first rest position toward a first operated position.

24 Claims, 71 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, a first operating structure, a second operating structure, and a prevention member. The base member is configured to be mounted to a bicycle body. The first operating structure comprises a first take-up member, a first operating member, and a first actuating member. The first take-up member is movable relative to the base member to move a first mechanical control cable in a first pulling direction and a first releasing direction opposite to the first pulling direction. The first operating member is movable relative to the base member between a first rest position and a first operated position. The first actuating member is operatively coupled with the first take-up member to actuate the first take-up member to move in at least one of a first pulling actuation direction and a first releasing actuation direction. The second operating structure comprises a second take-up member and a second operating member. The second take-up member is movable relative to the base member to move a second mechanical control cable in a second pulling direction and a second releasing direction opposite to the second pulling direction. The second operating member is movable relative to the base member between a second rest position and a second operated position. The prevention member is configured to move together with the second operating member to prevent the first actuating member from actuating the first take-up member to move in at least one of the first pulling actuation direction and the first releasing actuation direction during a movement of the first operating member from the first rest position toward the first operated position.

With the bicycle operating device according to the first aspect, when the second operating member is moved relative to the base member, the prevention member is moved together with the second operating member relative to the base member. Thus, the prevention member prevents the first actuating member from actuating the first take-up member to move in the at least one of the first pulling actuation direction and the first releasing actuation direction during the movement of the first operating member from the first rest position toward the first operated position. Accordingly, it is possible to separately operate a first bicycle component and a second bicycle component via the first control cable and the second control cable even when the first operating member and the second operating member are simultaneously moved relative to the base member. This improves operability of the bicycle operating device.

In accordance with a second aspect of the present invention, the bicycle operating device according to the first aspect is configured so that the second operating member includes an operating abutment contactable with the first operating member.

With the bicycle operating device according to the second aspect, it is possible to move the first operating member in response to a movement of the second operating member in a state where the operating abutment is in contact with the first operating member. At this time, the prevention member and the first operating member move together with the second operating member. This prevents the first actuating member from actuating the first take-up member to move in the at least one of the first pulling actuation direction and the first releasing actuation direction during the movement of the first operating member from the first rest position toward the first operated position.

In accordance with a third aspect of the present invention, the bicycle operating device according to any one of the above aspects is configured so that the operating abutment has an abutment path defined from the second rest position to the second operated position. The first operating member is on the abutment path to come into contact with the operating abutment during a movement of the second operating member from the second rest position to the second operated position.

With the bicycle operating device according to the third aspect, it is possible to reduce a total space in which the first operating member and the second operating member move relative to the base member.

In accordance with a fourth aspect of the present invention, the bicycle operating device according to any one of the above aspects is configured so that the operating abutment contacts the first operating member in a state where the second operating member is at the second rest position.

With the bicycle operating device according to the fourth aspect, it is possible to reduce a total space in which the first operating member and the second operating member move relative to the base member.

In accordance with a fifth aspect of the present invention, the bicycle operating device according to any one of the above aspects is configured so that the operating abutment is disposed on an opposite side of the first operated position of the first operating member with respect to the first rest position of the first operating member in a state where the second operating member is at the second rest position.

With the bicycle operating device according to the fifth aspect, it is possible to move the prevention member together with the second operating member relative to the base member before the first operating member moves relative to the base member in response to the movement of the second operating member. Thus, it is possible to certainly prevent the first actuating member from actuating the first take-up member to move in the at least one of the first pulling actuation direction and the first releasing actuation direction during the movement of the first operating member from the first rest position toward the first operated position.

In accordance with a sixth aspect of the present invention, the bicycle operating device according to any one of the above aspects is configured so that the first take-up member is rotatably coupled to the base member about a rotational axis. The second take-up member is rotatably coupled to the base member about the rotational axis.

With the bicycle operating device according to the sixth aspect, it is possible to make the bicycle operating device compact since the first take-up member and the second take-up member are rotatable relative to the base member about the same rotational axis.

In accordance with a seventh aspect of the present invention, the bicycle operating device according to any one of the above aspects is configured so that the base member includes an internal space. The first operating structure and the second operating structure are at least partly disposed in the internal space.

With the bicycle operating device according to the seventh aspect, the base member protects the first operating structure and the second operating structure.

In accordance with an eighth aspect of the present invention, the bicycle operating device according to any one of the above aspects is configured so that the first actuating member is movable relative to the first operating member between a first actuation position at which the movement of the first operating member is transmitted to the first take-up member via the first actuating member, and a first non-actuation position at which the movement of the first operating member is not transmitted to the first take-up member via the first actuating member, the first non-actuation position being farther from the first take-up member than the first actuation position.

With the bicycle operating device according to the eighth aspect, it is possible to transmit the movement of the first operating member to the first take-up member via the first actuating member and to prevent the movement of the first operating member from being transmitted to the first take-up member via the first actuating member in accordance with a position of the first actuating member.

In accordance with a ninth aspect of the present invention, the bicycle operating device according to any one of the above aspects is configured so that the prevention member includes a first cam to move the first actuating member from the first actuation position to the first non-actuation position in response to a movement of the second operating member from the second rest position toward the second operated position.

With the bicycle operating device according to the ninth aspect, it is possible to change the position of the first actuating member by using the first cam of the prevention member. Thus, the prevention member and the first actuating member can prevent the movement of the first operating member from being transmitted to the first take-up member in response to the movement of the second operating member.

In accordance with a tenth aspect of the present invention, the bicycle operating device according to any one of the above aspects is configured so that the first cam is provided at the second operating member.

With the bicycle operating device according to the tenth aspect, it is possible to simplify the structure of the first operating member and the prevention member.

In accordance with an eleventh aspect of the present invention, the bicycle operating device according to any one of the above aspects is configured so that the first actuating member is attached to the first operating member. The second operating structure includes a second actuating member operatively coupled with the second take-up member to actuate the second take-up member to move in at least one of a second pulling actuation direction and a second releasing actuation direction, the second actuating member being attached to the second operating member.

With the bicycle operating device according to the eleventh aspect, it is possible to simplify the structure of at least one of the first operating member, the first actuating member, the second operating member, and the second actuating member.

In accordance with a twelfth aspect of the present invention, the bicycle operating device according to any one of the above aspects is configured so that the prevention member is partly provided between the first actuating member and the second actuating member.

With the bicycle operating device according to the twelfth aspect, it is possible to make the bicycle operating device compact.

In accordance with a thirteenth aspect of the present invention, the bicycle operating device according to any one of the above aspects is configured so that the first actuating member is pivotably coupled to the first operating member about a first actuation pivot axis. The first actuating member includes a contact part extending toward the prevention member in an axial direction parallel to the first actuation pivot axis.

With the bicycle operating device according to the thirteenth aspect, it is possible to make the bicycle operating device compact.

In accordance with a fourteenth aspect of the present invention, the bicycle operating device according to any one of the above aspects is configured so that the second operating structure includes a second actuating member operatively coupled with the second take-up member to actuate the second take-up member to move in at least one of a second pulling actuation direction and a second releasing actuation direction. The first actuating member and the second actuating member are attached to the first operating member.

With the bicycle operating device according to the fourteenth aspect, it is possible to simplify the structure of at least one of the first operating member, the first actuating member, and the second actuating member.

In accordance with a fifteenth aspect of the present invention, the bicycle operating device according to any one of the above aspects is configured so that the first actuating member is pivotally coupled to the first operating member about an actuation pivot axis. The second actuating member is pivotally coupled to the first operating member about the actuation pivot axis.

With the bicycle operating device according to the fifteenth aspect, it is possible to simplify the structure of at least one of the first operating member, the first actuating member, and the second actuating member.

In accordance with a sixteenth aspect of the present invention, the bicycle operating device according to any one of the above aspects is configured so that the prevention member is partly disposed between the first actuating member and the second actuating member.

With the bicycle operating device according to the sixteenth aspect, it is possible to make the bicycle operating device compact.

In accordance with a seventeenth aspect of the present invention, the bicycle operating device according to any one of the above aspects is configured so that the second actuating member is movable relative to the first operating member between a second actuation position at which a movement of the second operating member is transmitted to the second take-up member via the second actuating member, and a second non-actuation position at which the movement of the second operating member is not transmitted to the second take-up member via the second actuating member, the second non-actuating position being farther from the second take-up member than the second actuation position.

With the bicycle operating device according to the seventeenth aspect, it is possible to transmit the movement of the second operating member to the second take-up member via the second actuating member and to prevent the movement of the second operating member from being transmitted to the second take-up member via the second actuating member in accordance with a position of the second actuating member.

In accordance with an eighteenth aspect of the present invention, the bicycle operating device according to any one of the above aspects is configured so that the second operating structure includes an actuation biasing member to bias the second actuating member toward the second non-actuation position.

With the bicycle operating device according to the eighteenth aspect, it is possible to stabilize the position of the second operating member at the second non-actuation position.

In accordance with a nineteenth aspect of the present invention, the bicycle operating device according to any one of the above aspects is configured so that the second operating structure includes a second cam to move the second actuating member to the second actuation position.

With the bicycle operating device according to the nineteenth aspect, it is possible to change the position of the second actuating member in response to the movement of the second operating member.

In accordance with a twentieth aspect of the present invention, the bicycle operating device according to any one of the above aspects is configured so that the second cam is provided at the second operating member.

With the bicycle operating device according to the twentieth aspect, it is possible to simplify the structure of the second operating member.

In accordance with a twenty-first aspect of the present invention, the bicycle operating device according to any one of the above aspects is configured so that the first operating structure includes a first positioning structure to position the first take-up member at a plurality of control positions. The second operating structure is configured such that the second take-up member is movable relative to the base member between the second rest position and the second operated position without mechanically positioning the second mechanical control cable relative to the base member during a movement of the second operating member between the second rest position and the second operated position.

With the bicycle operating device according to the twenty-first aspect, it is possible to separately operate a first bicycle component having a plurality of actuated positions and a second bicycle component having only two actuated positions.

In accordance with a twenty-second aspect of the present invention, the bicycle operating device according to any one of the above aspects is configured so that the second operating structure includes a second positioning structure to position the second take-up member at a plurality of control positions. The first operating structure is configured such that the first take-up member is movable relative to the base member between the first rest position and the first operated position without mechanically positioning the first mechanical control cable relative to the base member during a movement of the first operating member between the first rest position and the first operated position.

With the bicycle operating device according to the twenty-second aspect, it is possible to separately operate a first bicycle component having only two actuated positions and a second bicycle component having a plurality of actuated positions.

In accordance with a twenty-third aspect of the present invention, the bicycle operating device according to any one of the above aspects is configured so that the first operating structure includes a first positioning structure to position the first take-up member at a plurality of first control positions. The second operating structure includes a second positioning structure to position the second take-up member at a plurality of second control positions.

With the bicycle operating device according to the twenty-third aspect, it is possible to separately operate a first bicycle component having a plurality of actuated positions and a second bicycle component having a plurality of actuated positions.

In accordance with a twenty-fourth aspect of the present invention, a bicycle operating device comprises a base member, a first operating member, a second operating member, and a switching structure. The base member is configured to be mounted to a bicycle body. The first operating member is movable relative to the base member between a first rest position and a first operated position to actuate a first bicycle component. The second operating member is movable relative to the base member between a second rest position and a second operated position to actuate a second bicycle component that is different from the first bicycle component. The switching structure is configured to actuate the first bicycle component in response to a movement of the first operating member and to actuate the second bicycle component in response to a simultaneous movement of the first and second operating members resulting from an abutment between the first operating member and the second operating member.

With the bicycle operating device according to the twenty-fourth aspect, it is possible to separately operate the first bicycle component and the second bicycle component by using the first operating member and the second operating member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
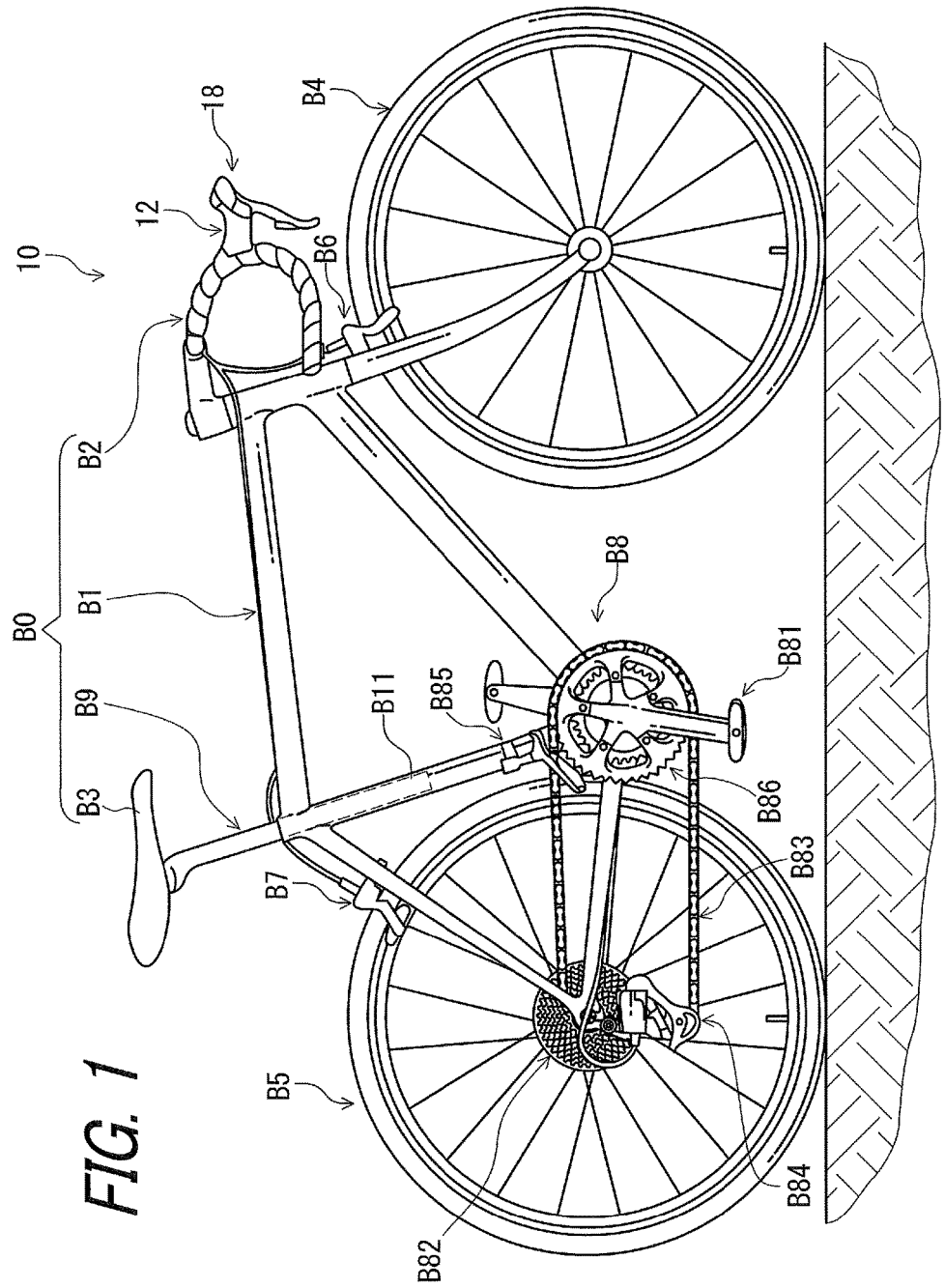
FIG. 1 is a side elevational view of a bicycle including a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 includes a bicycle operating device 12 in accordance with a first embodiment. The bicycle 10 further includes a bicycle body B0, a front wheel B4, a rear wheel B5, a brake device B6, a brake device B7, and a drive train B8. The bicycle body B0 includes a bicycle frame B1, a handlebar B2, a saddle B3, and an adjustable seatpost assembly B9. The bicycle operating device 12 is mounted to the bicycle body B0. In this embodiment, the bicycle operating device 12 is mounted to the handlebar B2. The adjustable seatpost assembly B9 is detachably mounted to a seat tube B11 of the bicycle frame B1. The saddle B3 is attached to the adjustable seatpost assembly B9. In the illustrated embodiment, the brake device B6 includes a front brake, and the brake device B7 includes a rear brake.

The drive train B8 is configured to convert the rider's pedaling force into driving force. The drive train B8 includes a front crankset B81, a rear sprocket B82, a bicycle chain B83, a rear derailleur B84, and a front derailleur B85. The front crankset B81 is rotatably mounted on a bottom bracket of the bicycle frame B1. While the front crankset B81 includes a single front sprocket in this embodiment, the front crankset B81 can include a plurality of front sprockets. In such an embodiment, the bicycle 10 includes a front derailleur.

The front crankset B81 is rotatably mounted to the bicycle frame B1 and includes a front sprocket B86. The front sprocket B86 includes a plurality of front sprocket elements. The rear sprocket B82 is mounted to a rear axle of the rear wheel B5 and includes a plurality of rear sprocket elements. The bicycle chain B83 couples the front sprocket B86 to the rear sprocket B82 to transmit the pedaling force from the front crankset B81 to the rear sprocket B82. The rear derailleur B84 shifts the bicycle chain B83 relative to the rear sprocket B82 in a transverse direction of the bicycle 10 to change a speed stage among a plurality of speed stages defined by the front sprocket B86 and the rear sprocket B82. The front derailleur B85 shifts the bicycle chain B83 relative to the front sprocket B86 in the transverse direction of the bicycle 10 to change a speed stage among the plurality of speed stages.

In this embodiment, the following directional terms "front", "rear", "forward", "rearward", "left", "right", "transverse", "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle operating device 12 should be interpreted relative to the bicycle 10 as used in an upright riding position on a horizontal surface as illustrated in FIG. 1. These terms, as utilized to describe the bicycle operating device 12 should be interpreted relative to the bicycle operating device 12 as mounted on the bicycle 10 used in an upright riding position on a horizontal surface as illustrated in FIG. 1.

Figure 2:
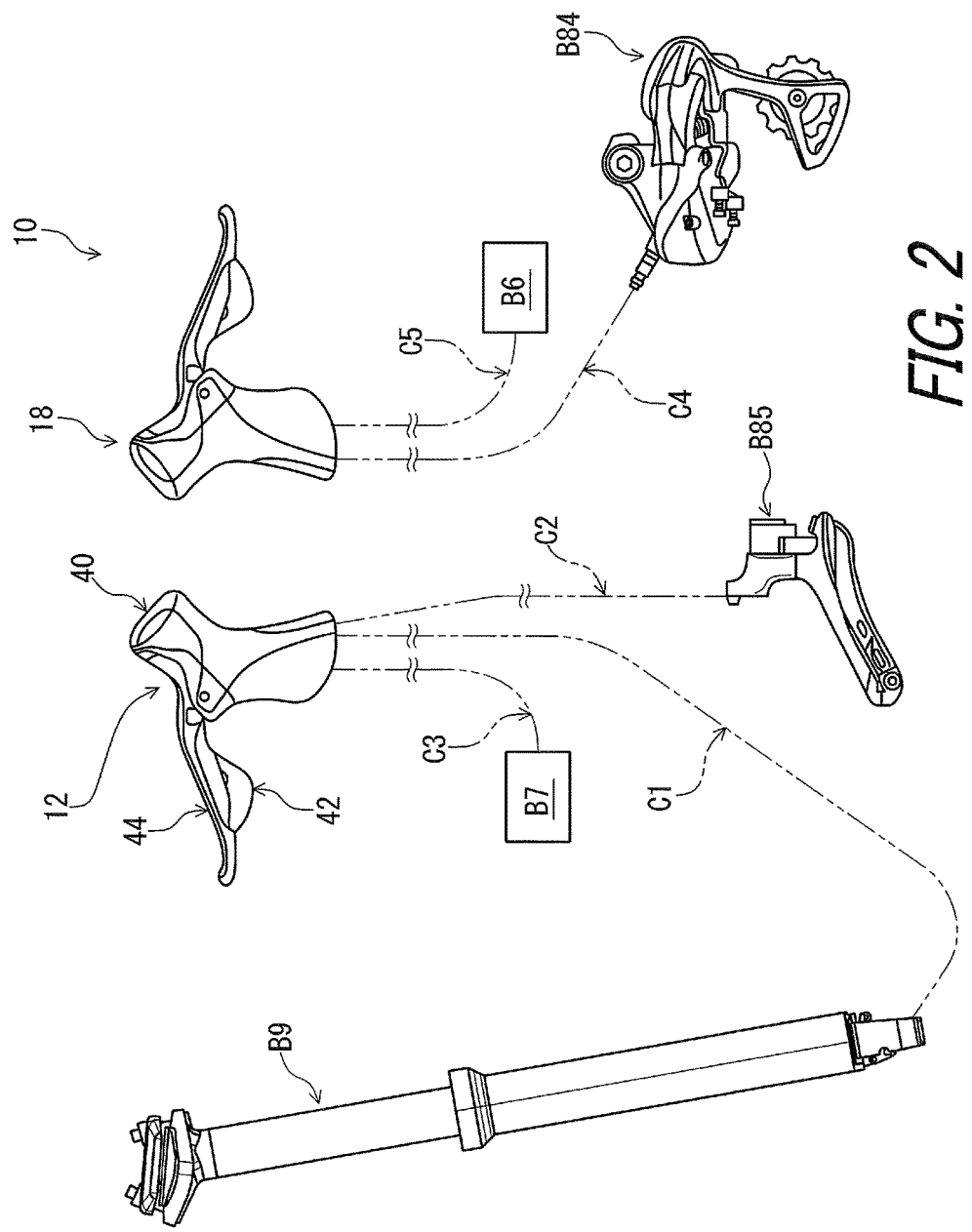
FIG. 2 is a schematic view of the bicycle illustrated in FIG. 1.

As seen in FIG. 2, the bicycle operating device 12 is operatively connected to the adjustable seatpost assembly B9 via a first mechanical control cable C1. The bicycle operating device 12 is operatively connected to the front derailleur B85 via a second mechanical control cable C2. The bicycle operating device 12 is operatively connected to the brake device B7 via a brake control cable C3. The bicycle 10 includes an additional bicycle operating device 18. The additional bicycle operating device 18 is operatively connected to the rear derailleur B84 via an additional mechanical control cable C4. The additional bicycle operating device 18 is operatively connected to the brake device B6 via an additional brake control cable C5. Examples of the mechanical control cables C1 to C5 can include a Bowden cable.

Figure 6:
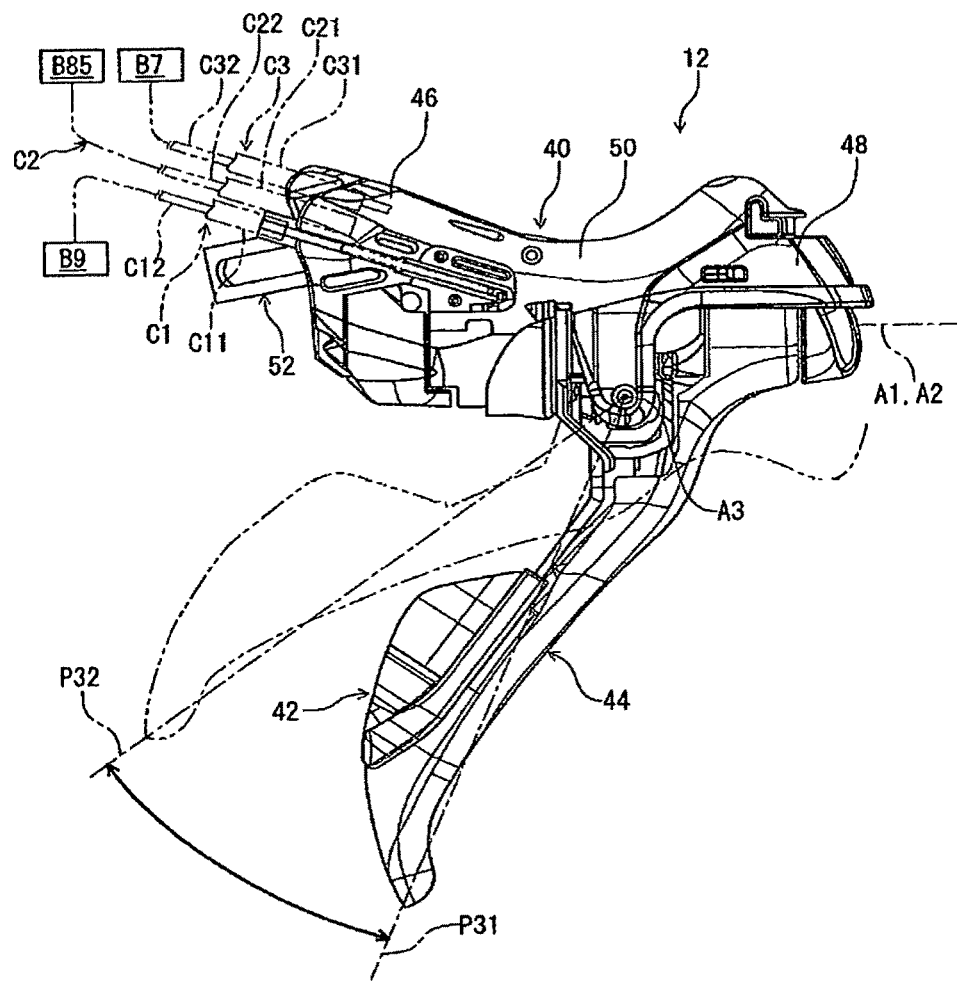
FIG. 6 is a side elevational view of the bicycle operating device illustrated in FIG. 1.

For example, as seen in FIG. 6, the first mechanical control cable C1 includes an outer casing C11 and an inner wire C12 provided in the outer casing C11. The inner wire C12 of the first mechanical control cable C1 is coupled to the adjustable seatpost assembly B9. The second mechanical control cable C2 includes an outer casing C21 and an inner wire C22 provided in the outer casing C21. The inner wire C22 of the second mechanical control cable C2 is coupled to the front derailleur B85. The brake control cable C3 includes an outer casing C31 and an inner wire C32 provided in the outer casing C31. The inner wire C32 of the brake control cable C3 is coupled to the brake device B7. The front derailleur B85 can be omitted from the bicycle 10.

Figure 3:
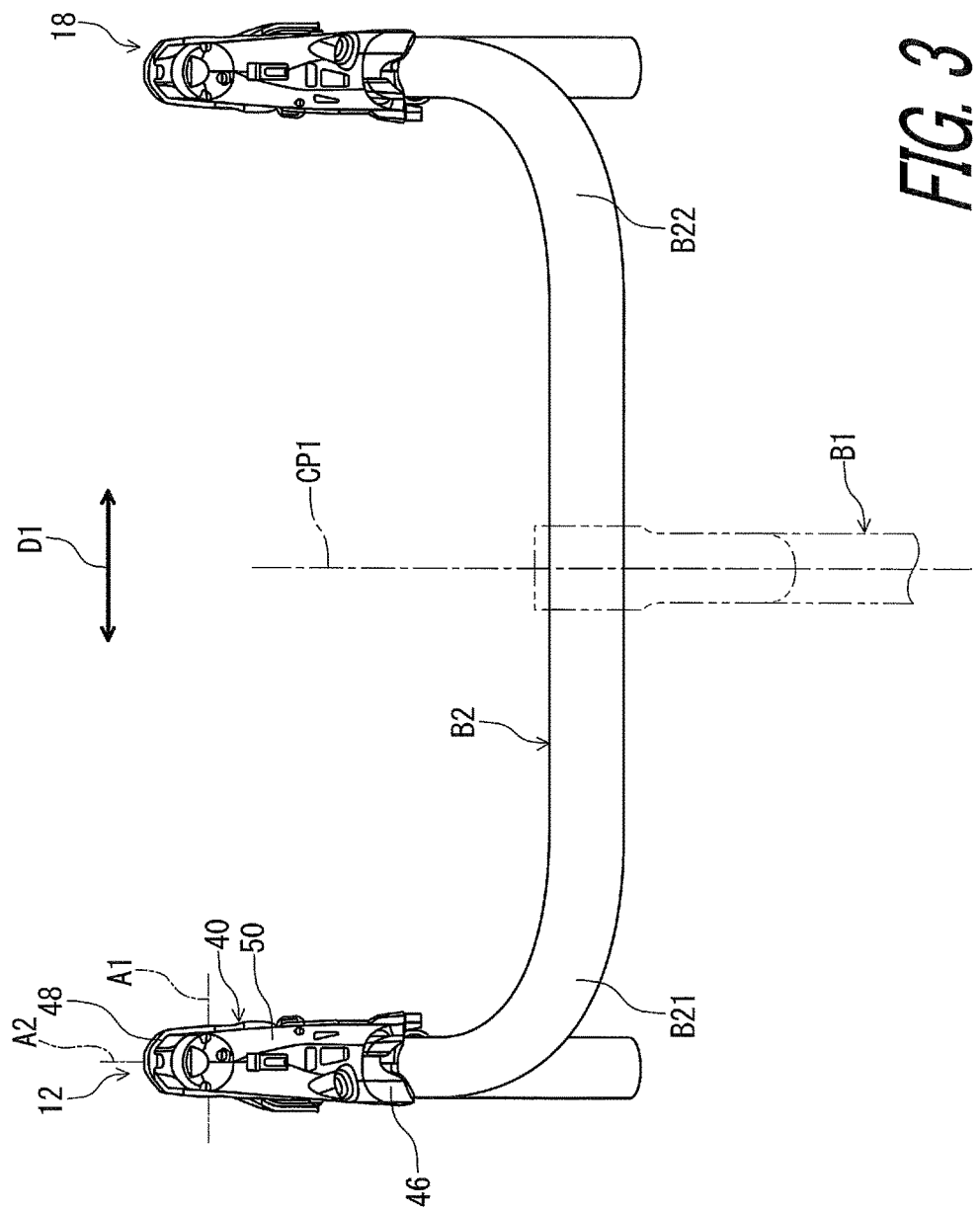
FIG. 3 is a plane view of the bicycle operating device illustrated in FIG. 1, with a handlebar.

As seen in FIG. 3, the bicycle operating device 12 is a left-side operating device. The bicycle operating device 12 is mounted to a left part B21 of the handlebar B2 in the mounting state where the bicycle operating device 12 is mounted to the handlebar B2. The additional bicycle operating device 18 is a right-side operating device. The additional bicycle operating device 18 is mounted to a right part B22 of the handlebar B2 in the mounting state where the additional bicycle operating device 18 is mounted to the handlebar B2. The bicycle operating device 12 is provided on a left side of a transverse center plane CP1 of the bicycle in the mounting state when a transverse center of the handlebar B2 is provided on the transverse center plane CP1. The additional bicycle operating device 18 is provided on a right side of the transverse center plane CP1 of the bicycle 10 in the mounting state when the transverse center of the handlebar B2 is provided on the transverse center plane CP1. The transverse center plane CP1 is defined at a center of the bicycle frame B1 in a transverse direction D1 of the bicycle 10.

Figure 4:
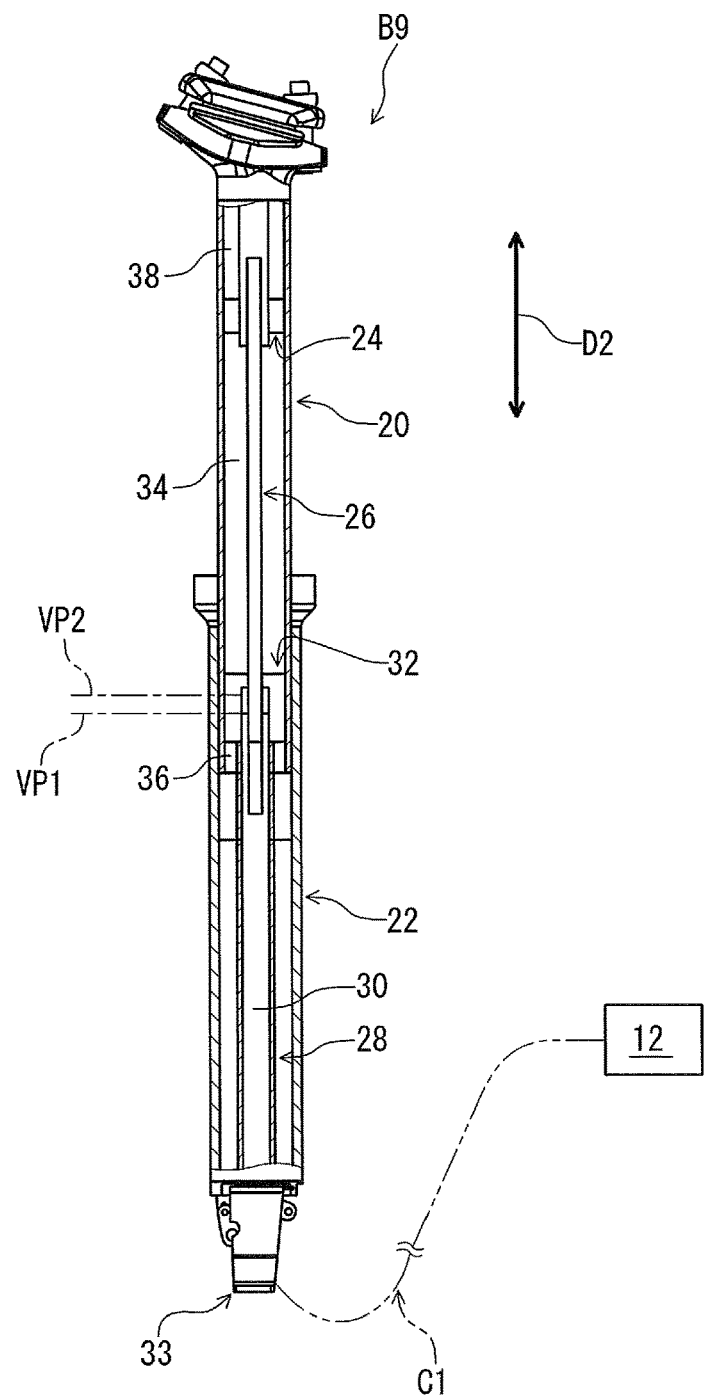
FIG. 4 is a schematic cross-sectional view of an adjustable seatpost assembly of the bicycle illustrated in FIG. 1.

As seen in FIG. 4, the adjustable seatpost assembly B9 includes a first tube 20, a second tube 22, a floating piston 24, a rod 26, a guide member 28, a flow control part 30, and a valve unit 32, and an actuating structure 33. The flow control part 30 is operatively coupled to the first mechanical control cable C1 via the actuating structure 33. The valve unit 32 divides an interior bore of the first tube 20 into a first fluid chamber 34 and a second fluid chamber 36. The flow control part 30 is provided in the guide member 28 to move relative to the valve unit 32 between a closed position VP1 and an open position VP2. The flow control part 30 is biased by a biasing element (not shown) toward the closed position VP1. The valve unit 32 is closed when the flow control part 30 is positioned at the closed position VP1. The valve unit 32 is open when the flow control part 30 is positioned at the open position VP2. The actuating structure 33 converts a pulling movement of the first mechanical control cable C1 into an upward movement of the flow control part 30 from the closed position VP1 to the open position VP2. The first tube 20 and the second tube 22 are telescopically arranged, with the amount of insertion of the first tube 20 into the second tube 22 being adjustable. The second tube 22 is secured to the seat tube B11 (FIG. 1) by a conventional clamping arrangement (not shown) provided on an upper end of the seat tube B11.

The valve unit 32 is coupled to the second tube 22 via the guide member 28 to move together relative to the first tube 20. The first fluid chamber 34 is disposed between the valve unit 32 and the floating piston 24. The second fluid chamber 36 is disposed between the valve unit 32 and a lower end of the first tube 20. The flow control part 30 cooperates with the guide member 28 and the valve unit 32 to control flow of fluid between the first fluid chamber 34 and the second fluid chamber 36 to change a position of the first tube 20 relative to the second tube 22. When the valve unit 32 is closed, the first tube 20 is positioned relative to the second tube 22 in a telescopic direction D2. When the valve unit 32 is open, the first tube 20 is movable relative to the second tube 22 in the telescopic direction D2. The floating piston 24 is disposed in the interior bore of the first tube 20 and forms a gas chamber 38 disposed between the floating piston 24 and an upper end of the first tube 20. The shorter total length of the adjustable seatpost assembly B9 increases an inner pressure of the gas chamber 38. Since structures of the adjustable seatpost assembly B9 have been known in the bicycle field, they will not be described and/or illustrated in detail here for the sake of brevity.

Figure 5:
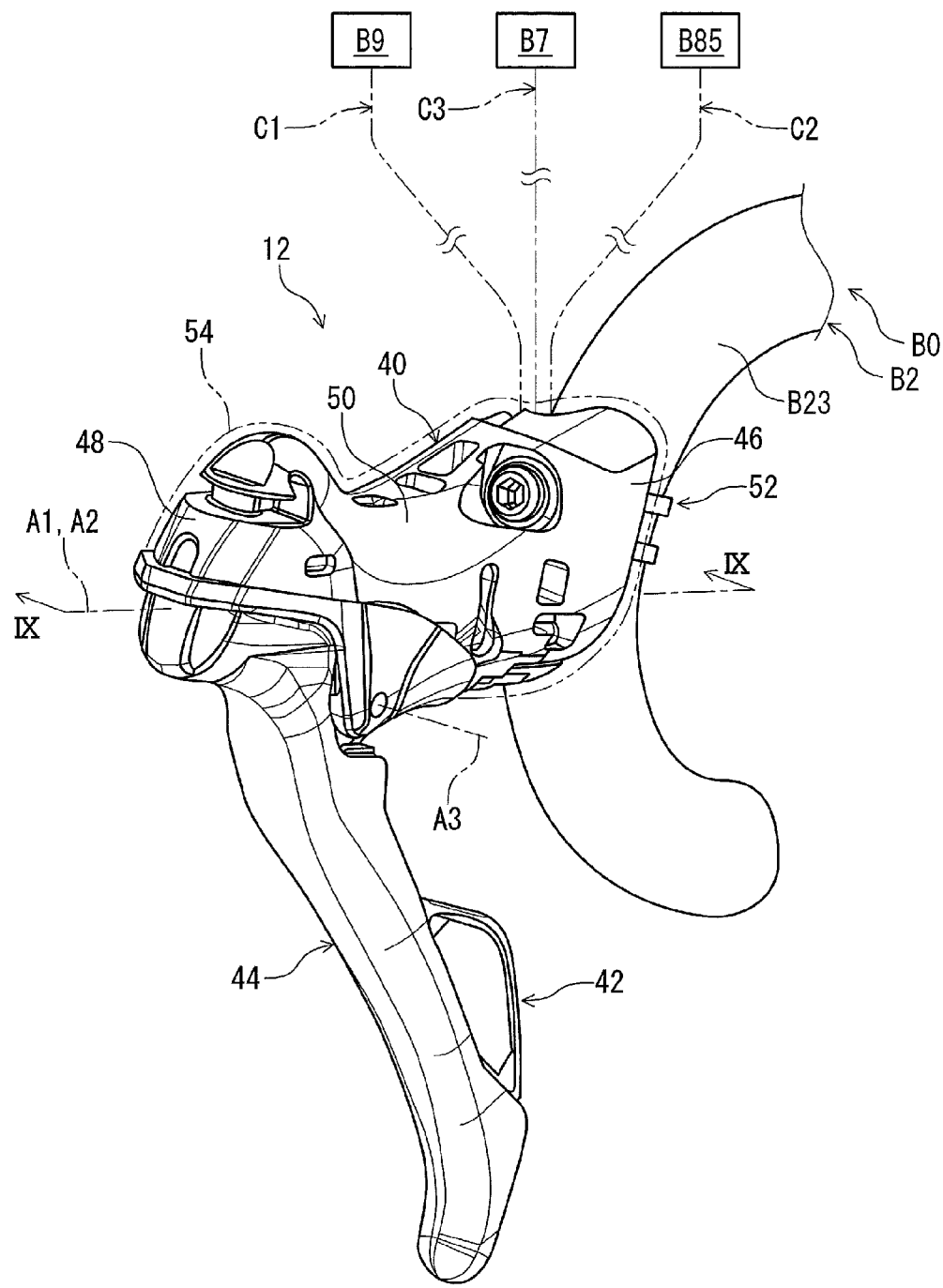
FIG. 5 is a perspective view of the bicycle operating device illustrated in FIG. 1.

As seen in FIG. 5, the bicycle operating device 12 comprises a base member 40, a first operating member 42, and a second operating member 44. The base member 40 is configured to be mounted to the bicycle body B0. In this embodiment, the base member 40 is configured to be mounted to the handlebar B2. The base member 40 comprises a first end portion 46, a second end portion 48, and a grip portion 50. The first end portion 46 is configured to be coupled to the handlebar B2 in the mounting state where the bicycle operating device 12 is mounted to the handlebar B2. The second end portion 48 is opposite to the first end portion 46. The grip portion 50 is provided between the first end portion 46 and the second end portion 48.

In this embodiment, the first end portion 46 is configured to be coupled to a bending portion B23 of the handlebar B2 in the mounting state where the bicycle operating device 12 is mounted to the handlebar B2. However, the first end portion 46 can be coupled to other types of handlebar. As seen in FIG. 3, the first end portion 46 of the base member 40 is configured to be coupled to the left part B21 of the handlebar B2 in the mounting state.

As seen in FIG. 5, the bicycle operating device 12 includes a mounting structure 52. The base member 40 is mounted to the handlebar B2 via the mounting structure 52. The base member 40 is a stationary member when mounted to the handlebar B2. The mounting structure 52 preferably includes a band clamp or similar structure that is used in a road shifter for mounting to a drop-down handlebar. The base member 40 is covered by a grip cover 54 made of a non-metallic material such as rubber. Riders sometimes grip the base member 40 via the grip cover 54 and lean on the base member 40 via the grip cover 54 during riding. The grip cover 54 can be omitted from the bicycle operating device 12.

As seen in FIG. 6, one of the first operating member 42 and the second operating member 44 is at least partly closer to the first end portion 46 of the base member 40 than the other of the first operating member 42 and the second operating member 44. In this embodiment, the first operating member 42 is at least partly closer to the first end portion 46 of the base member 40 than the second operating member 44. However, the second operating member 44 can be at least partly closer to the first end portion 46 of the base member 40 than the first operating member 42.

Figure 7:
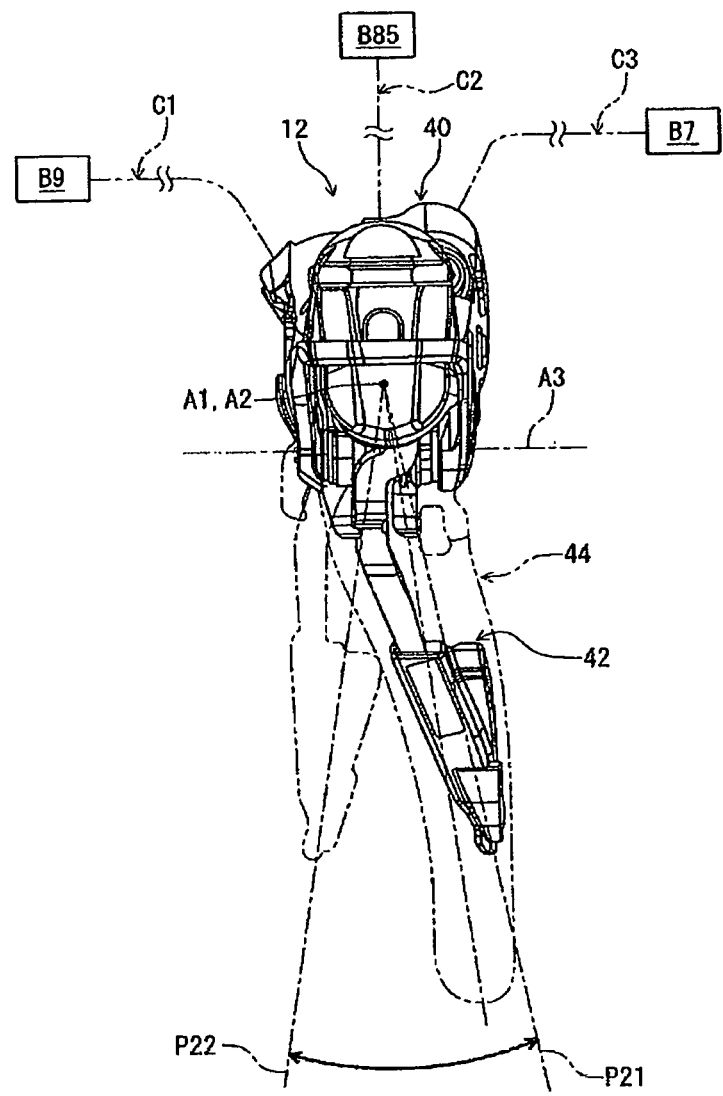
FIG. 7 shows a structure of the bicycle operating device illustrated in FIG. 1.

As seen in FIG. 7, the first operating member 42 is movable relative to the base member 40 between a first rest position P21 and a first operated position P22. The first operating member 42 is movable relative to the base member 40 between the first rest position P21 and the first operated position P22 to actuate a first bicycle component. In this embodiment, the first operating member 42 is movable relative to the base member 40 between the first rest position P21 and the first operated position P22 to actuate the adjustable seatpost assembly B9 provided as the first bicycle component. However, the bicycle operating device 12 can be operatively coupled to other bicycle components such as the rear derailleur B84 and the front derailleur B85. In this embodiment, the adjustable seatpost assembly B9 can also be referred to as the first bicycle component B9.

In the present application, the term "rest position" as used herein refers to a position at which a movable part such as the first operating member 42 or the second operating member 44 remains stationary in a state where the movable part is not operated by the user. The term "operated position" as used herein refers to a position at which the movable part has been operated by the user to perform the operation of a bicycle component such as the brake device B6, the brake device B7, the adjustable seatpost assembly B9, the rear derailleur B84, or the front derailleur B85.

As seen in FIG. 7, the first operating member 42 is coupled to the base member 40 movably between the first rest position P21 and the first operated position P22 to move the first mechanical control cable C1 relative to the base member 40. The first operating member 42 is coupled to the base member 40 movably between the first rest position P21 and the first operated position P22 to operate the first bicycle component B9 via the first mechanical control cable C1. Namely, the first operating member 42 is movably coupled to the base member 40 to operate the first bicycle component B9 via the first mechanical control cable C1. In this embodiment, the first operating member 42 is coupled to the base member 40 pivotally about a first pivot axis A1. The first operating member 42 is pivoted relative to the base member 40 in a first direction D51 from the first rest position P21 to the first operated position P22. The first operating member 42 is pivoted relative to the base member 40 in a second direction D52 from the first operated position P22 to the first rest position P21. The second direction D52 is a direction opposite to the first direction D51.

Figure 8:
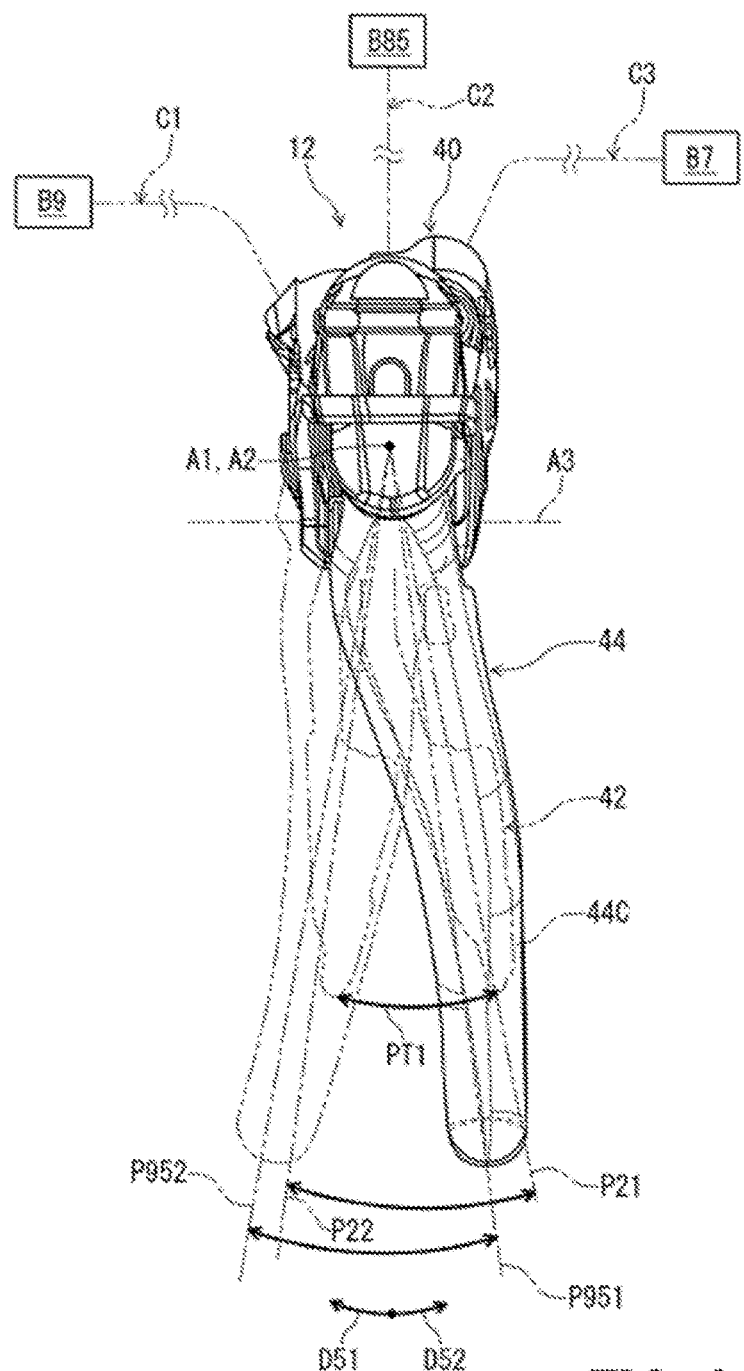
FIG. 8 is a front view of the bicycle operating device illustrated in FIG. 1.

As seen in FIG. 8, the second operating member 44 is movable relative to the base member 40 between a second rest position P951 and a second operated position P952. The second operating member 44 is movable relative to the base member 40 between the second rest position P951 and the second operated position P952 to actuate a second bicycle component that is different from the first bicycle component B9. In this embodiment, the second operating member 44 is movable relative to the base member 40 between the second rest position P951 and the second operated position P952 to actuate the front derailleur B85 provided as the second bicycle component. However, the bicycle operating device 12 can be operatively coupled to other bicycle components such as the rear derailleur B84 and the adjustable seatpost assembly B9. In this embodiment, the front derailleur B85 can also be referred to as the second bicycle component B85.

As seen in FIG. 8, the second operating member 44 is coupled to the base member 40 movably between the second rest position P951 and the second operated position P952 to move the second mechanical control cable C2 relative to the base member 40. The second operating member 44 is coupled to the base member 40 movably between the second rest position P951 and the second operated position P952 to operate the second bicycle component B85 via the second mechanical control cable C2. Namely, the second operating member 44 is movably coupled to the base member 40 to operate the adjustable seatpost assembly B9 via the first mechanical control cable C1. In this embodiment, the second operating member 44 is coupled to the base member 40 pivotally about a second pivot axis A2.

In this embodiment, the first pivot axis A1 coincides with the second pivot axis A2 of the second operating member 44. However, the first pivot axis A1 can be offset from the second pivot axis A2. The second operating member 44 is pivoted relative to the base member 40 in the first direction D51 from the second rest position P951 to the second operated position P952. The second operating member 44 is pivoted relative to the base member 40 in the second direction D52 from the second operated position P952 to the second rest position P951.

As seen in FIG. 6, the second operating member 44 is movably coupled to the base member 40 to operate the brake device B7. The second operating member 44 is coupled to the base member 40 pivotally about a brake pivot axis A3. The second operating member 44 is coupled to the base member 40 pivotally between a brake rest position P31 and a brake operated position P32. The second operating member 44 is provided as a brake lever. However, the function of the brake lever can be omitted from the second operating member 44.

In this embodiment, each of the first pivot axis A1 and the second pivot axis A2 is non-parallel to the brake pivot axis A3. Thus, the second operating member 44 is movable relative to the base member 40 in a direction different from the first direction D51 and the second direction D52.

An end of the inner wire C32 of the brake control cable C3 is coupled to the second operating member 44. The inner wire C32 is pulled relative to the outer casing C31 and the base member 40 when the second operating member 44 is pivoted relative to the base member 40 about the brake pivot axis A3 from the brake rest position P31 toward the brake operated position P32. The inner wire C32 is returned relative to the outer casing C31 and the base member 40 when the second operating member 44 is returned relative to the base member 40 about the brake pivot axis A3 from the brake operated position P32 to the brake rest position P31.

As seen in FIG. 7, the first operating member 42 is pivoted relative to the base member 40 and the second operating member 44 from the first rest position P21 to the first operated position P22 when only the first operating member 42 is operated.

As seen in FIG. 8, the first operating member 42 is pivoted together with the second operating member 44 relative to the base member 40 from the first rest position P21 to the first operated position P22 when the second operating member 44 is pivoted relative to the base member 40 from the second rest position P951 to the second operated position P952 even if the first operating member 42 is not operated.

Specifically, the second operating member 44 includes an operating abutment 44C contactable with the first operating member 42. The operating abutment 44C has an abutment path PT1 defined from the second rest position P951 to the second operated position P952. The first operating member 42 is on the abutment path PT1 to come into contact with the operating abutment 44C during a movement of the second operating member 44 from the second rest position P951 to the second operated position P952. The operating abutment 44C contacts the first operating member 42 in a state where the second operating member 44 is at the second rest position P951. Thus, the pivotal movement of the first operating member 42 is transmitted to the second operating member 44 when the first operating member 42 is pivoted from the first rest position P21 toward the first operated position P22. This causes the second operating member 44 to pivot together with the first operating member 42 when the first operating member 42 is pivoted from the first rest position P21 toward the first operated position P22. The operating abutment 44C can be disposed to be spaced apart from the first operating member 42 in the state where the second operating member 44 is at the second rest position P951. In such an embodiment, the operating abutment 44C comes into contact with the first operating member 42 during the movement of the second operating member 44 from the second rest position P951 toward the second operated position P952.

Figure 9:
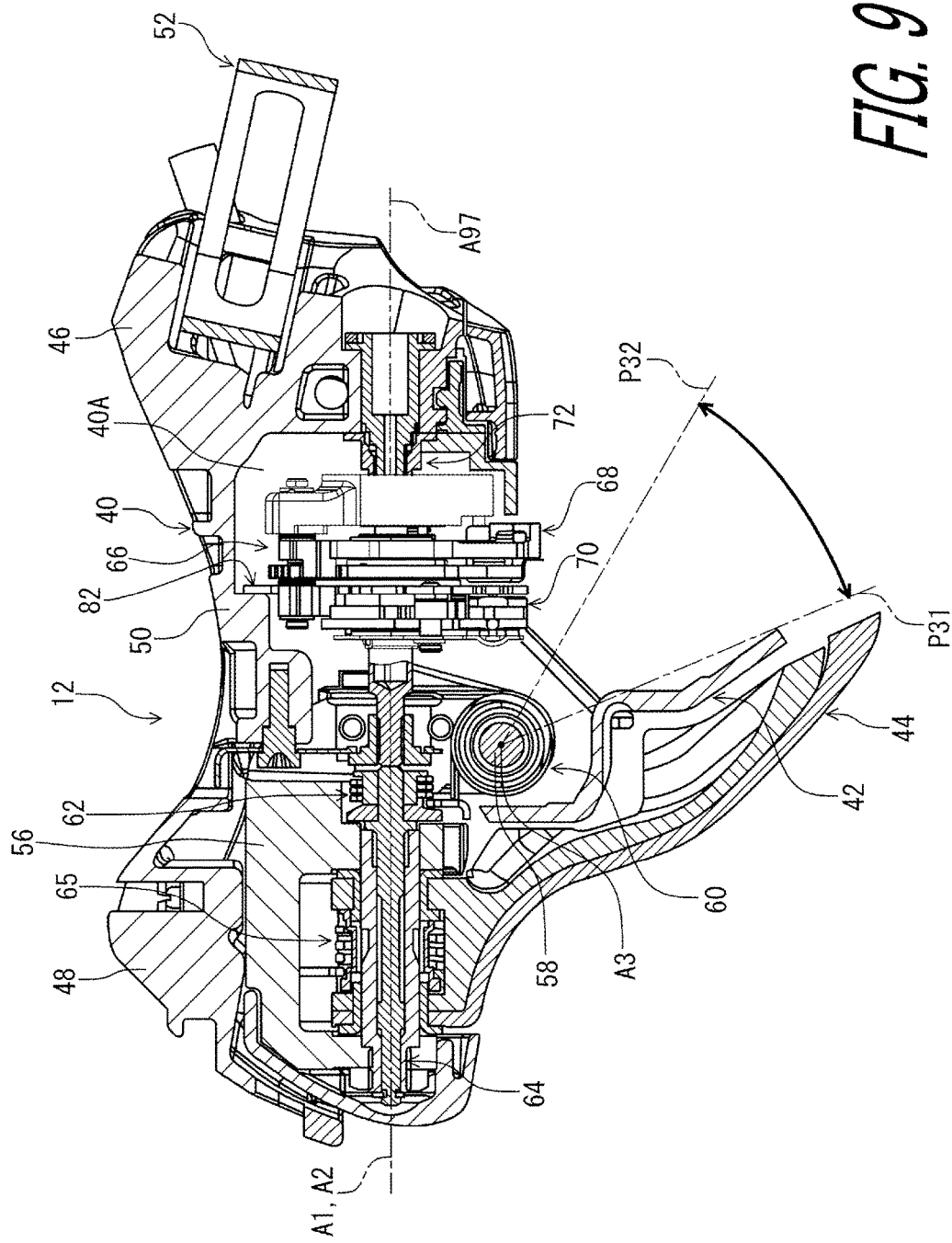
FIG. 9 is a cross-sectional view of the bicycle operating device taken along line IX-IX of FIG. 5.

As seen in FIG. 9, the bicycle operating device 12 includes a coupling member 56, a first shaft 58, a second shaft 64, a brake biasing member 60, a first biasing member 62, and a second biasing member 65. The first shaft 58 defines the brake pivot axis A3 and is attached to the base member 40. The first operating member 42 is pivotally coupled to the base member 40 by the first shaft 58. Specifically, the coupling member 56 is pivotally coupled to the base member 40 about the brake pivot axis A3 via the first shaft 58. The first operating member 42 is pivotally coupled to the coupling member 56 about the first pivot axis A1 via the second shaft 64. The second operating member 44 is pivotally coupled to the coupling member 56 about the second pivot axis A2 via the second shaft 64. An end of the inner wire C32 (FIG. 6) of the brake control cable C3 is coupled to the coupling member 56.

The brake biasing member 60 biases the first operating member 42 (the coupling member 56) toward the brake rest position P31. The brake biasing member 60 is mounted on the first shaft 58. The first biasing member 62 is mounted on the second shaft 64 to bias the first operating member 42 toward the first rest position P21 (FIG. 7). The second biasing member 65 is mounted on the second shaft 64 to bias the second operating member 44 toward the second rest position P951 (FIG. 8). The second shaft 64 is coaxial with a third shaft 72 (described later) in a state where the first operating member 42 is at the brake rest position P31.

As seen in FIG. 9, the bicycle operating device 12 comprises a switching structure 66. The switching structure 66 is configured to actuate the first bicycle component B9 in response to a movement of the first operating member 42. The switching structure 66 is configured to actuate the second bicycle component B85 in response to a simultaneous movement of the first and second operating members 42 and 44 resulting from an abutment between the first operating member 42 and the second operating member 44. In this embodiment, the switching structure 66 includes a mechanical structure. However, the switching structure 66 can include a hydraulic unit or an electrical component instead of or in addition to the mechanical structure.

In this embodiment, the bicycle operating device 12 comprises a first operating structure 68 and a second operating structure 70. The switching structure 66 includes a part of the first operating structure 68 and a part of the second operating structure 70. The first operating structure 68 and the second operating structure 70 are mounted on the third shaft 72. The base member 40 includes an internal space 40A. The first operating structure 68 and the second operating structure 70 are at least partly disposed in the internal space 40A. However, at least one of the first operating structure 68 and the second operating structure 70 can be disposed outside the internal space 40A. Furthermore, the internal space 40A can be omitted from the base member 40.

Figure 10:
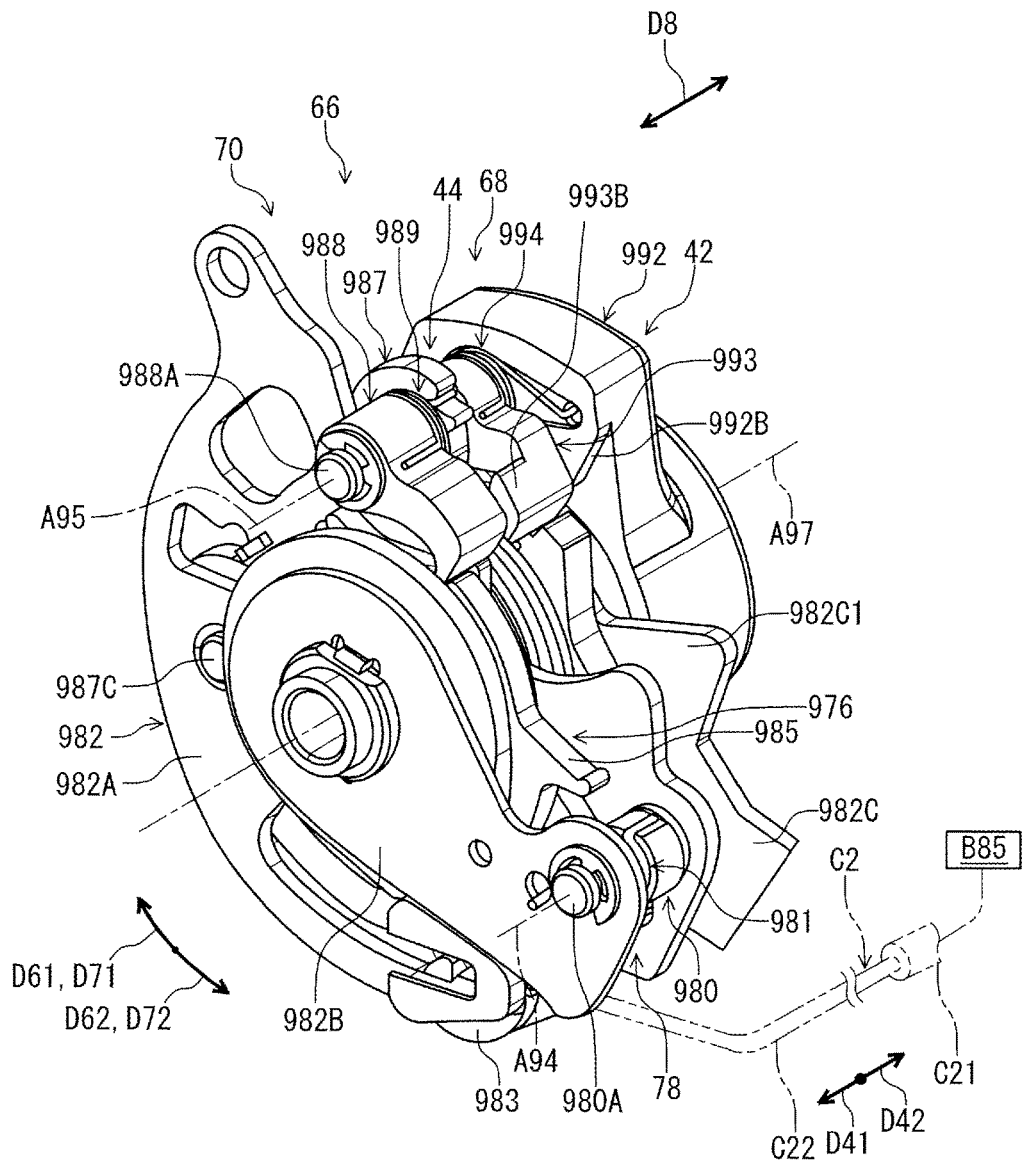
FIG. 10 is a perspective view of a cable operating structure of the bicycle operating device illustrated in FIG. 6.

The bicycle operating device 12 comprises a support structure 982. The support structure 982 is secured to the base member 40. As seen in FIG. 10, the support structure 982 includes a first support plate 982A, a second support plate 982B, and a third support plate 982C. The second support plate 982B is coupled to the first support plate 982A and the third support plate 982C.

Figure 11:
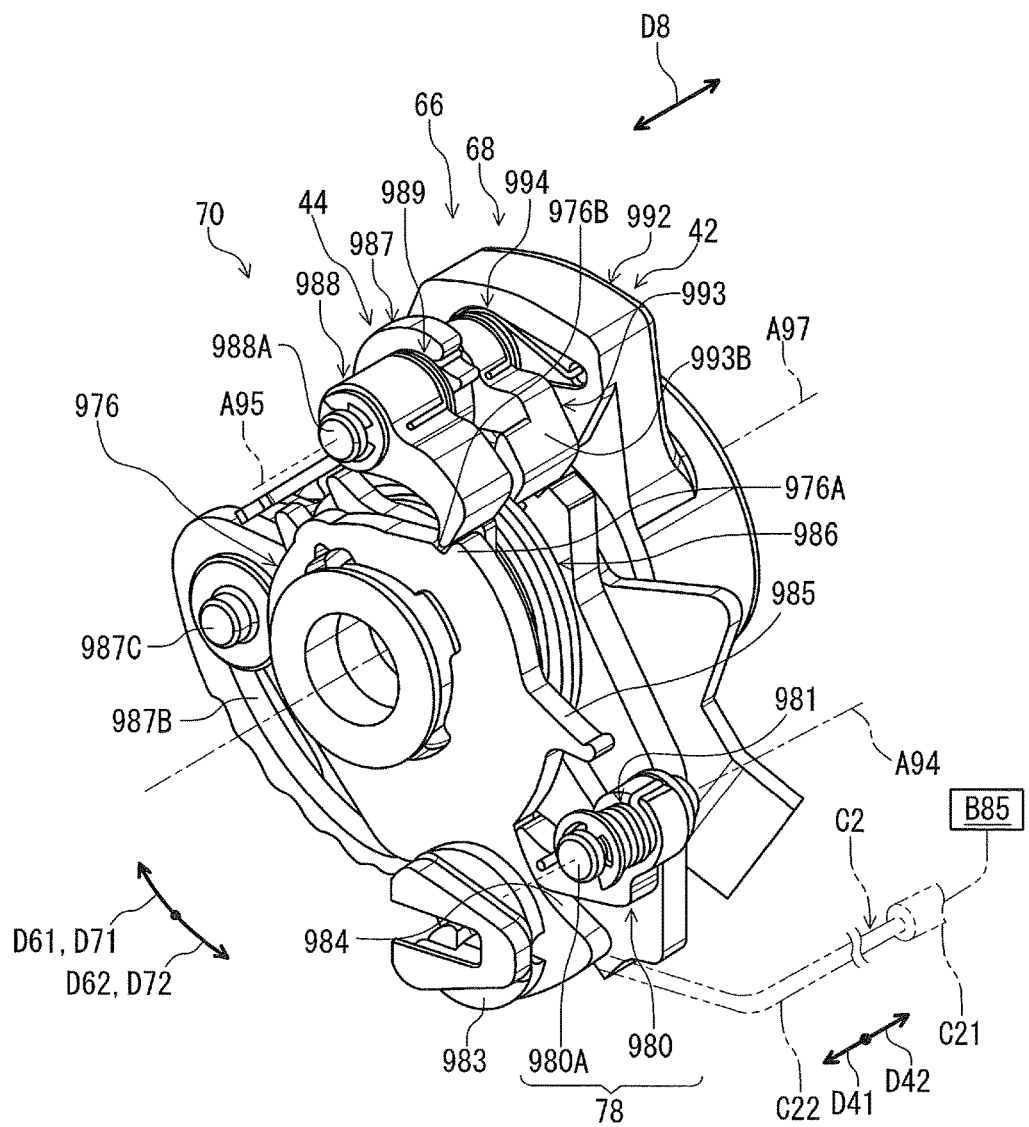
FIG. 11 is a perspective view of the cable operating structure of the bicycle operating device illustrated in FIG. 6, with a support structure omitted (first control position).
Figure 12:
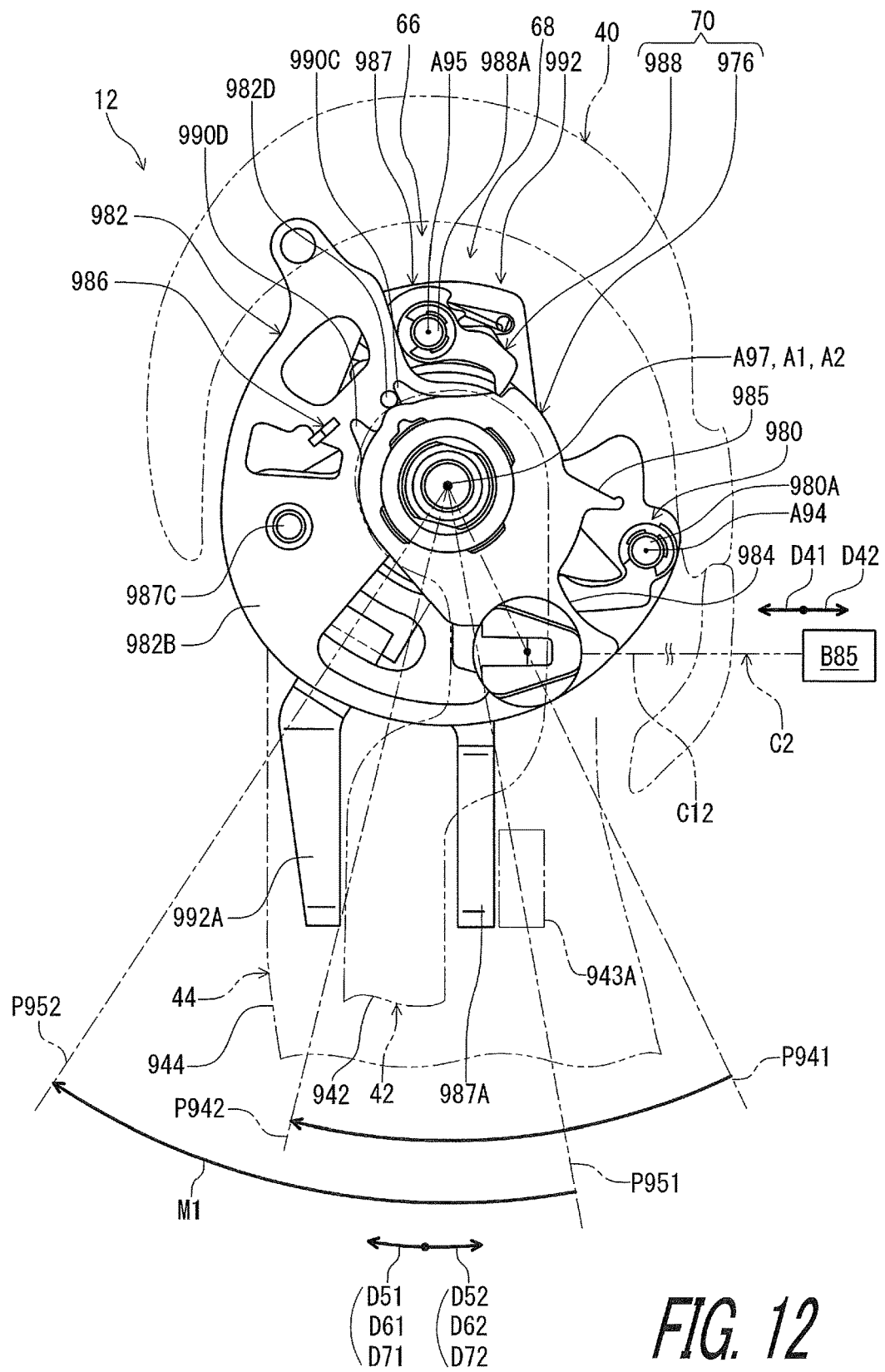
FIG. 12 is a front view of the cable operating structure of the bicycle operating device illustrated in FIG. 6.

As seen in FIGS. 10 to 12, the second operating structure 70 comprises a second take-up member 976, the second operating member 44, and a second actuating member 988. The second take-up member 976 is movable relative to the base member 40 to move the second mechanical control cable C2 in a second pulling direction D41 and a second releasing direction D42 opposite to the second pulling direction D41. In this embodiment, the second take-up member 976 is coupled to the second operating member 44 to move the second mechanical control cable C2 relative to the base member 40 in the second pulling direction D41 and the second releasing direction D42 opposite to the second pulling direction D41 in response to the movement of the second operating member 44. The second pulling direction D41 and the second releasing direction D42 are defined along the second mechanical control cable C2. An end of the inner wire C22 of the second mechanical control cable C2 is coupled to the second take-up member 976.

In this embodiment, the second take-up member 976 is rotatably coupled to the base member 40 about a rotational axis A97. As seen in FIG. 9, the rotational axis A97 coincides with the first pivot axis A1 and the second pivot axis A2 in the state where the second operating member 44 is at the brake rest position P31. However, the rotational axis A97 can be offset from the first pivot axis A1 and the second pivot axis A2 in the state where the second operating member 44 is at the brake rest position P31.

As seen in FIGS. 10 and 11, the second actuating member 988 is operatively coupled with the second take-up member 976 to actuate the second take-up member 976 to move in at least one of a second pulling actuation direction D61 and a second releasing actuation direction D62. In this embodiment, the second actuating member 988 is a pawl that is contactable to the second take-up member 976 to move the second take-up member 976 in the second pulling actuation direction D61. The second releasing actuation direction D62 is a direction opposite to the second pulling actuation direction D61. The second pulling actuation direction D61 and the second releasing actuation direction D62 are defined along a circumferential direction defined about the rotational axis A97. In this embodiment, the second actuating member 988 is operatively coupled with the second take-up member 976 to actuate the second take-up member 976 to move in the second pulling actuation direction D61. However, the second actuating member 988 can be operatively coupled with the second take-up member 976 to actuate the second take-up member 976 to move in the second releasing actuation direction D62 or both the second pulling actuation direction D61 and the second releasing actuation direction D62.

Figure 13:
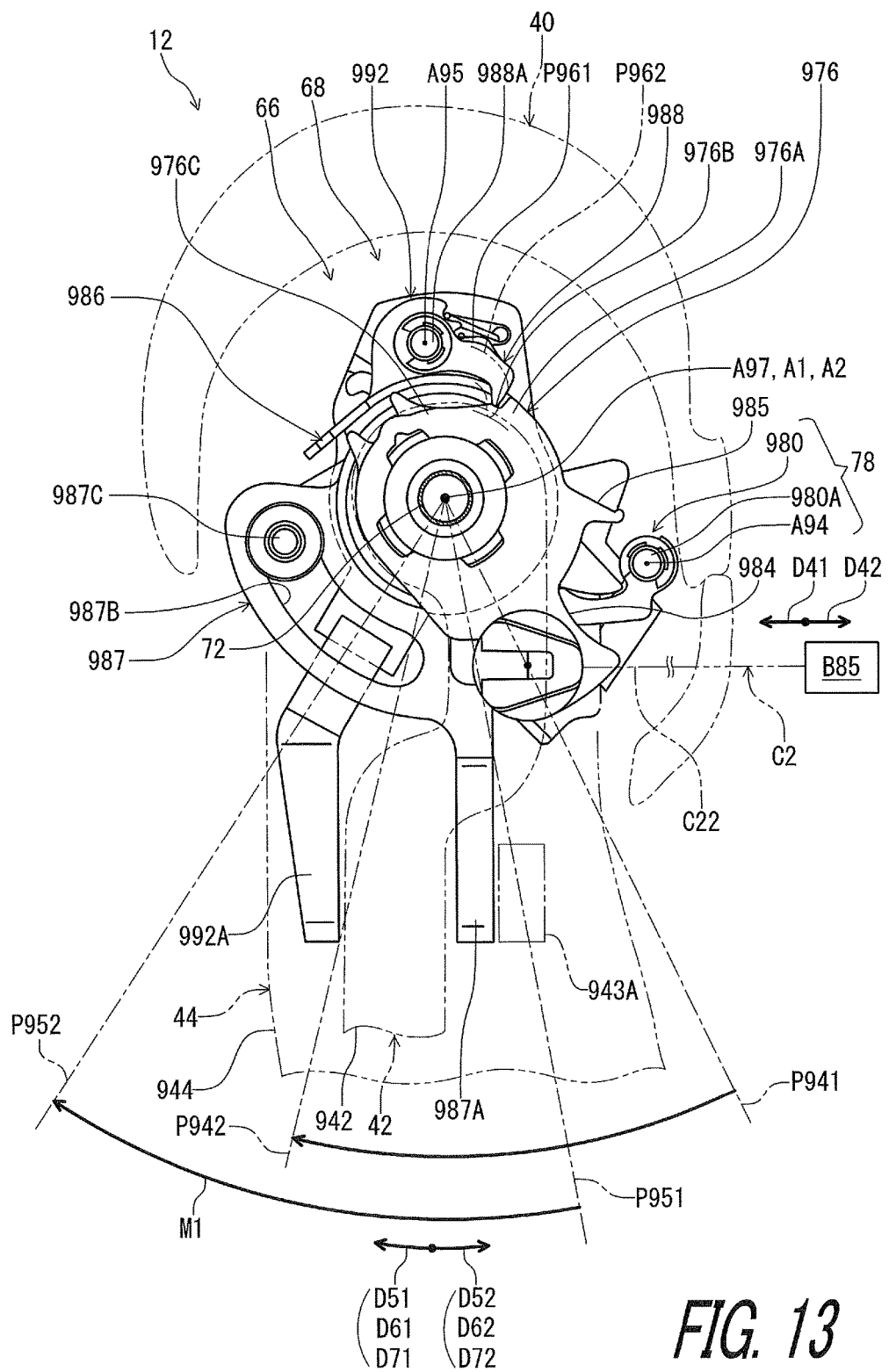
FIG. 13 is a front view of the cable operating structure of the bicycle operating device illustrated in FIG. 6, with the support structure omitted.

As seen in FIG. 13, the second actuating member 988 is movable relative to the second operating member 44 between a second actuation position P962 and a second non-actuation position P961. At the second actuation position P962, the movement of the second operating member 44 is transmitted to the second take-up member 976 via the second actuating member 988. At the second non-actuation position P961, the movement of the second operating member 44 is not transmitted to the second take-up member 976 via the second actuating member 988. The second non-actuation position P961 is farther from the second take-up member 976 than the second actuation position P962. The second actuation position P962 and the second non-actuation position P961 are defined based on an end (a portion contactable with the take-up member 976) of the second actuating member 988.

As seen in FIGS. 11 and 12, the second actuating member 988 is attached to the second operating member 44. In this embodiment, the second operating member 44 includes a second operating body 944 and a second input member 987. The second operating body 944 is pivotally coupled to the base member 40 about the second pivot axis A2 (FIG. 9). The second input member 987 is pivotally coupled to the base member 40 about the rotational axis A97. The second input member 987 is pivotally mounted on the third shaft 72 (FIG. 9). The second operating body 944 is contactable with the second input member 987 to transmit a pivotal movement of the second operating body 944 to the second input member 987 in the first direction D51. The second actuating member 988 is attached to the second input member 987.

The second input member 987 includes a second transmission part 987A. The second transmission part 987A is contactable with an additional operating abutment 943A of the second operating member 44. The second input member 987 is pivoted relative to the base member 40 about the rotational axis A97 in the first direction D51 when the second operating body 944 is pivoted relative to the base member 40 about the second pivot axis A2 from the second rest position P951 to the second operated position P952. The second actuating member 988 is pivotally coupled to the second input member 987 about a second actuation pivot axis A95 via a pivot pin 988A. The second actuating member 988 includes a first actuation pawl contactable with the second take-up member 976.

As seen in FIGS. 11 and 13, the second operating structure 70 includes a second actuation biasing element 989. The second actuation biasing element 989 is mounted to the pivot pin 988A to bias the second actuating member 988. The second actuation biasing element 989 include a torsion coil spring.

The second input member 987 includes an elongated hole 987B. The elongated hole 987B has a curved shape in the circumferential direction defined about the rotational axis A97. A stop pin 987C is secured to the support structure 982 (FIG. 12) and extends through the elongated hole 987B to define a maximum pivot angle of the second input member 987.

As seen in FIGS. 12 and 13, the second operating structure 70 includes a second positioning structure 78 to position the second take-up member 976 at a plurality of control positions. The second positioning structure 78 is configured to selectively maintain the second take-up member 976 at a plurality of control positions.

The second positioning structure 78 is coupled to the second take-up member 976 to position the second take-up member 976 relative to the base member 40 at each of a first control position P941 and a second control position P942 relative to the base member 40. In this embodiment, the second positioning structure 78 is coupled to the second take-up member 976 to position the second take-up member 976 relative to the base member 40 at each of only two control positions (the first control position P941 and the second control position P942) relative to the base member 40. However, the total number of the control positions is not limited to this embodiment and it can be three and more.

The inner wire C22 is pulled relative to the outer casing C21 and the base member 40 when the second take-up member 976 is pivoted relative to the base member 40 about the rotational axis A97 from the first control position P941 to the second control position P942. The inner wire C22 is released (returned) relative to the outer casing C21 and the base member 40 when the second take-up member 976 is returned relative to the base member 40 about the first pivot axis A1 from the second control position P942 to the first control position P941.

As seen in FIG. 13, the second take-up member 976 is configured to pull the second mechanical control cable C2 when the second operating member 44 is moved relative to the base member 40 in the first direction D51. The second take-up member 976 is configured to release the second mechanical control cable C2 when the second operating member 44 is moved relative to the base member 40 in the first direction D51. In other words, a movement direction of the second operating member 44 to pull the second mechanical control cable C2 is the same as a movement direction of the second operating member 44 to release the second mechanical control cable C2. However, the movement directions of the second operating member 44 to pull and release the second mechanical control cable C2 can be different from each other. For example, the movement direction of the second operating member 44 to pull the second mechanical control cable C2 can be the first direction D51, and the movement direction of the second operating member 44 to release the second mechanical control cable C2 can be the second direction D52.

Specifically, the second operating member 44 is movable relative to the base member 40 in the first direction D51 to provide a first movement M1. In this embodiment, the first movement M1 is a pivotal movement of the second operating member 44. The second positioning structure 78 is coupled to the second operating member 44 to move the second take-up member 976 such that the second mechanical control cable C2 is moved in the second pulling direction D41 and the second releasing direction D42 alternatingly in response to the first movement M1 of the second operating member 44.

As seen in FIGS. 10 to 13, the second positioning structure 78 includes a positioning member 980 and a first biasing element 981. The positioning member 980 is pivotally coupled to a support structure 982 (FIG. 10) about a positioning pivot axis A94 via a pivot pin 980A. The positioning member 980 includes a positioning pawl contactable with the second take-up member 976. The positioning member 980 is pivotally coupled to the first support plate 982A and the second support plate 982B. The first biasing element 981 is mounted to the support structure 982 to bias the positioning member 980 to keep in contact with the second take-up member 976. The first biasing element 981 biases positioning pawl of the positioning member 980 toward the second take-up member 976. The positioning pawl contacts the second take-up member 976 to prevent the second take-up member 976 from rotating in the second releasing direction D62.

The second take-up member 976 includes a cable attachment part 983, a first positioning abutment 984, a second positioning abutment 985, and a control biasing element 986. An end of the inner wire C22 of the second mechanical control cable C2 is attached to the cable attachment part 983. The first positioning abutment 984 is circumferentially spaced apart from the second positioning abutment 985. The control biasing element 986 is mounted to the support structure 982 to bias the second take-up member 976 toward the first control position P941 in the second direction D52.

Figure 14:
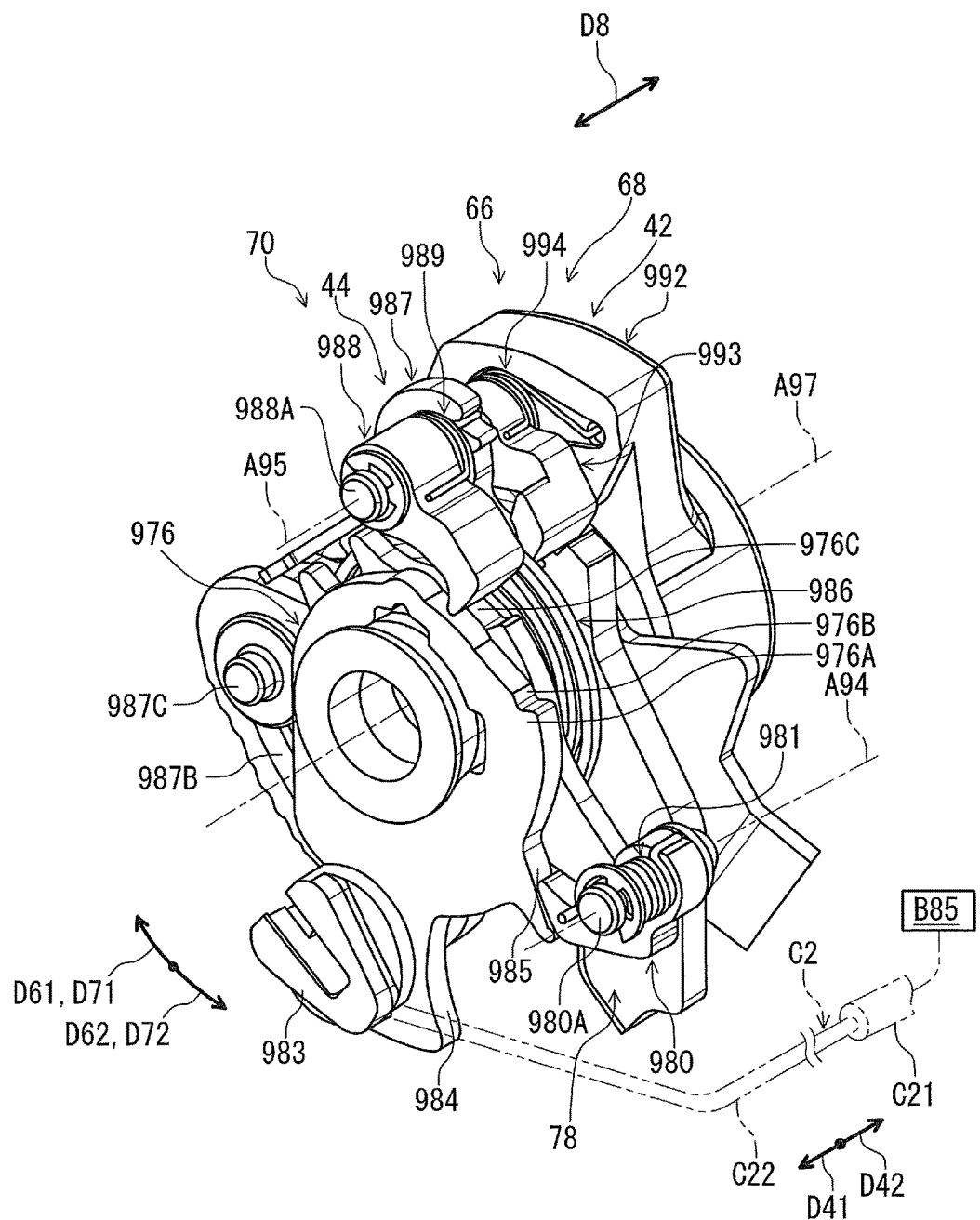
FIG. 14 is a perspective view of the cable operating structure of the bicycle operating device illustrated in FIG. 6, with the support structure omitted (second control position).
Figure 15:
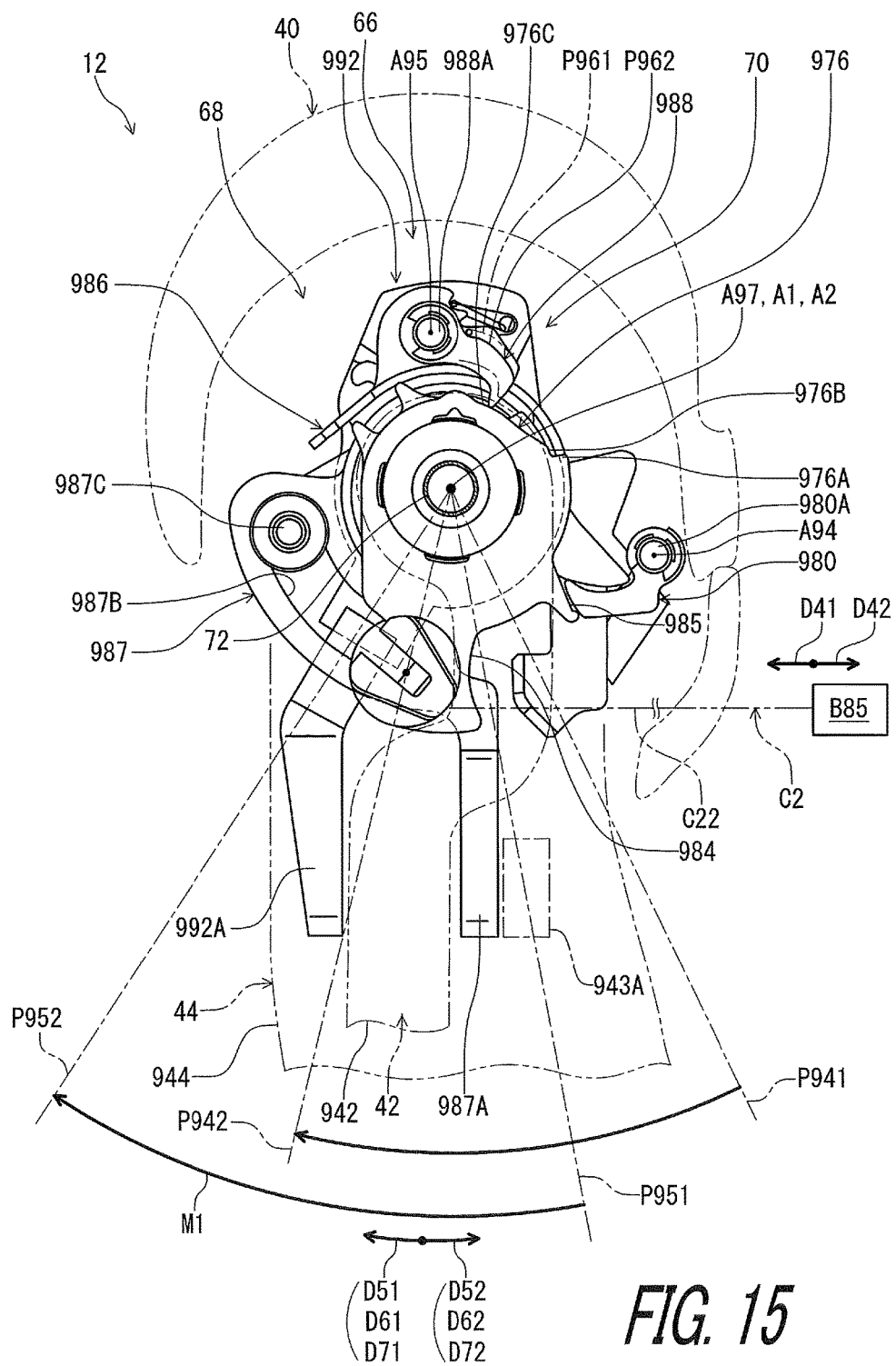
FIG. 15 is a front view of the cable operating structure of the bicycle operating device illustrated in FIG. 6, with the support structure omitted (second control position).

As seen in FIGS. 11 and 13, the second take-up member 976 is positioned at the first control position P941 in a state where the positioning member 980 is in contact with the first positioning abutment 984. As seen in FIGS. 14 and 15, the second take-up member 976 is positioned at the second control position P942 in a state where the positioning member 980 is in contact with the second positioning abutment 985.

The second take-up member 976 includes an actuation abutment 976A, a first contact surface 976B, and a second contact surface 976C. The actuation abutment 976A is adjacent to the first contact surface 976B. The first contact surface 976B is closer to the actuation abutment 976A than the second contact surface 976C. The second actuation biasing element 989 biases the second actuating member 988 toward the second take-up member 976.

As seen in FIGS. 11 and 13, the second actuating member 988 keeps in contact with the first contact surface 976B in a state where the second take-up member 976 is positioned at the first control position P941 because of a biasing force of the second actuation biasing element 989. The second actuating member 988 is positioned at a second actuation position P962 in a state where the second actuating member 988 is in contact with the first contact surface 976B. The second actuating member 988 is contactable with the actuation abutment 976A in a state where the second actuating member 988 is positioned at a second actuation position P962. In this state, the first movement M1 of the first operating member 42 is transmitted to the second take-up member 976 via the second input member 987 and the second actuating member 988.

As seen in FIGS. 14 and 15, the second actuating member 988 keeps in contact with the second contact surface 976C of the second take-up member 976 in a state where the second take-up member 976 is positioned at the second control position P942 because of the biasing force of the second actuation biasing element 989. The second actuating member 988 is positioned at a second additional actuation position P962 in a state where the second actuating member 988 is in contact with the second contact surface 976C. The second actuating member 988 is not contactable with the actuation abutment 976A in a state where the second actuating member 988 is positioned at the second additional actuation position P962 because of an enough distance between the second actuating member 988 and the actuation abutment 976A. In this state, the first movement M1 of the first operating member 42 is not transmitted to the second take-up member 976 via the second input member 987 and the second actuating member 988.

Figure 16:
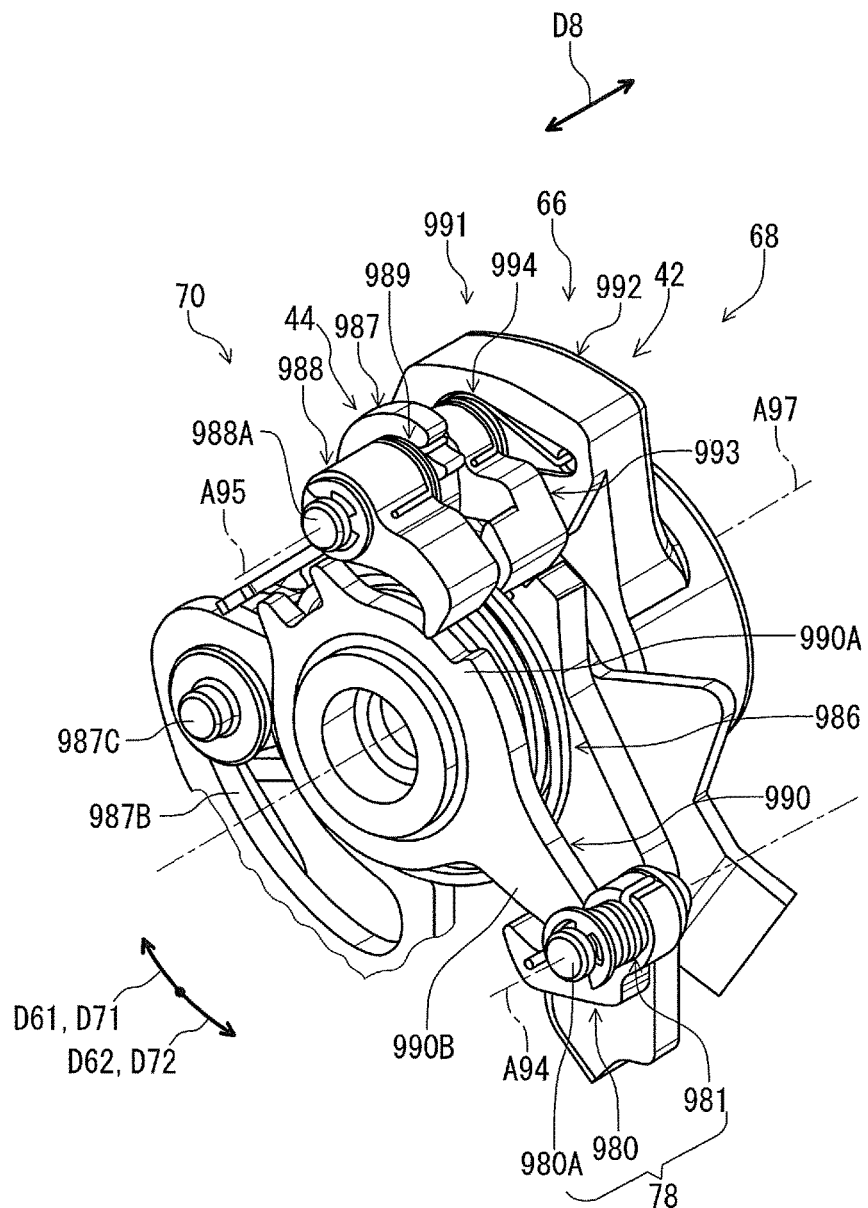
FIG. 16 is a perspective view of the cable operating structure of the bicycle operating device illustrated in FIG. 6, with the support structure and a cable control body omitted.
Figure 17:
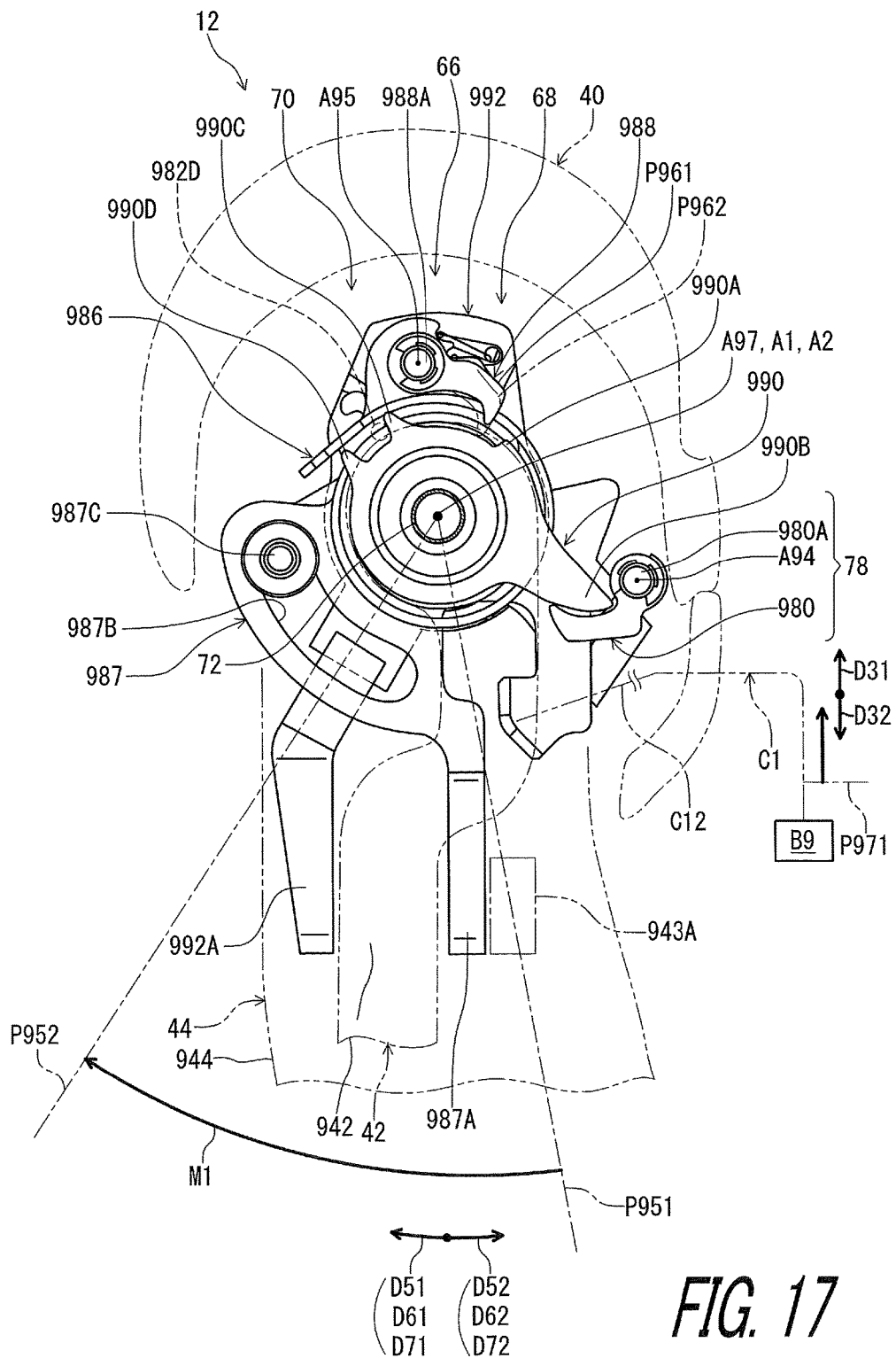
FIG. 17 is a front view of the cable operating structure of the bicycle operating device illustrated in FIG. 6, with the support structure and the cable control body omitted.

As seen in FIGS. 16 and 17, the second positioning structure 78 includes a release member 990. The release member 990 is pivotally coupled to the base member 40 about the rotational axis A97. The release member 990 includes a release abutment 990A and a release pawl 990B. The second actuating member 988 is contactable with the release abutment 990A in a state where the second actuating member 988 is positioned at the second additional actuation position P962. The release pawl 990B is contactable with the positioning member 980 in a state where the second actuating member 988 is engaged with one of the first positioning abutment 984 and the second positioning abutment 985. In this state, the first movement M1 of the first operating member 42 is transmitted to the release member 990 via the second input member 987 and the second actuating member 988. This pivots the positioning member 980 about the positioning pivot axis A94 against a biasing force of the first biasing element 981 to move away from the second take-up member 976. The positioning member 980 is not contactable with the second positioning abutment 985 in a state where the release pawl 990B moves the positioning member 980 away from the second take-up member 976. However, the positioning member 980 is contactable with the first positioning abutment 984 in the state where the release pawl 990B moves the positioning member 980 away from the second take-up member 976.

The second actuating member 988 is spaced apart from the actuation abutment 976A in a state where the second take-up member 976 is positioned at the second control position P942. The second actuating member 988 is not contactable with the actuation abutment 976A in the state where the second actuating member 988 is positioned at the second engagement position. In this state, the first movement M1 of the first operating member 42 is not transmitted to the second take-up member 976 via the second input member 987 and the second actuating member 988.

The release pawl 990B is contactable with the positioning member 980. The release pawl 990B pivots the positioning member 980 about the positioning pivot axis A94 to move away from the second take-up member 976 when the release member 990 is pivoted about the rotational axis A97 in response to the first movement M1 of the first operating member 42.

As seen in FIG. 17, the release member 990 includes a first protrusion 990C and a second protrusion 990D. The first protrusion 990C is spaced apart from the second protrusion 990D. The stop pin 987C is contactable with the first protrusion 990C and the second protrusion 990D. The stop pin 987C defines a pivot angle of the release member 990. The first biasing element 981 biases the release member 990 via the positioning member 980 so that the first protrusion 990C is in contact with the stop pin 987C.

As seen in FIGS. 18 to 21, the first operating structure 68 comprises a first take-up member 995, the first operating member 42, and a first actuating member 993. The first take-up member 995 is movable relative to the base member 40 to move the first mechanical control cable C1 in a first pulling direction D31 and a first releasing direction D32 opposite to the first pulling direction D31. In this embodiment, the first take-up member 995 is coupled to the first operating member 42 to move the first mechanical control cable C1 relative to the base member 40 in the first pulling direction D31 and the first releasing direction D32 opposite to the first pulling direction D31 in response to the movement of the first operating member 42. The first pulling direction D31 and the first releasing direction D32 are defined along the first mechanical control cable C1. An end of the inner wire C12 of the first mechanical control cable C1 is coupled to the first take-up member 995.

In this embodiment, the first take-up member 995 is rotatably coupled to the base member 40 about the rotational axis A97. However, the first take-up member 995 can be rotatably coupled to the base member 40 about another rotational axis different from the rotational axis A97.

Figure 18:
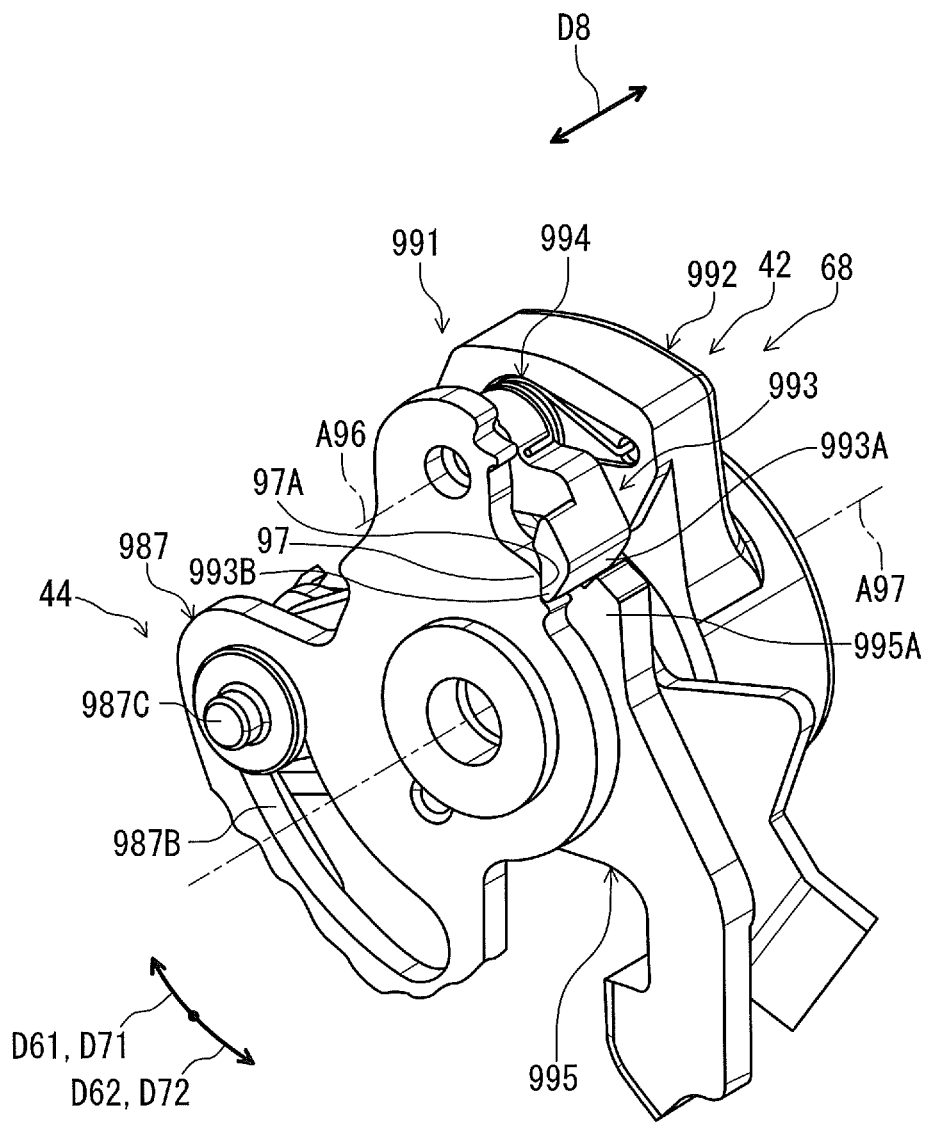
FIG. 18 is a perspective view of the cable operating structure of the bicycle operating device illustrated in FIG. 6, with the support structure, the cable control body, and a release member omitted.

As seen in FIG. 18, the first actuating member 993 is operatively coupled with the first take-up member 995 to actuate the first take-up member 995 to move in at least one of a first pulling actuation direction D71 and a first releasing actuation direction D72. The first actuating member 993 is operatively coupled with the first take-up member 995 to actuate the first take-up member 995 to move in the first pulling actuation direction D71 and the first releasing actuation direction D72. In this embodiment, the first pulling actuation direction D71 is the same direction as the second pulling actuation direction D61 (FIG. 16). The first releasing actuation direction D72 is the same direction as the second releasing actuation direction D62 (FIG. 16). However, the first pulling actuation direction D71 can be different from the second pulling actuation direction D61, and the first releasing actuation direction D72 can be different from the second releasing actuation direction D62.

As seen in FIGS. 18 to 21, the first operating structure 68 is configured such that the first take-up member 995 is movable relative to the base member 40 between the first rest position P21 and the first operated position P22 without mechanically positioning the first mechanical control cable C1 relative to the base member 40 during a movement of the first operating member 42 between the first rest position P21 and the first operated position P22.

In the present application, the term "mechanically positioning" as used herein refers to as positioning a movable element such as an inner wire of a mechanical control cable relative to a stationary element such as the base member 40 at a predetermined position in a state where an operating member such as the first operating member 42 or the second operating member 44 is not operated by the user. The inner wire of the mechanical control cable is returned to a cable rest position when the operating member is released by the user after the operating member is operated from a rest position to an operated position.

The first operating structure 68 moves the first mechanical control cable C1 from a first cable rest position P971 relative to the base member 40 in response to a movement of only the first operating member 42. In this embodiment, the first operating structure 68 moves the first mechanical control cable C1 from the first cable rest position P971 relative to the base member 40 in response to a movement of only the first operating member 42.

The first operating member 42 is positioned at the first rest position P21 relative to the base member 40 in a state where the first operating member 42 is not operated by the user. The first operating member 42 is not mechanically positioned relative to the base member 40 at any position other than the first rest position P21.

Figure 19:
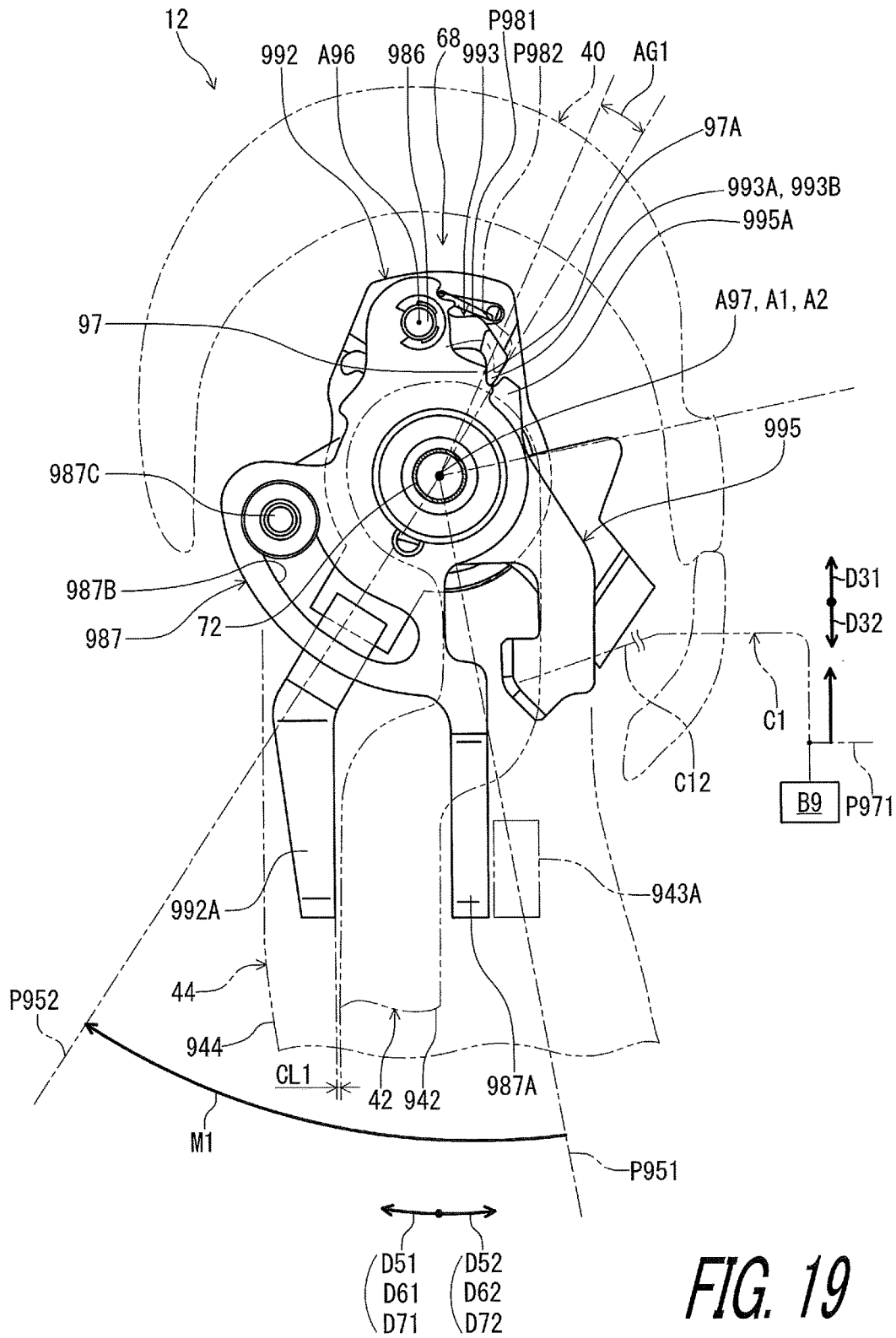
FIG. 19 is a front view of the cable operating structure of the bicycle operating device illustrated in FIG. 6, with the support structure, the cable control body, and the release member omitted.

As seen in FIG. 19, the first actuating member 993 is movable relative to the first operating member 42 between a first actuation position P981 and a first non-actuation position P982. At the first actuation position P981, the movement of the first operating member 42 is transmitted to the first take-up member 995 via the first actuating member 993. At the first non-actuation position P982, the movement of the first operating member 42 is not transmitted to the first take-up member 995 via the first actuating member 993. The first non-actuation position P982 is farther from the first take-up member 995 than the first actuation position P981. The first actuation position P981 and the first non-actuation position P982 are defined based on an end (a portion contactable with the take-up member 976) of the first actuating member 993.

The first actuating member 993 is operatively coupled with the first take-up member 995 to actuate the first take-up member 995 to move in at least one of a first pulling actuation direction D71 and a first releasing actuation direction D72. In this embodiment, the first actuating member 993 is operatively coupled with the first take-up member 995 to actuate the first take-up member 995 to move in the first pulling actuation direction D71. However, the first actuating member 993 can be operatively coupled with the first take-up member 995 to actuate the first take-up member 995 to move in the first releasing actuation direction D72 or both the first pulling actuation direction D71 and the first releasing actuation direction D72.

The first actuating member 993 is attached to the first operating member 42. The first actuating member 993 is pivotably coupled to the first operating member 42 about a first actuation pivot axis A96. In this embodiment, the first operating member 42 includes a first operating body 942 and a first input member 992. The first operating body 942 is pivotally coupled to the base member 40 about the first pivot axis A1 (FIG. 9). The first input member 992 is pivotally coupled to the base member 40 about the rotational axis A97. The first input member 992 is pivotally mounted on the third shaft 72 (FIG. 9). The first operating body 942 is contactable with the first input member 992 to transmit a pivotal movement of the first operating body 942 to the first input member 992 in the first direction D51. The first actuating member 993 is pivotally coupled to the first input member 992 about the first actuation pivot axis A96.

As seen in FIG. 19, the first input member 992 includes a first transmission part 992A. The first transmission part 992A is contactable with the first operating body 942. The first input member 992 is pivoted relative to the base member 40 about the rotational axis A97 in the first direction D51 when only the first operating member 42 is pivoted relative to the base member 40 about the first pivot axis A1 from the first rest position P21 to the first operated position P22. The first and second input members 992 and 987 are pivoted relative to the base member 40 about the rotational axis A97 in the first direction D51 when the second operating member 44 is pivoted relative to the base member 40 about the second pivot axis A2 from the second rest position P951 to the second operated position P952.

The first actuating member 993 is pivotally coupled to the first input member 992 about the first actuation pivot axis A96 via a pivot pin 996. The first actuating member 993 includes a first actuation pawl 993A contactable with the first take-up member 995. The first operating structure 68 includes a first actuation biasing element 994. The first actuation biasing element 994 is mounted to the first input member 992 to bias the first actuating member 993 to keep in contact with the first take-up member 995.

Figure 20:
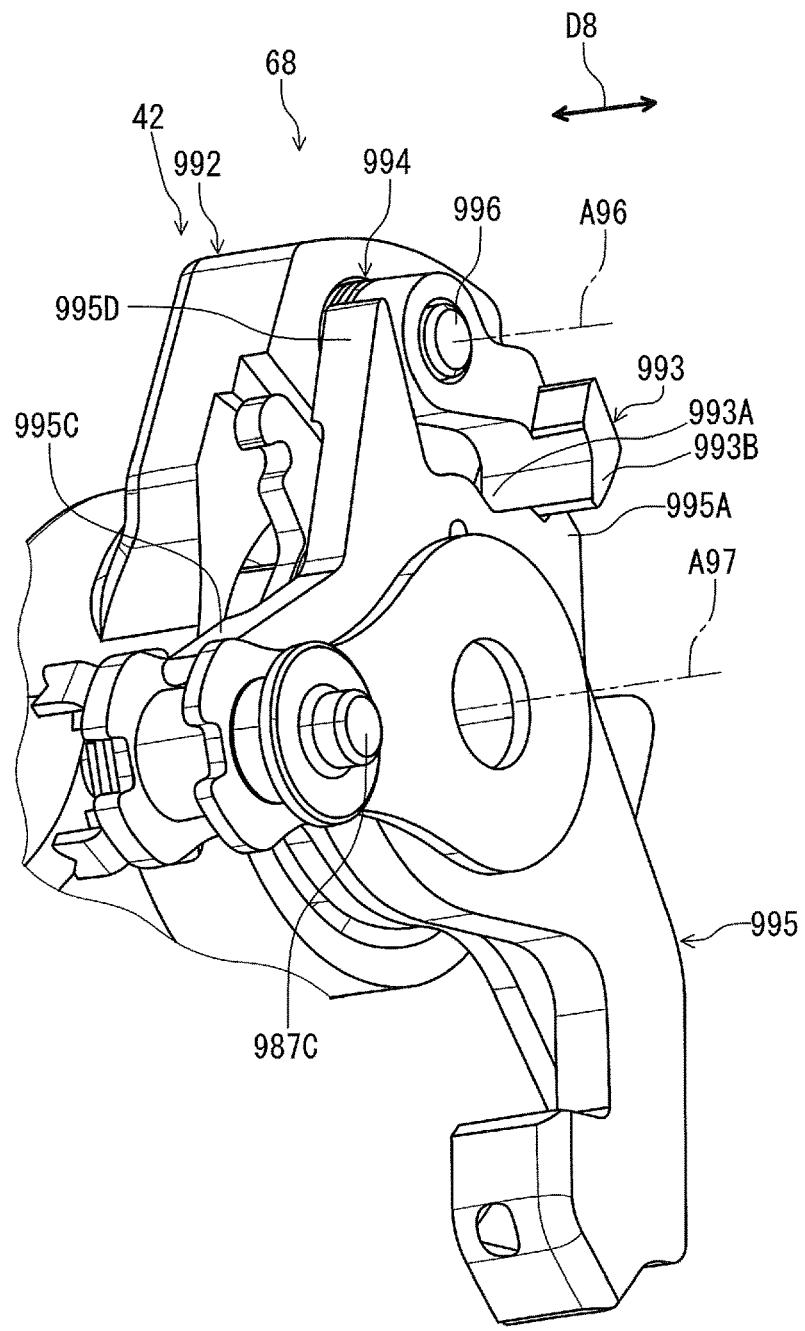
FIG. 20 is a perspective view of the cable operating structure of the bicycle operating device illustrated in FIG. 6, with the support structure, the cable control body, the release member, and a first input member omitted.
Figure 21:
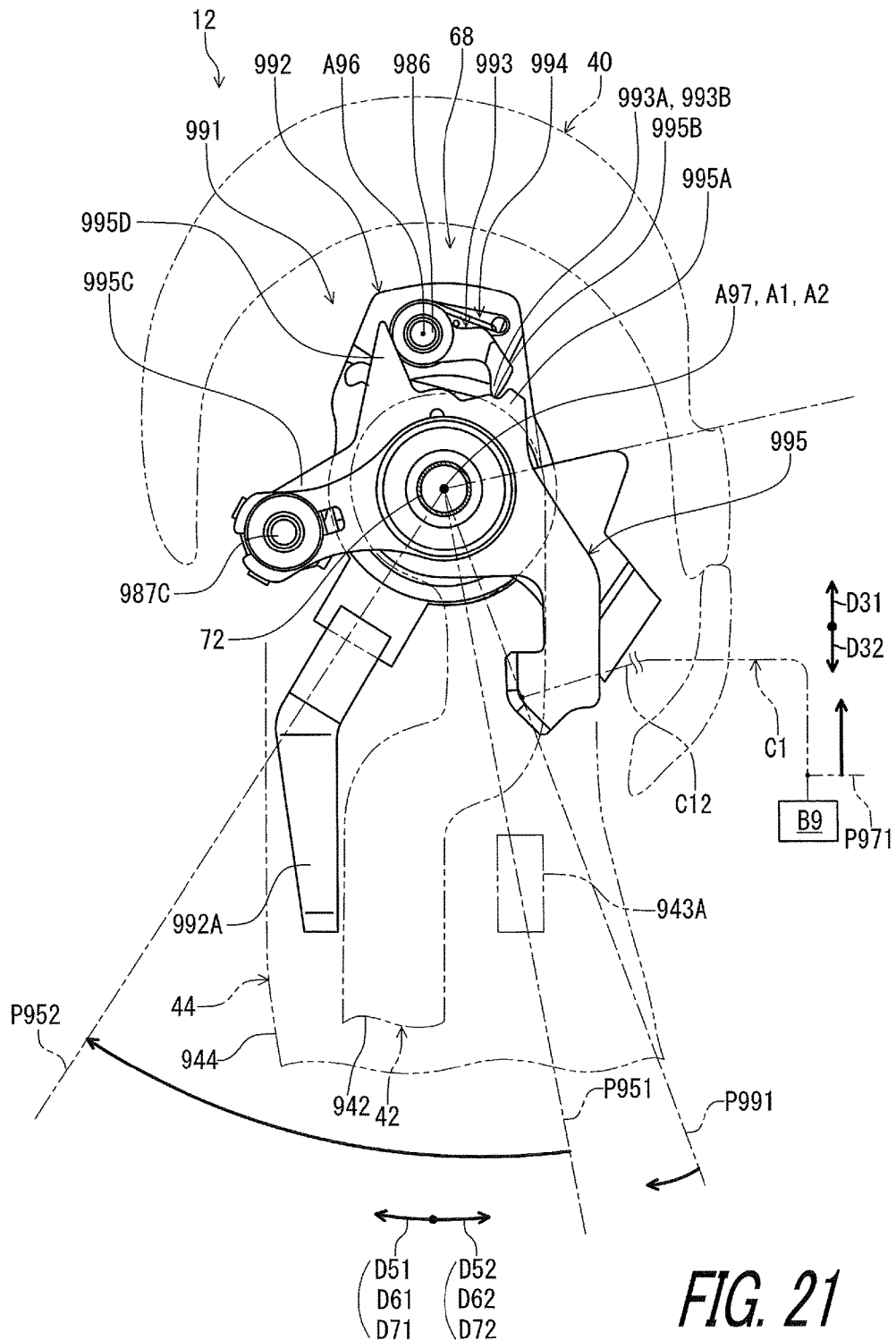
FIG. 21 is a front view of the cable operating structure of the bicycle operating device illustrated in FIG. 6, with the support structure, the cable control body, the release member, and the first input member omitted.

As seen in FIGS. 20 and 21, the first take-up member 995 includes an actuation abutment 995A and a third contact surface 995B. The actuation abutment 995A is adjacent to the third contact surface 995B. The first actuating member 993 is contactable with the actuation abutment 995A in a state where the first actuating member 993 is in contact with the third contact surface 995B. The first actuation biasing element 994 is mounted to the first input member 992 to bias the first actuating member 993 to keep in contact with the third contact surface 995B. In this state, the pivotal movement of the first operating body 942 is transmitted to the first take-up member 995 via the first input member 992 and the first actuating member 993.

The first take-up member 995 includes a stopper 995C and a receiving portion 995D. The stopper 995C is contactable with the stop pin 987C. The receiving portion 995D is contactable with the first actuating member 993. The first take-up member 995 is at an additional rest position P991 in a state where the stopper 995C is in contact with the stop pin 987C. The first input member 992 is at a rest position in a state where the receiving portion 995D is in contact with the first actuating member 993. The first mechanical control cable C1 is at the first cable rest position P971 in a state where the first take-up member 995 is at the additional rest position P991.

As seen in FIG. 21, the first operating structure 68 maintains a position of the first mechanical control cable C1 at the first cable rest position P971 relative to the base member 40 in response to the movement of the first operating member 42. Specifically, the first operating structure 68 maintains a position of the first mechanical control cable C1 at the first cable rest position P971 relative to the base member 40 in response to a simultaneous movement of the first and the second operating members 42 and 44. The first operating structure 68 maintains a position of the inner wire C12 of the first mechanical control cable C1 at the first cable rest position P971 relative to the base member 40 in response to the simultaneous movement of the first and the second operating members 42 and 44.

As seen in FIGS. 18 and 19, the bicycle operating device 12 comprises a prevention member 97. The prevention member 97 is configured to move together with the second operating member 44 to prevent the first actuating member 993 from actuating the first take-up member 995 to move in at least one of the first pulling actuation direction D71 and the first releasing actuation direction D72 during a movement of the first operating member 42 from the first rest position P21 toward the first operated position P22. In this embodiment, the prevention member 97 is configured to move together with the second operating member 44 to prevent the first actuating member 993 from actuating the first take-up member 995 to move in the first pulling actuation direction D71 during the movement of the first operating member 42 from the first rest position P21 toward the first operated position P22. The prevention member 97 is in contact with the first actuating member 993.

As seen in FIG. 19, the prevention member 97 includes a first cam 97A to move the first actuating member 993 from the first actuation position P981 to the first non-actuation position P982 in response to the movement of the second operating member 44 from the second rest position P951 toward the second operated position P952. The first cam 97A is provided at the second operating member 44. In this embodiment, the first cam 97A is provided at the second input member 987 of the second operating member 44. The prevention member 97 is integrally provided with the second input member 987 as a one-piece unitary member. However, the prevention member 97 can be a separate member from the second input member 987.

As seen in FIG. 20, the first actuating member 993 includes a contact part 993B extending toward the prevention member 97 in an axial direction D8 parallel to the first actuation pivot axis A96. The first cam 97A is in contact with the contact part 993B. As seen in FIG. 10, the prevention member 97 is partly provided between the first actuating member 993 and the second actuating member 988. In this embodiment, the prevention member 97 is partly provided between the first actuating member 993 and the second actuating member 988 in the axial direction D8.

As seen in FIG. 19, the prevention member 97 pivots the first actuating member 993 relative to the first input member 992 about the first actuation pivot axis A96 when the second input member 987 is pivoted relative to the first input member 992 about the rotational axis A97. The prevention member 97 keeps the first actuating member 993 at the first non-actuation position P982 when the second input member 987 is pivoted relative to the first input member 992 by a pivotal angle AG1. The pivotal angle AG1 is defined by a clearance CL1 defined between the first operating body 942 and the first transmission part 992A. The first actuating member 993 is not contactable with the actuation abutment 995A even when the first input member 992 is pivoted about the rotational axis A97 in a state where the first actuating member 993 is positioned at the first non-actuation position P982 by the prevention member 97.

Namely, the first take-up member 995 is stationary relative to the base member 40 when the first operating member 42 and the second operating member 44 are pivoted together relative to the base member 40 about the first pivot axis A1. Thus, the first mechanical control cable C1 is not pulled when the first operating member 42 and the second operating member 44 are pivoted together relative to the base member 40 about the first pivot axis A1. The first mechanical control cable C1 is pulled when only the first operating member 42 is pivoted relative to the base member 40 about the first pivot axis A1.

Figure 22:
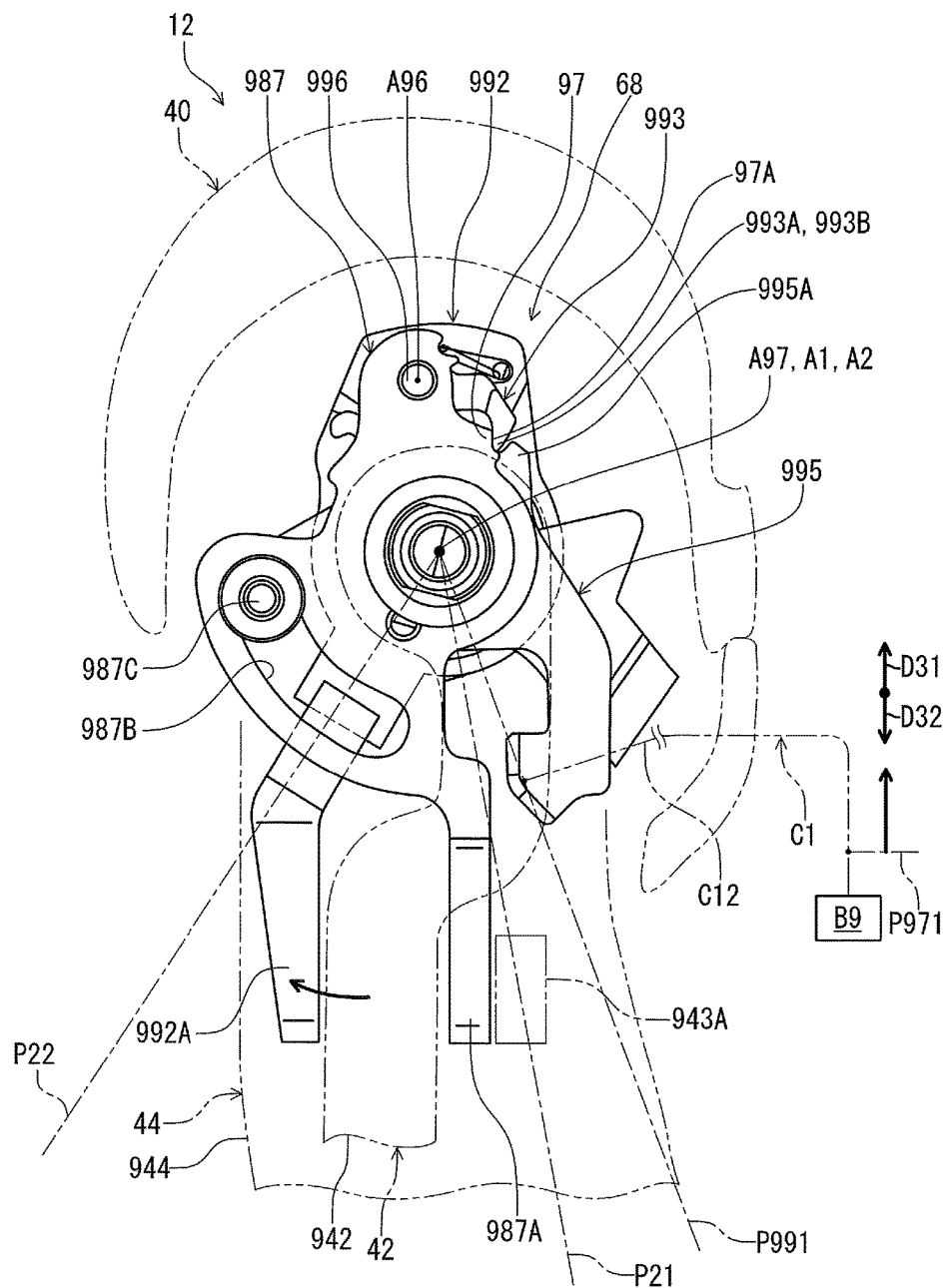
FIGS. 22 to 24 are front views of the cable operating structure of the bicycle operating device illustrated in FIG. 6 to show pulling and releasing operation of the bicycle operating device for a first mechanical control cable.
Figure 23:
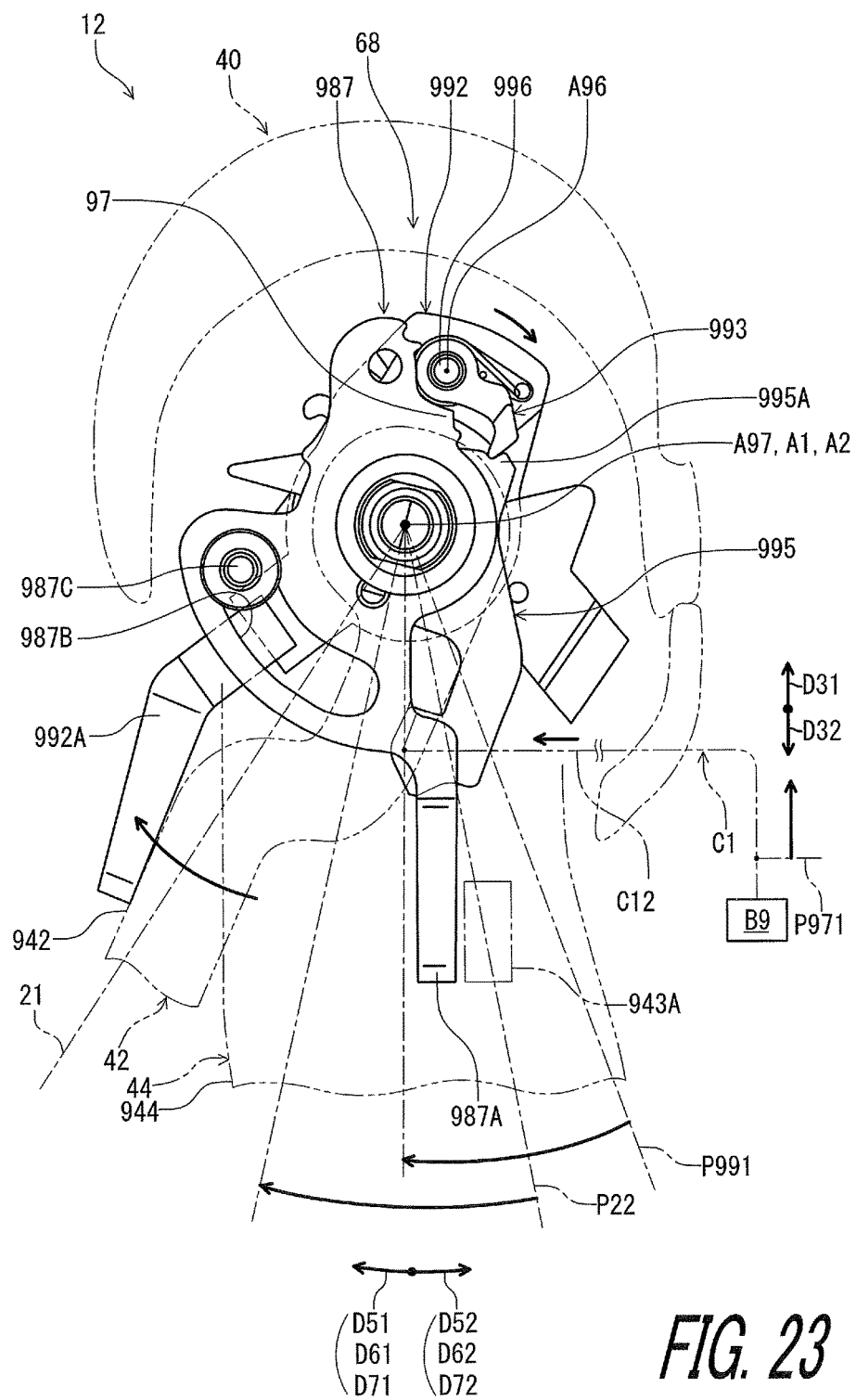
Figure 24:
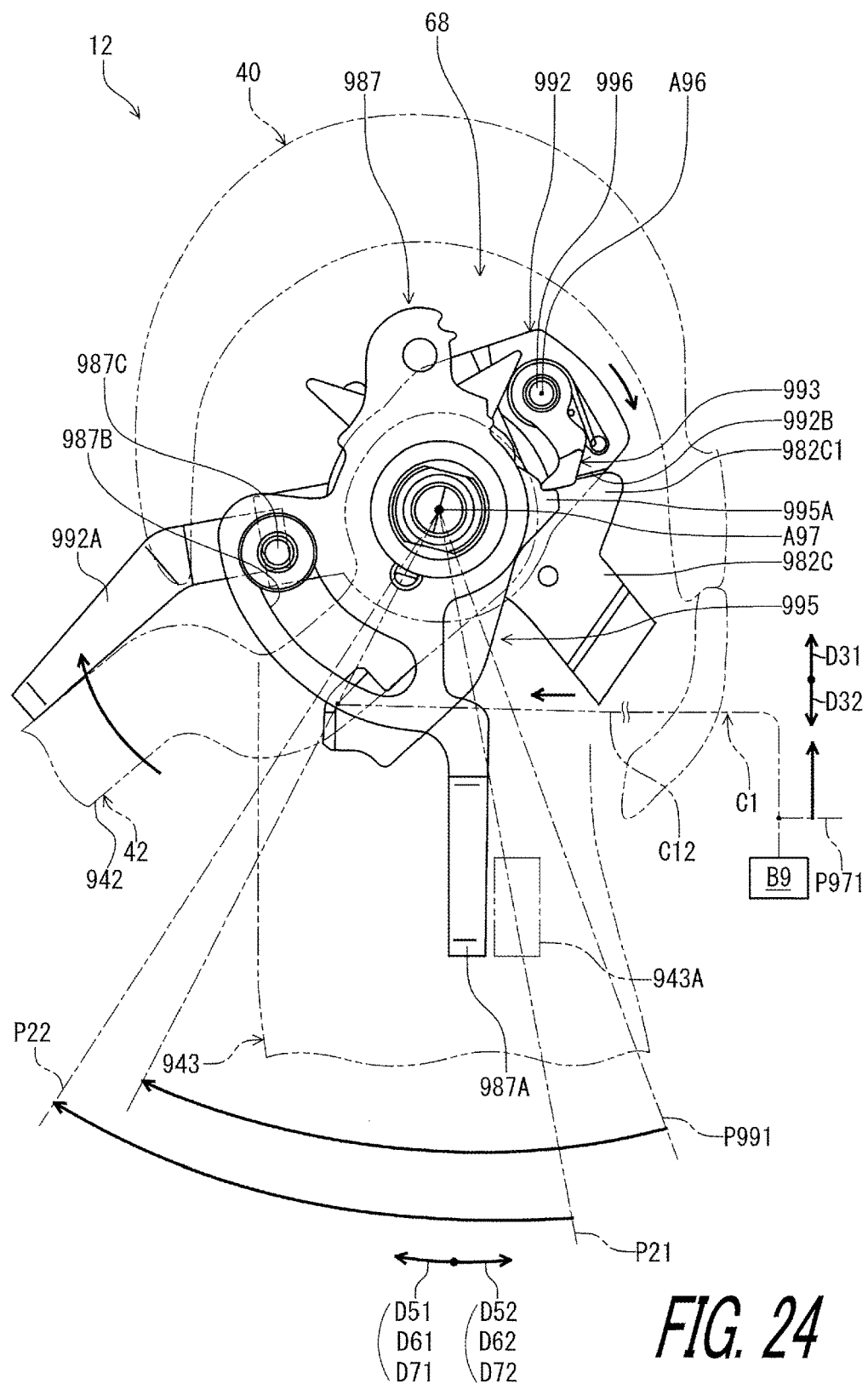

The pulling and releasing operation of the bicycle operating device 12 for the first mechanical control cable C1 will be described in detail below referring to FIGS. 22 to 24. FIG. 22 shows the bicycle operating device 12 in a non-operated state where the illustrated parts are in their rest positions. FIGS. 22 to 24 show the parts of the bicycle operating device 12 that are sequentially moved as the first operating member 42 is pivoted from the first rest position P21 to the first operated position P22 to perform the pulling operation of the first mechanical control cable C1.

As seen in FIGS. 22 and 23, when the first operating body 942 is pivoted by the user relative to the base member 40 about the first pivot axis A1 from the first rest position P21 toward the first operated position P22, the first transmission part 992A of the first input member 992 is pushed by the first operating body 942. Thus, the first input member 992 is pivoted relative to the base member 40 about the rotational axis A97 in the first direction D51 while the second operating member 44 (i.e., the second operating body 944 and the second input member 987) is stationary relative to the base member 40. This brings the first actuating member 993 into engagement with the actuation abutment 995A of the first take-up member 995.

As seen in FIGS. 23 and 24, when the first operating member 42 (i.e., the first operating body 942 and the first input member 992) is further pivoted relative to the base member 40 about the rotational axis A97 in the first direction D51, the first take-up member 995 is pivoted relative to the base member 40 about the rotational axis A97 in the first direction D51. Thus, the inner wire C12 of the first mechanical control cable C1 is pulled from the first cable rest position P971 in the first pulling direction D31 in response to the pivotal movement of the first operating member 42.

As seen in FIG. 24, a contact part 992B (FIGS. 10 and 24) of the first input member 992 comes into contact with a receiving part 982C1 (FIGS. 10 and 24) of the support structure 982 when the first operating member 42 reaches the first operated position P22. Thus, the first input member 992 is mechanically positioned at the first rest position P21. On the other hand, the first input member 992 is not mechanically positioned at the first operated position P22. The first input member 992 is pivoted relative to the base member 40 about the rotational axis A97 without being mechanically positioned at the first operated position P22. Thus, the first input member 992 is mechanically positioned at only one end of a rotational range defined by a rotational angle of the first input member 992. When the first operating member 42 is returned to the first rest position P21 by removing or reducing an operation force applied from the user to the first operating member 42, the inner wire C12 of the first mechanical control cable C1 is released (returned) to the first cable rest position P971 in the first releasing direction D32.

The pulling operation of the bicycle operating device 12 for the second mechanical control cable C2 will be described in detail below referring to FIGS. 12 and 25 to 30. FIG. 12 shows the bicycle operating device 12 in a non-operated state where the illustrated parts are in their rest positions. FIGS. 25 to 30 show the parts of the bicycle operating device 12 that are sequentially moved as the second operating member 44 is pivoted from the second rest position P951 to the second operated position P952 and then back to the second rest position P951 to perform the pulling operation of the second mechanical control cable C2.

Figure 25:
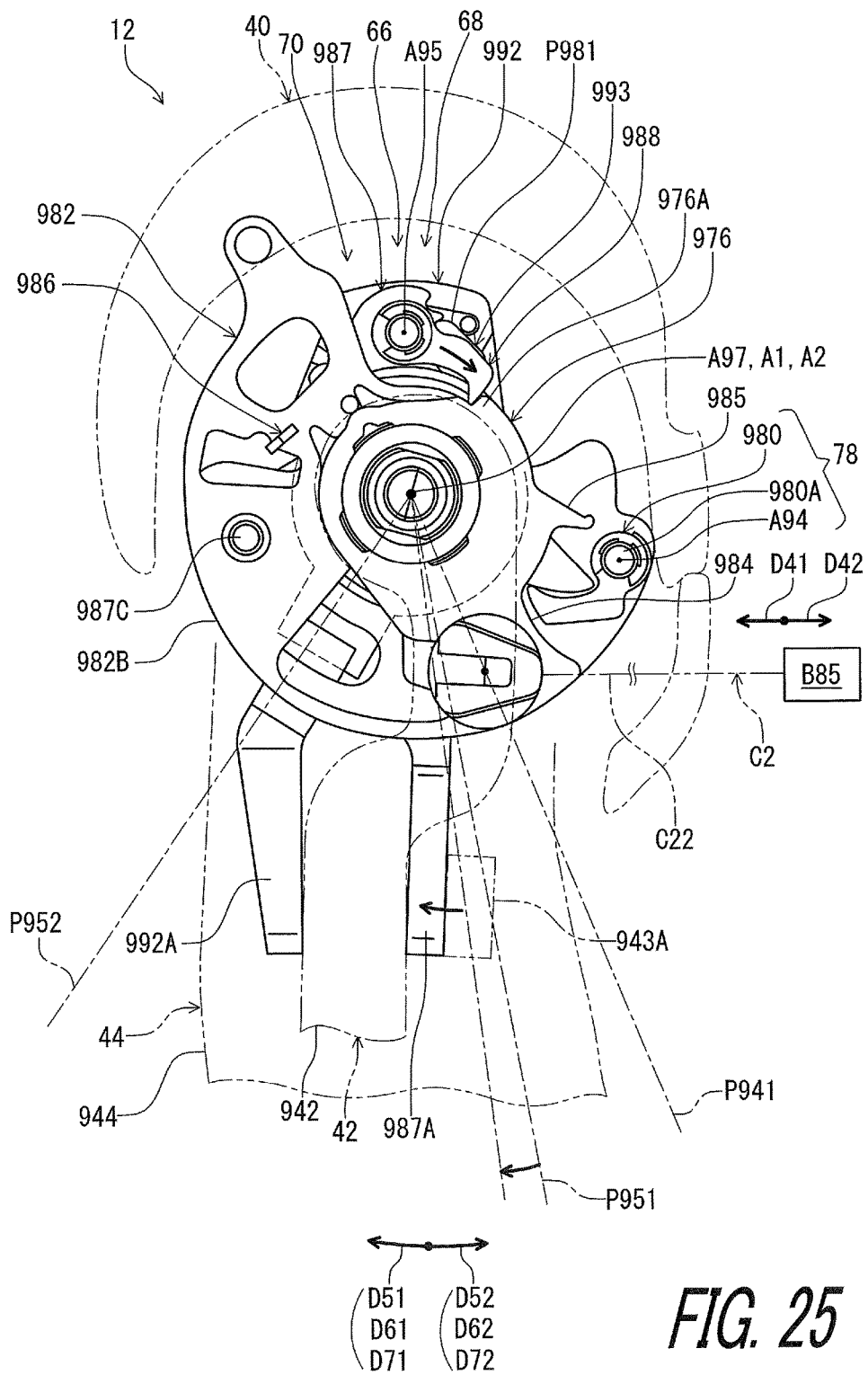
FIGS. 25 to 29 are front views of the cable operating structure of the bicycle operating device illustrated in FIG. 6 to show pulling operation of the bicycle operating device for a second mechanical control cable.

Specifically, as seen in FIG. 25, when the second operating body 944 is pivoted by the user relative to the base member 40 about the second pivot axis A2 from the second rest position P951 toward the second operated position P952, the first operating body 942 is pivoted relative to the base member 40 together with the second operating body 944 in the first direction D51 since the operating abutment 44C (FIG. 8) is in contact with the first operating body 942. At this time, the second transmission part 987A of the second input member 987 is pushed in the first direction D51 with the additional operating abutment 943A of the second operating body 944. Thus, the first operating body 942, the second operating body 944, and the second input member 987 are pivoted together relative to the base member 40 in the first direction D51.

Figure 26:
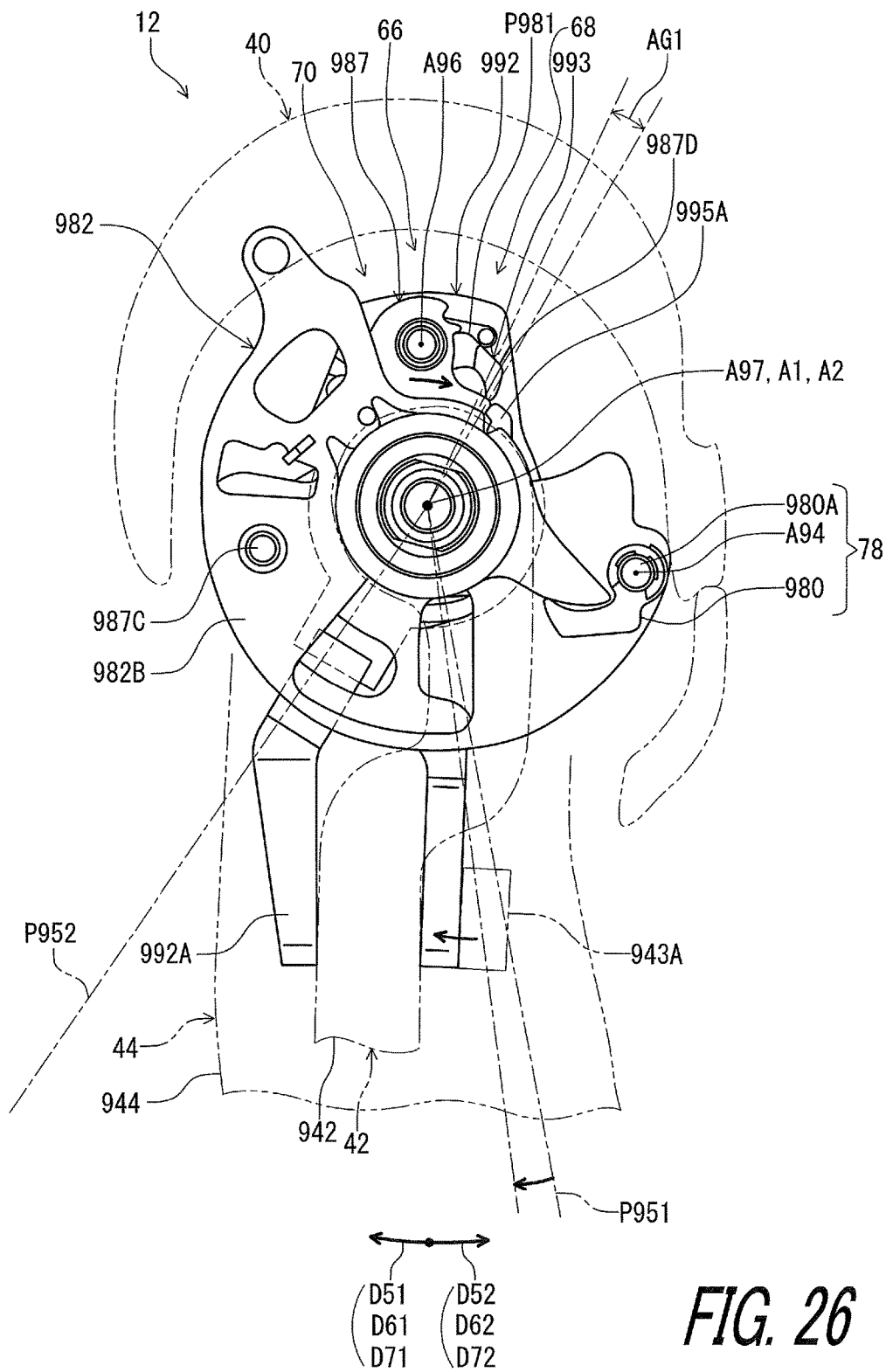

As seen in FIG. 19, however, the first transmission part 992A of the first input member 992 is spaced apart from the first operating body 942 by the clearance CL1. Thus, as seen in FIGS. 25 and 26, the first input member 992 is stationary relative to the base member 40 while the first operating body 942, the second operating body 944, and the second input member 987 are pivoted together relative to the base member 40 in the first direction D51 by the pivotal angle AG1 (FIG. 26). This causes the prevention member 97 to move the first actuating member 993 from the first actuation position P981 to the first non-actuation position P982. The first actuating member 993 is not engageable with the actuation abutment 995A of the first take-up member 995 in a state where the first actuating member 993 is at the first non-actuation position P982. Thus, the first take-up member 995 is stationary relative to the base member 40 even if the first input member 992 is pivoted relative to the first take-up member 995 in the first direction D51 together with the first operating body 942, the second operating body 944, and the second input member 987.

Figure 27:
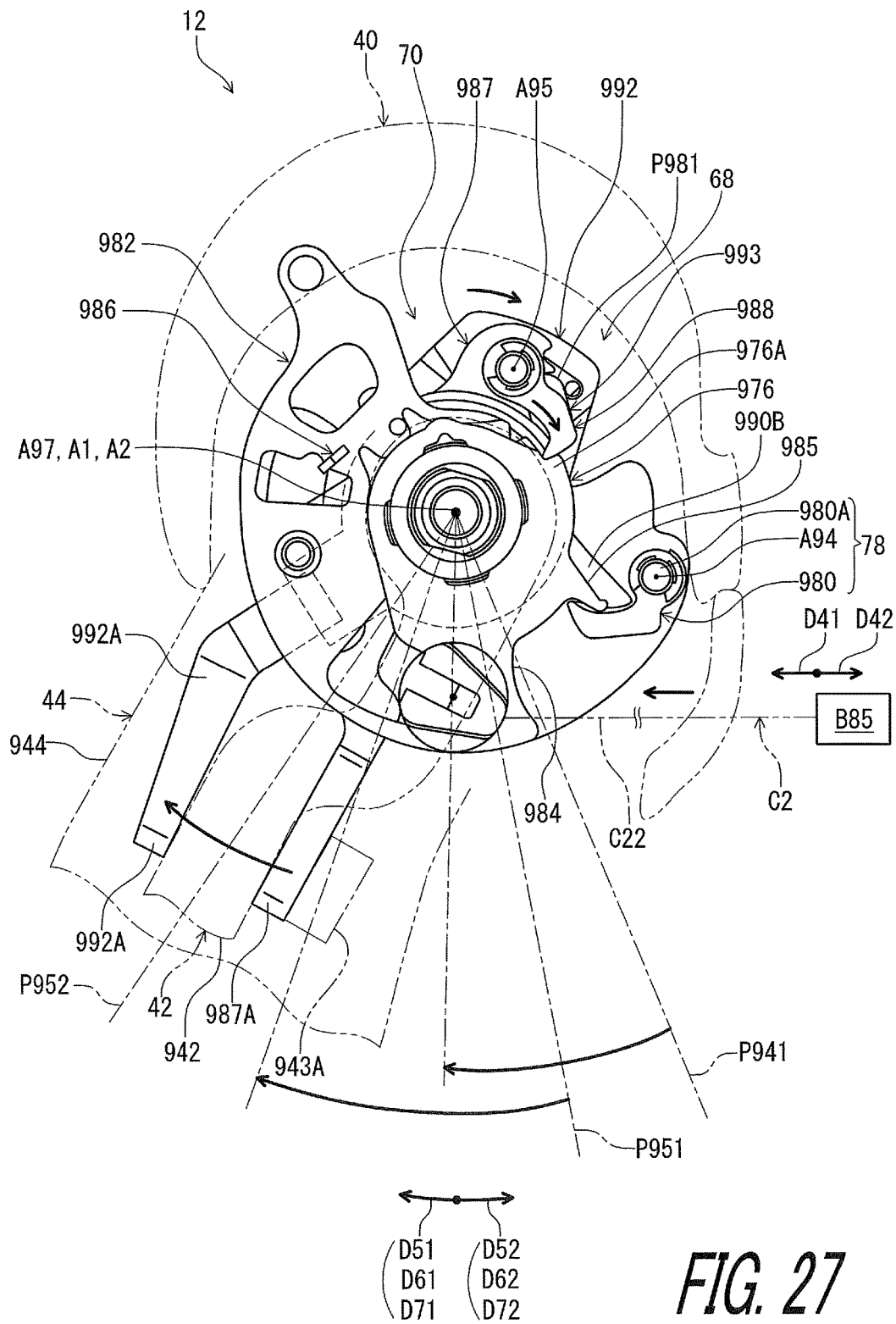

As seen in FIG. 27, the second input member 987, the first operating body 942, and the first input member 992 are integrally pivoted relative to the base member 40 together with the second operating body 944 in the first direction D51 when the second operating body 944 is further pivoted relative to the base member 40 about the rotational axis A97 in the first direction D51. The second actuating member 988 comes into engagement with the actuation abutment 976A of the second take-up member 976 in response to the pivotal movement of the second input member 987. Thus, the second take-up member 976 is pivoted relative to the base member 40 from the first control position P941 toward the second control position P942 in the second pulling actuation direction D61. The inner wire C22 of the second mechanical control cable C2 is pulled in the second pulling direction D41 in response to the pivotal movement of the second operating member 44.

Figure 28:
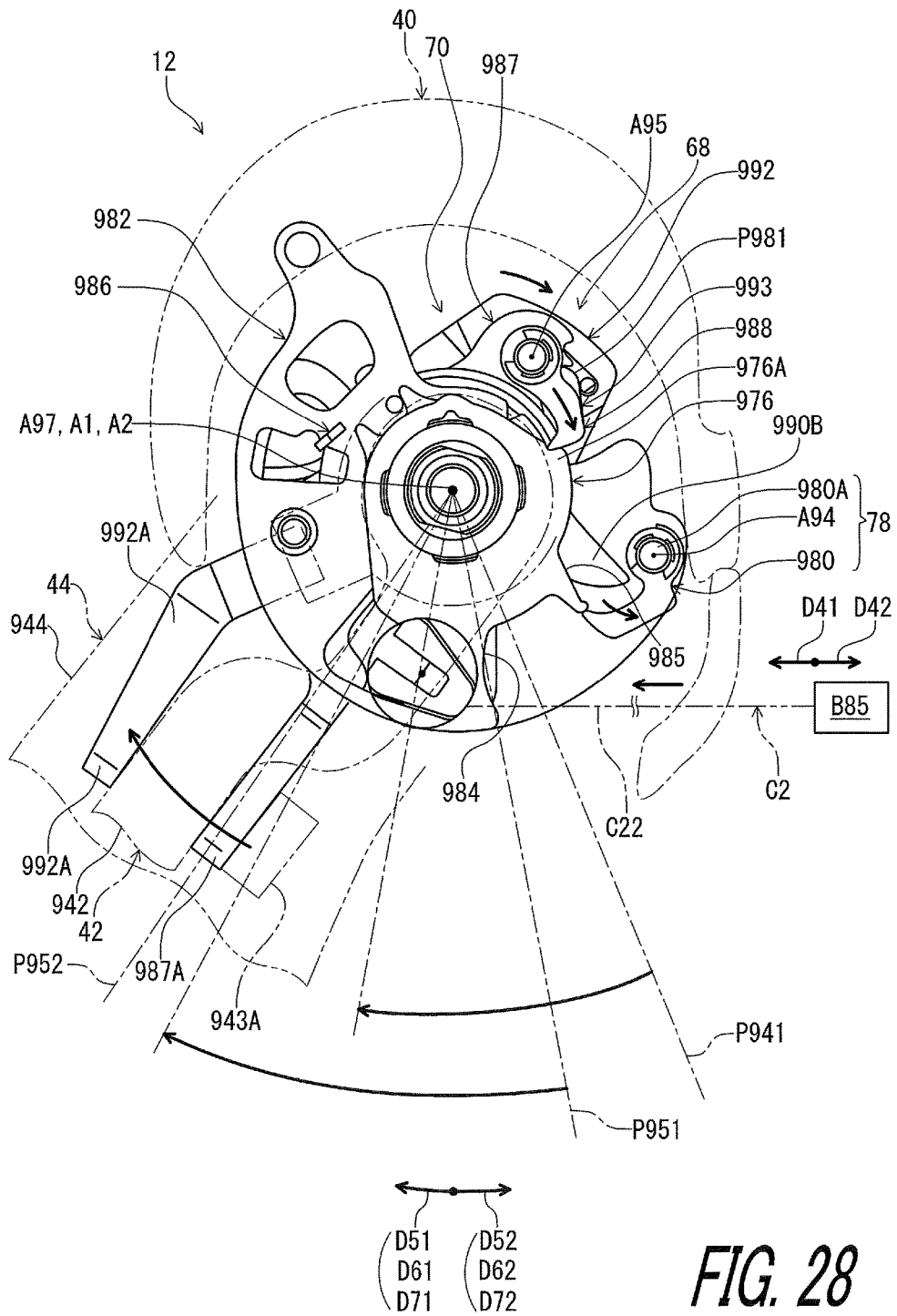

As seen in FIG. 28, the positioning member 980 is pivoted relative to the base member 40 about the positioning pivot axis A94 by the second positioning abutment 985 in response to the pivotal movement of the second take-up member 976.

Figure 29:
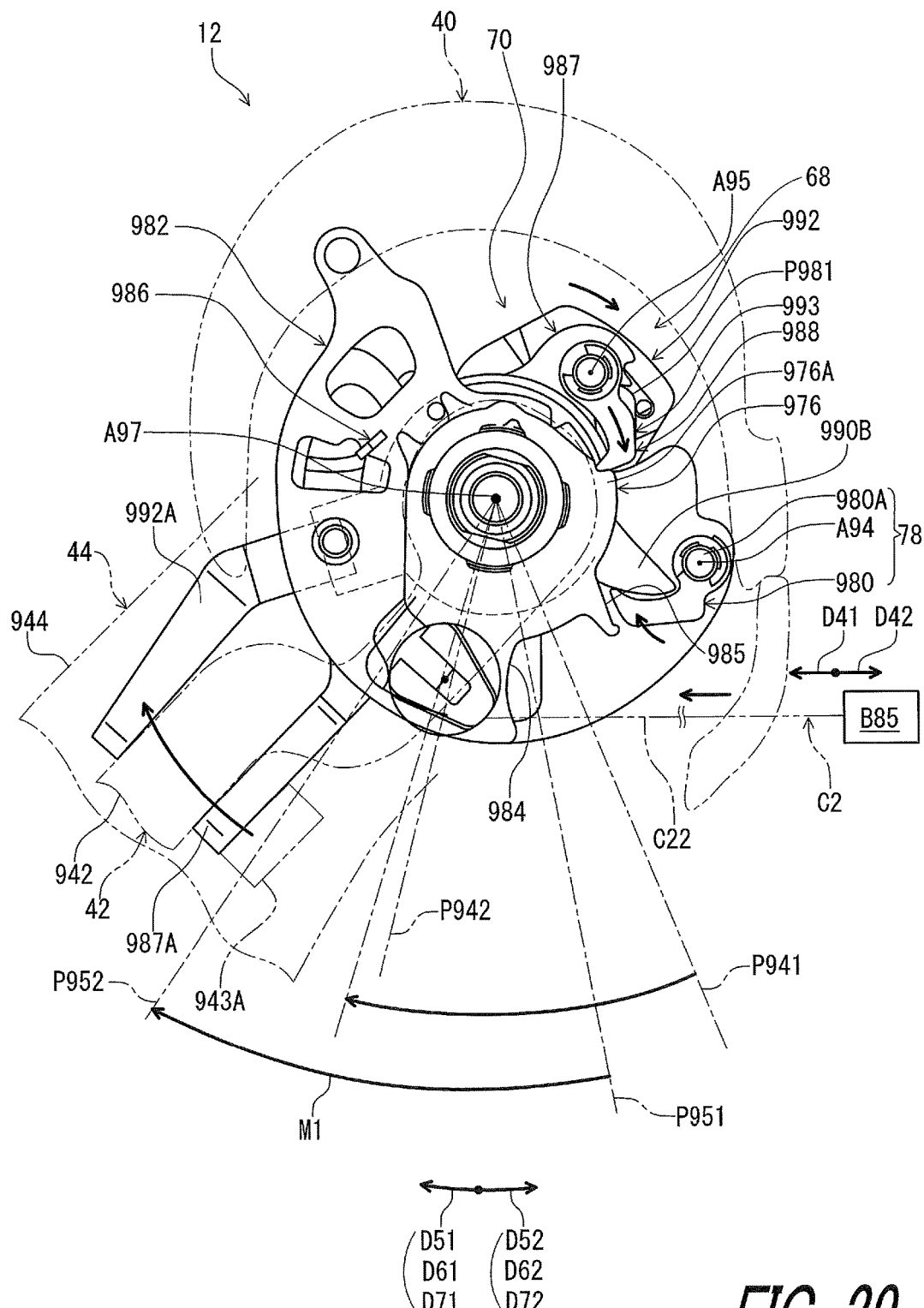

As seen in FIG. 29, the positioning member 980 is returned to an engagement position by the biasing force of the first biasing element 981 when the second take-up member 976 is further pivoted relative to the base member 40 beyond the second control position P942 in the first direction D51. In this state, the positioning member 980 is disposed between the second positioning abutment 985 and the release pawl 990B.

Figure 30:
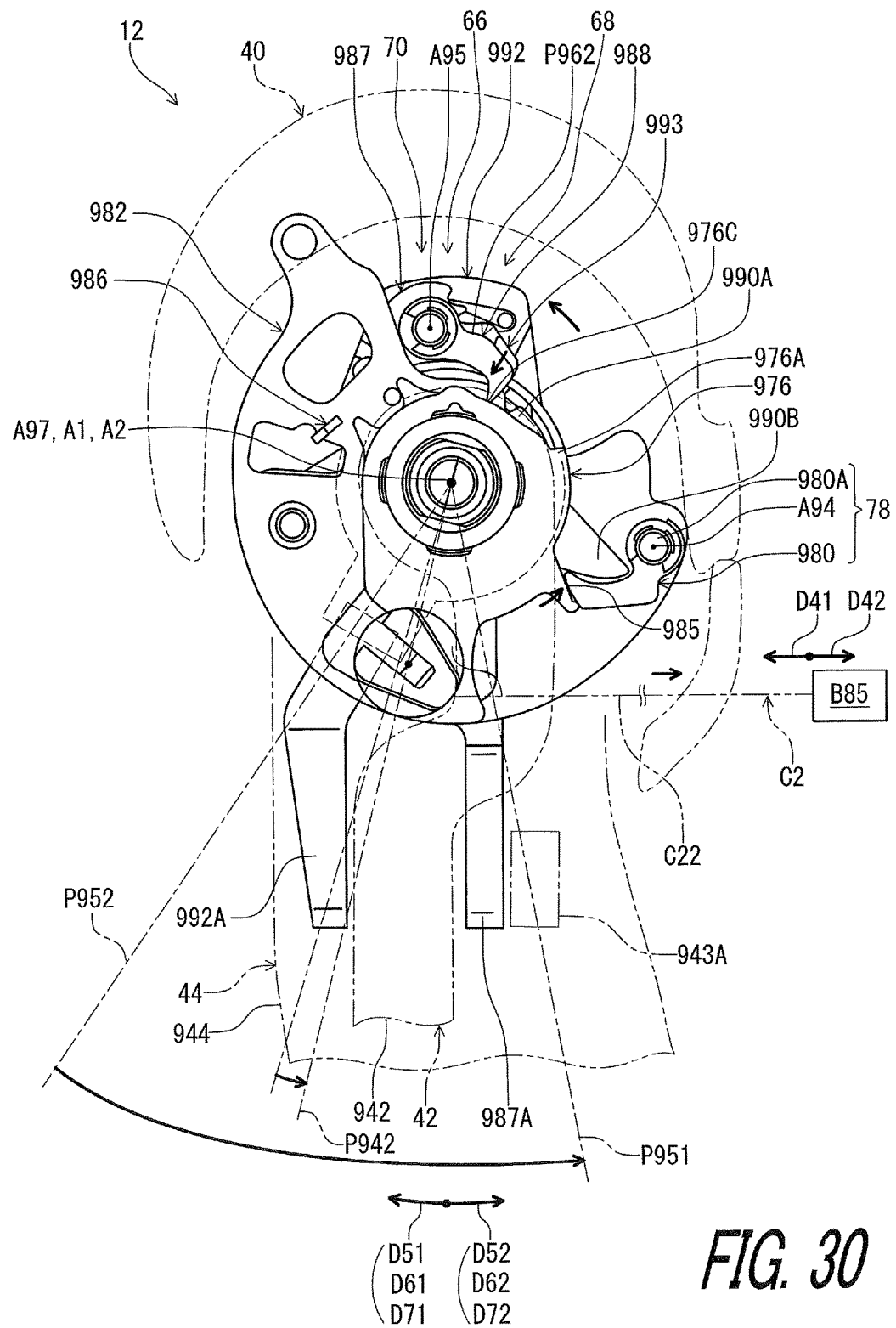
FIGS. 30 to 34 are front views of the cable operating structure of the bicycle operating device illustrated in FIG. 6 to show releasing operation of the bicycle operating device for the second mechanical control cable.

As seen in FIG. 30, the second input member 987, the first operating body 942, and the first input member 992 are returned to their rest positions when the second operating member 44 is returned to the second rest position P951. At this time, the second take-up member 976 is pivoted relative to the base member 40 in the second direction D52, bringing the positioning member 980 into engagement with the second positioning abutment 985. Thus, the second take-up member 976 is positioned at the second control position P942 relative to the base member 40, positioning the inner wire C22 of the second mechanical control cable C2 at a cable operated position.

Figure 31:
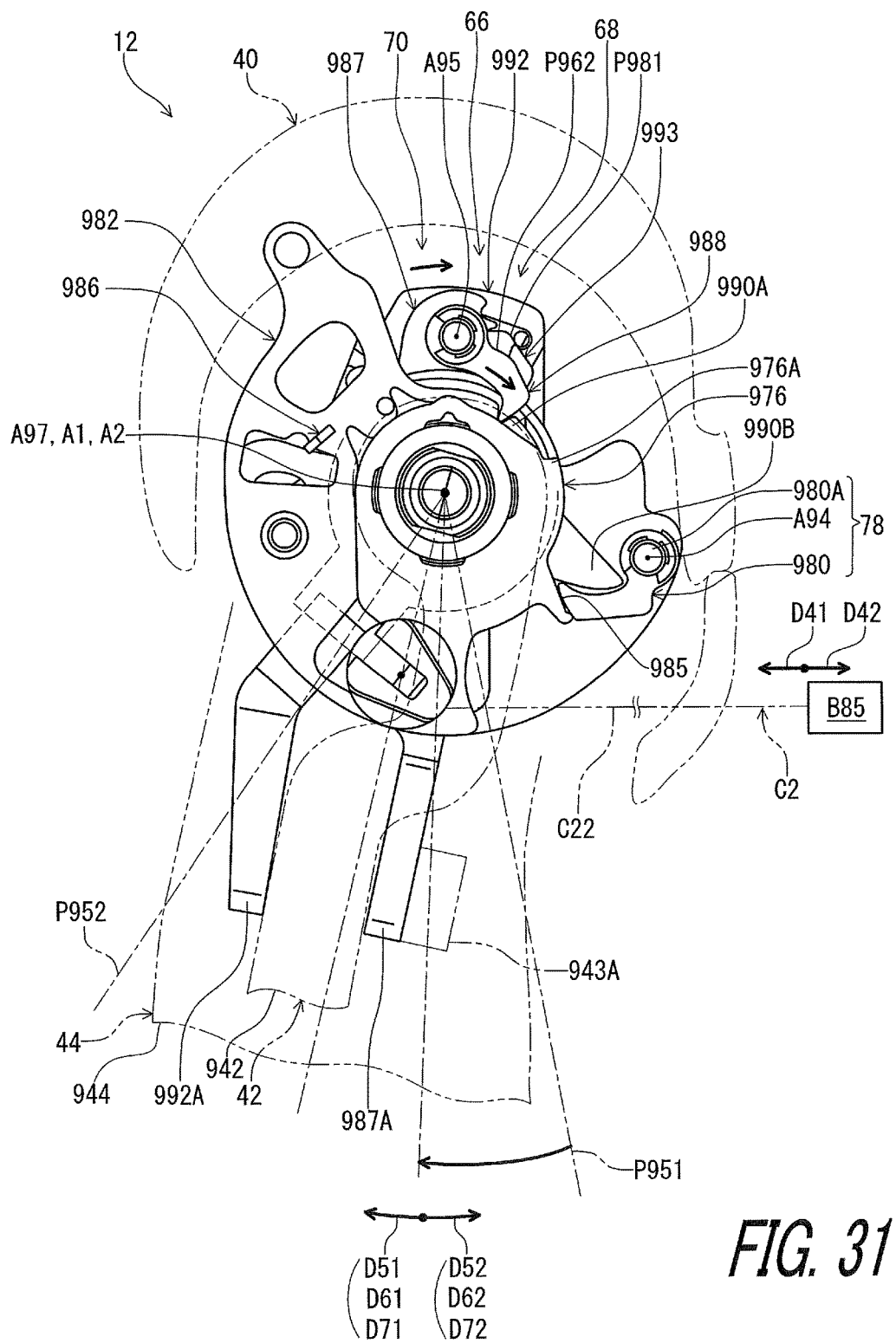

The releasing operation of the bicycle operating device 12 for the second mechanical control cable C2 will be described in detail below referring to FIGS. 30 to 33. As seen in FIGS. 30 and 31, the second actuating member 988 is positioned at the second additional actuation position P962 by the second contact surface 976C in a state where the second take-up member 976 is at the second control position P942. This allows the second actuating member 988 to come into contact with the release abutment 990A of the release member 990 when the first operating member 42 and the second operating member 44 are pivoted relative to the base member 40 in the first direction D51.

Figure 32:
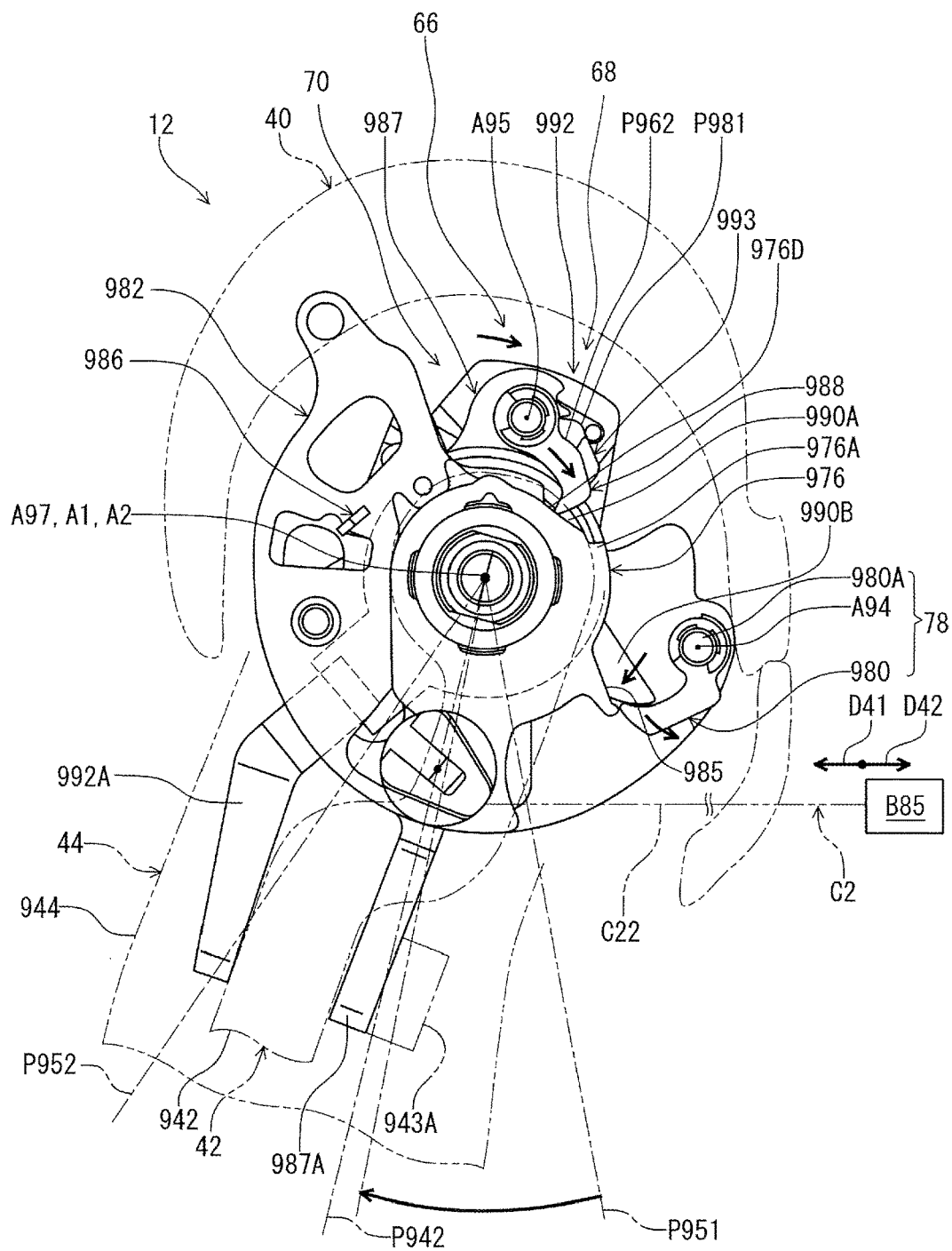

As seen in FIG. 32, the release member 990 is pivoted relative to the base member 40 in the first direction D51 when the first operating member 42 and the second operating member 44 are pivoted relative to the base member 40 in the first direction D51. At this time, the second actuating member 988 is not engaged with the actuation abutment 976A of the second take-up member 976.

Figure 33:
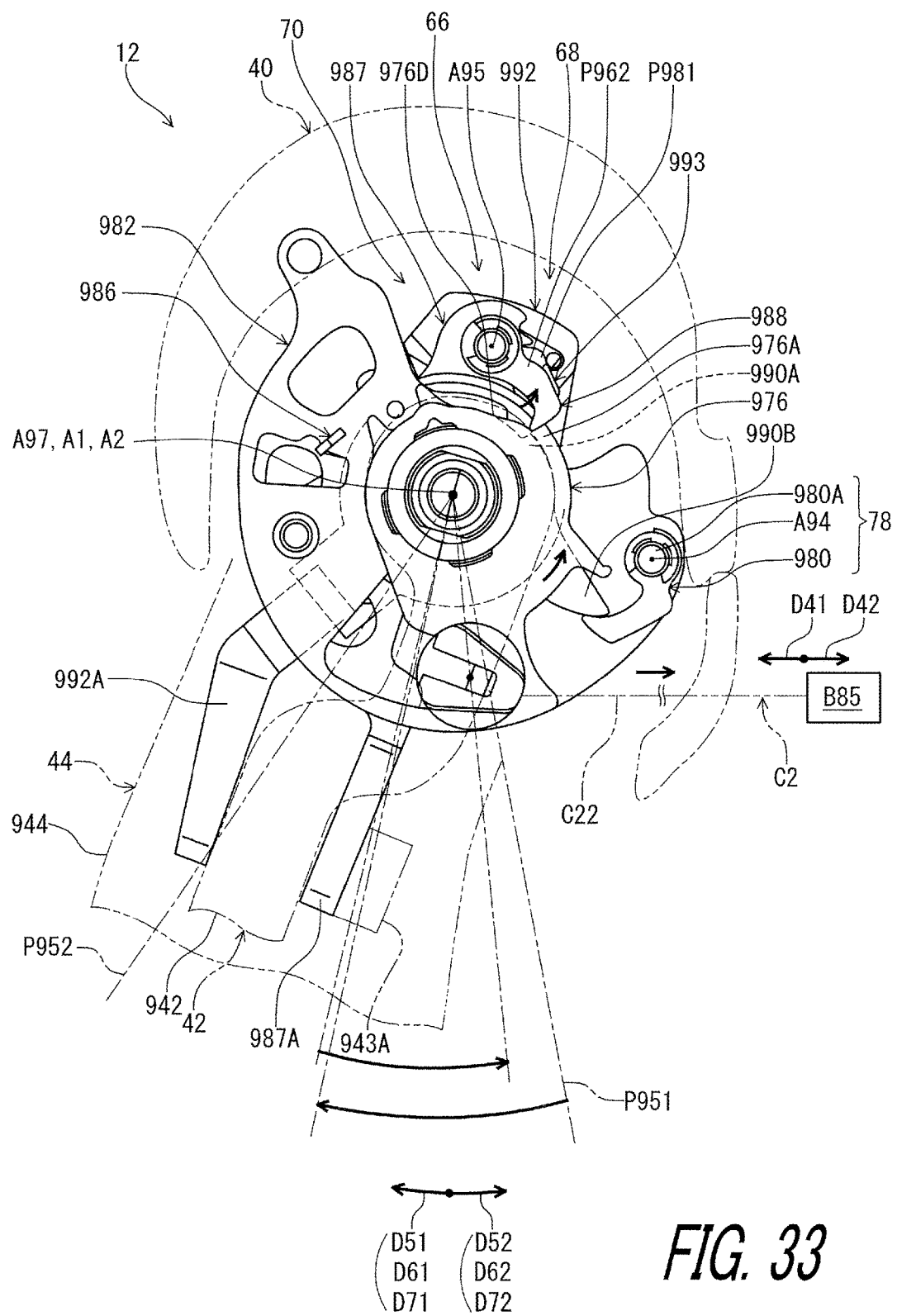

As seen in FIG. 33, the positioning member 980 is pivoted relative to the base member 40 to move away from the second positioning abutment 985 when the first operating member 42 and the second operating member 44 are further pivoted relative to the base member 40 in the first direction D51. This allows the second take-up member 976 to pivot relative to the base member 40 in the second direction D52 by the biasing force of the control biasing element 986. Thus, a guide surface 976D of the second take-up member 976 guides the second actuating member 988 to the second actuation position P962 in response to the pivotal movement of the second take-up member 976. This brings the second actuating member 988 into engagement with the actuation abutment 976A to stop the pivotal movement of the second take-up member 976.

Figure 34:
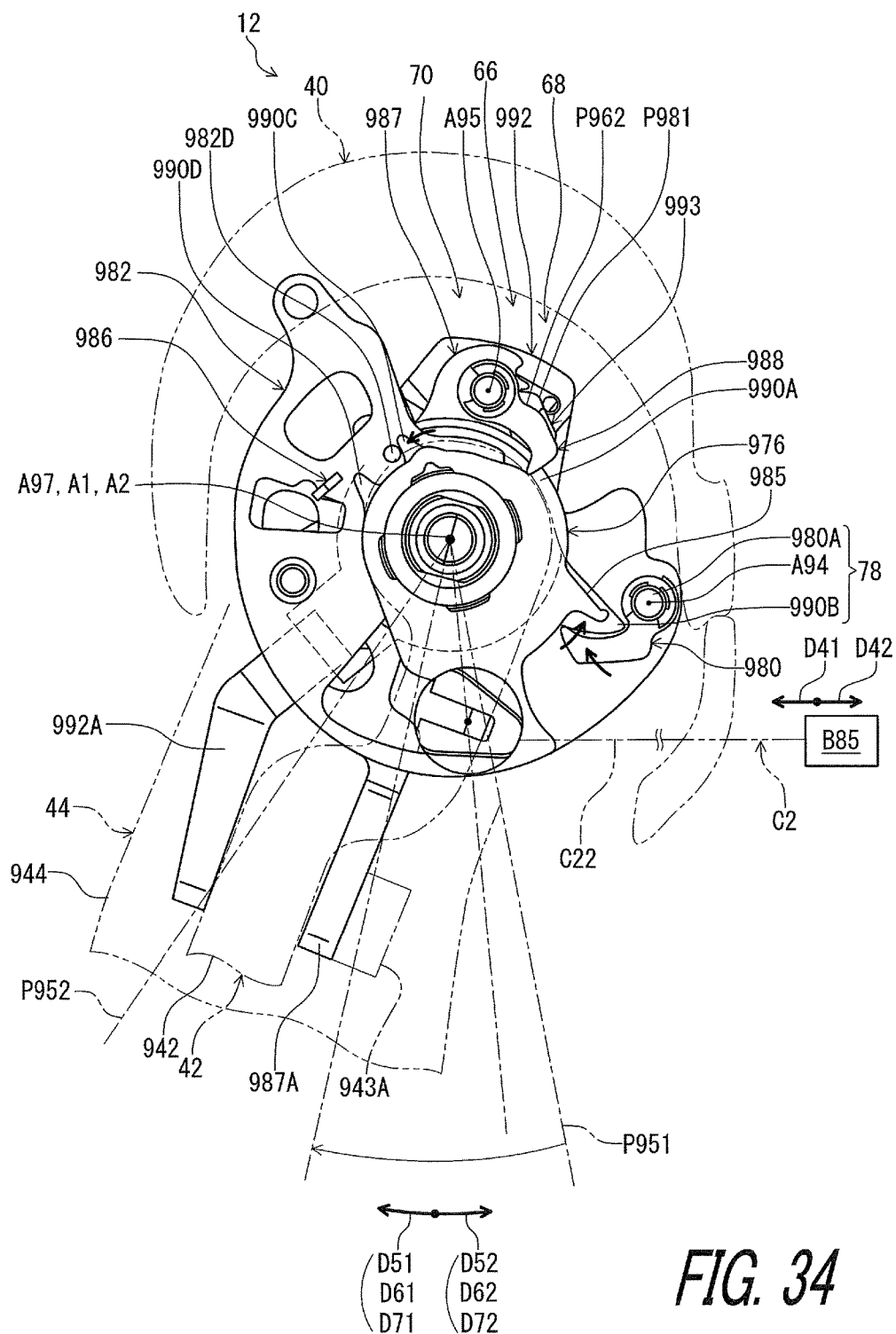
Figure 35:
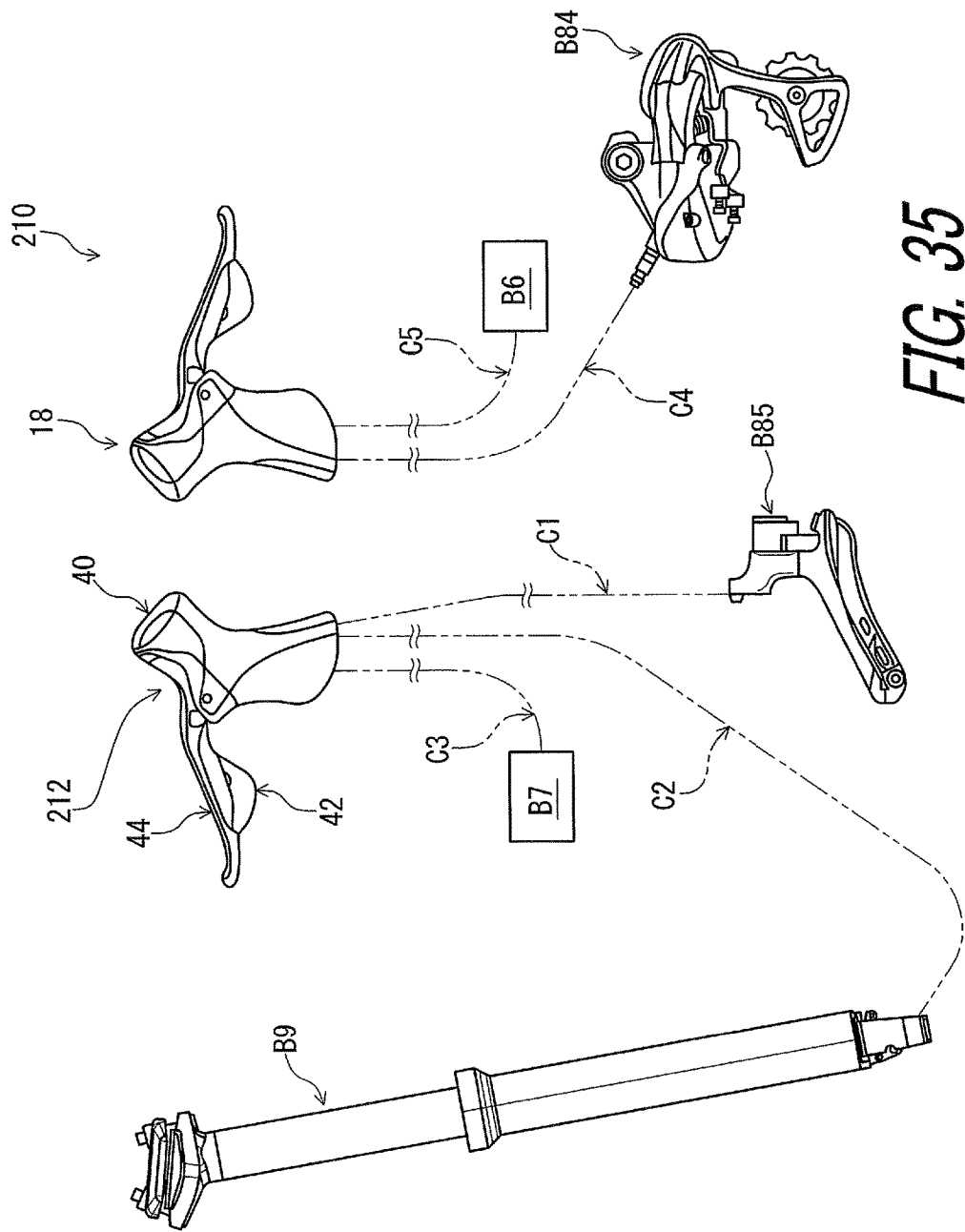
FIG. 35 is a schematic view of a bicycle including a bicycle operating device in accordance with a second embodiment.
Figure 36:
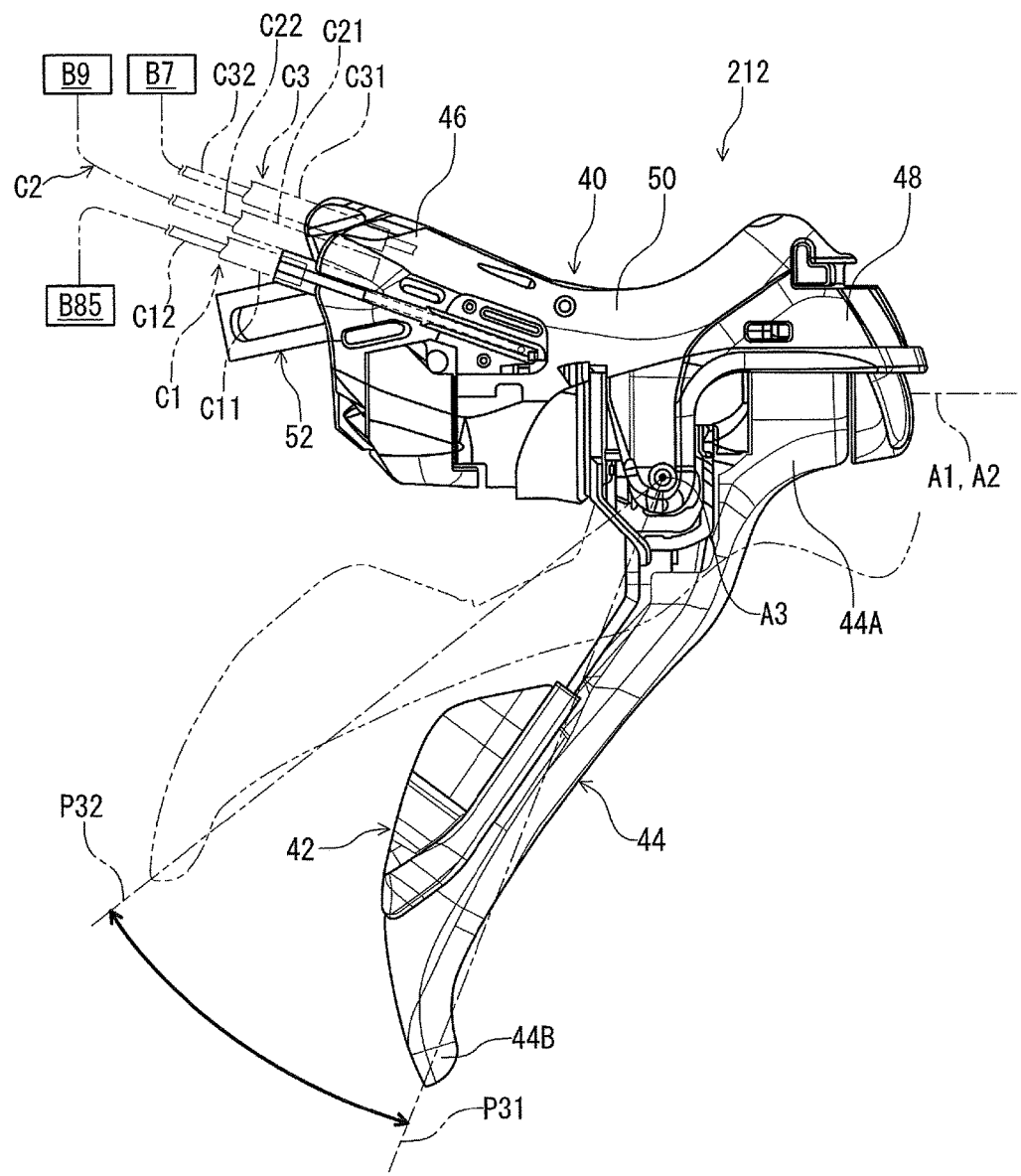
FIG. 36 is a side elevational view of the bicycle operating device illustrated in FIG. 35.

As seen in FIG. 34, the positioning member 980 is disengaged from the release abutment 990A when the second actuating member 988 is pivoted to the second actuation position P962. This allows the release member 990 to return to the rest position by the biasing force of the first biasing element 981 via the positioning member 980. The release member 990 is stopped by the first protrusion 990C and the stop pin 987C at the rest position.

As seen in FIG. 12, the second input member 987, the first operating body 942, and the first input member 992 are returned to their rest positions when the second operating body 944 is returned to the second rest position P951. At this time, the second take-up member 976 is pivoted relative to the base member 40 in the second direction D52, bringing the positioning member 980 into engagement with the first positioning abutment 984. Thus, the second take-up member 976 is positioned at the first control position P941 relative to the base member 40, positioning the inner wire C22 of the second mechanical control cable C2 at a cable rest position.

The bicycle operating device 12 includes the following features.

(1) The prevention member 97 is configured to move together with the second operating member 44 to prevent the first actuating member 993 from actuating the first take-up member 995 to move in at least one of the first pulling actuation direction D71 and the first releasing actuation direction D72 during a movement of the first operating member 42 from the first rest position P21 toward the first operated position P22. When the second operating member 44 is moved relative to the base member 40, the prevention member 97 is moved together with the second operating member 44 relative to the base member 40. Thus, the prevention member 97 prevents the first actuating member 993 from actuating the first take-up member 995 to move in the at least one of the first pulling actuation direction D71 and the first releasing actuation direction D72 during the movement of the first operating member 42 from the first rest position P21 toward the first operated position P22. Accordingly, it is possible to separately operate the first bicycle component B9 and a second bicycle component B85 via the first mechanical control cable C1 and the second mechanical control cable C2 even when the first operating member 42 and the second operating member 44 are simultaneously moved relative to the base member 40. This improves operability of the bicycle operating device 12. Furthermore, it is possible to arrange the first operating member 42 and the second operating member 44 to interfere with each other in an operating direction of the first and second operating members 42 and 44. This makes the bicycle operating device 12 compact with improving the operability of the bicycle operating device 12.

(2) The second operating member 44 includes the operating abutment 44C contactable with the first operating member 42. Accordingly, it is possible to move the first operating member 42 in response to the movement of the second operating member 44 in a state where the operating abutment 44C is in contact with the first operating member 42. At this time, the prevention member 97 and the first operating member 42 move together with the second operating member 44. This prevents the first actuating member 993 from actuating the first take-up member 995 to move in the at least one of the first pulling actuation direction D71 and the first releasing actuation direction D72 during the movement of the first operating member 42 from the first rest position P21 toward the first operated position P22.

(3) The operating abutment 44C has the abutment path PT1 defined from the second rest position P951 to the second operated position P952. The first operating member 42 is on the abutment path PT1 to come into contact with the operating abutment 44C during the movement of the second operating member 44 from the second rest position P951 to the second operated position P952. Accordingly, it is possible to reduce a total space in which the first operating member 42 and the second operating member 44 move relative to the base member 40.

(4) The operating abutment 44C contacts the first operating member 42 in a state where the second operating member 44 is at the second rest position P951. Accordingly, it is possible to reduce a total space in which the first operating member 42 and the second operating member 44 move relative to the base member 40.

(5) The first take-up member 995 is rotatably coupled to the base member 40 about the rotational axis A97. The second take-up member 976 is rotatably coupled to the base member 40 about the rotational axis A97. Accordingly, it is possible to make the bicycle operating device 12 compact since the first take-up member 995 and the second take-up member 976 are rotatable relative to the base member 40 about the same rotational axis A97.

(6) The first operating structure 68 and the second operating structure 70 are at least partly disposed in the internal space 40A. The internal space 40A protects the first operating structure 68 and the second operating structure 70.

(7) The first actuating member 993 is movable relative to the first operating member 42 between the first actuation position P981 at which the movement of the first operating member 42 is transmitted to the first take-up member 995 via the first actuating member 993, and the first non-actuation position P982 at which the movement of the first operating member 42 is not transmitted to the first take-up member 995 via the first actuating member 993. The first non-actuation position P982 is farther from the first take-up member 995 than the first actuation position P981. Accordingly, it is possible to transmit the movement of the first operating member 42 to the first take-up member 995 via the first actuating member 993 and to prevent the movement of the first operating member 42 from being transmitted to the first take-up member 995 via the first actuating member 993 in accordance with a position of the first actuating member 993.

(8) The prevention member 97 includes the first cam 97A to move the first actuating member 993 from the first actuation position P981 to the first non-actuation position P982 in response to the movement of the second operating member 44 from the second rest position P951 toward the second operated position P952. Accordingly, it is possible to change the position of the first actuating member 993 by using the first cam 97A of the prevention member 97. Thus, the prevention member 97 and the first actuating member 993 can prevent the movement of the first operating member 42 from being transmitted to the first take-up member 995 in response to the movement of the second operating member 44.

(9) The first cam 97A is provided at the second operating member 44. Accordingly, it is possible to simplify the structure of the first operating member 42 and the prevention member 97.

(10) The prevention member 97 is partly provided between the first actuating member 993 and the second actuating member 988. Accordingly, it is possible to make the bicycle operating device 12 compact.

(11) The first actuating member 993 is pivotably coupled to the first operating member 42 about the first actuation pivot axis A96. The first actuating member 993 includes the contact part 993B extending toward the prevention member 97 in the axial direction D8 parallel to the first actuation pivot axis A96. Accordingly, it is possible to make the bicycle operating device 12 compact.

(12) The second operating structure 70 includes the second positioning structure 78 to position the second take-up member 976 at the plurality of control positions. The first operating structure 68 is configured such that the first take-up member 995 is movable relative to the base member 40 between the first rest position P21 and the first operated position P22 without mechanically positioning the first mechanical control cable C1 relative to the base member 40 during a movement of the first operating member 42 between the first rest position P21 and the first operated position P22. Accordingly, it is possible to separately operate the first bicycle component B9 having only two actuated positions and the second bicycle component B85 having a plurality of actuated positions.

(13) The switching structure 66 is configured to actuate the first bicycle component B9 in response to the movement of the first operating member 42 and to actuate the second bicycle component B85 in response to the simultaneous movement of the first and second operating members 42 and 44 resulting from the abutment between the first operating member 42 and the second operating member 44. Accordingly, it is possible to separately operate the first bicycle component B9 and the second bicycle component B85 by using the first operating member 42 and the second operating member 44.

Second Embodiment

A bicycle operating device 212 in accordance with a second embodiment will be described below referring to FIGS. 35 to 64. The bicycle operating device 212 has the same structures as those of the bicycle operating device 12 except for the first operating structure and the second operating structure. Thus, elements having substantially the same function as those in the first embodiment will be numbered the same here, and will not be described and/or illustrated again in detail here for the sake of brevity.

Figure 37:
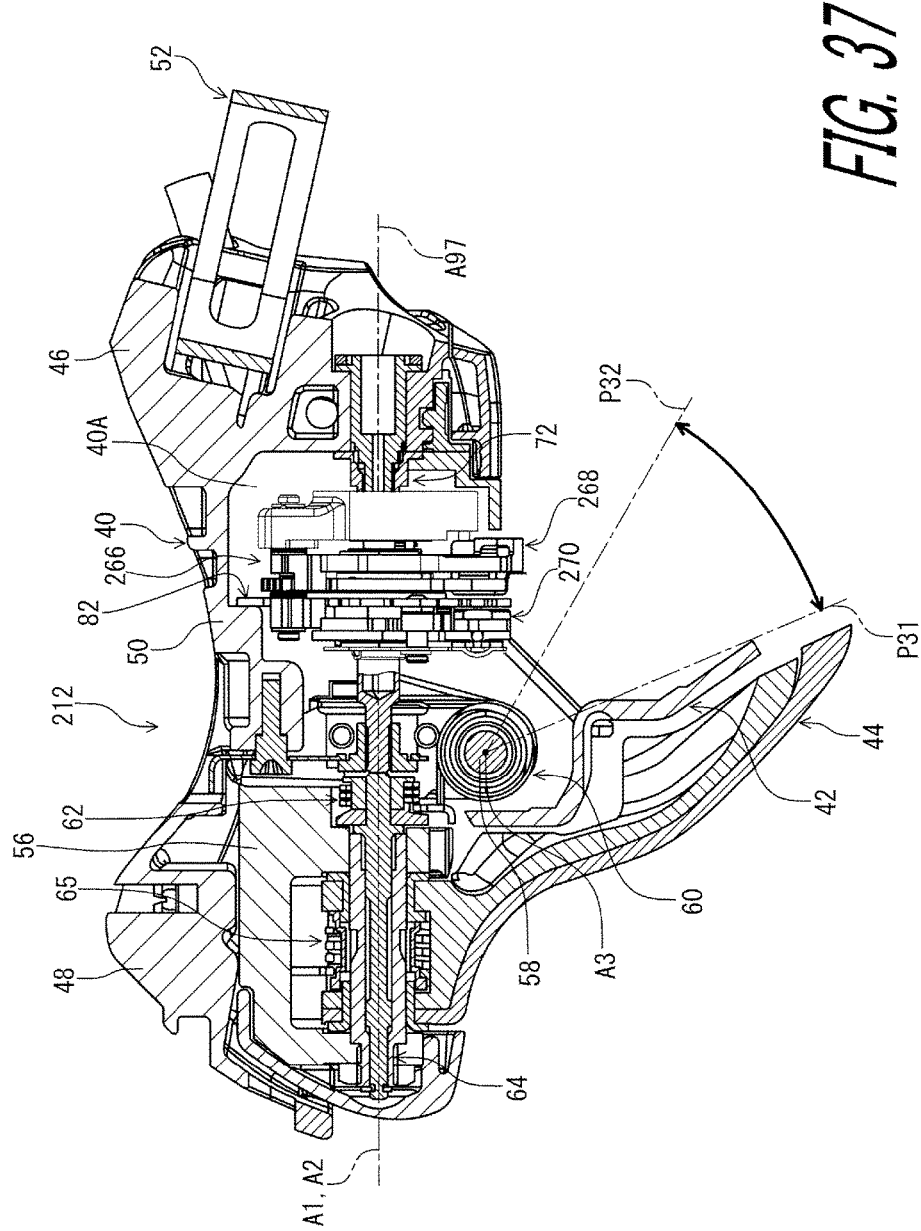
FIG. 37 is a front view of the bicycle operating device illustrated in FIG. 35.
Figure 38:
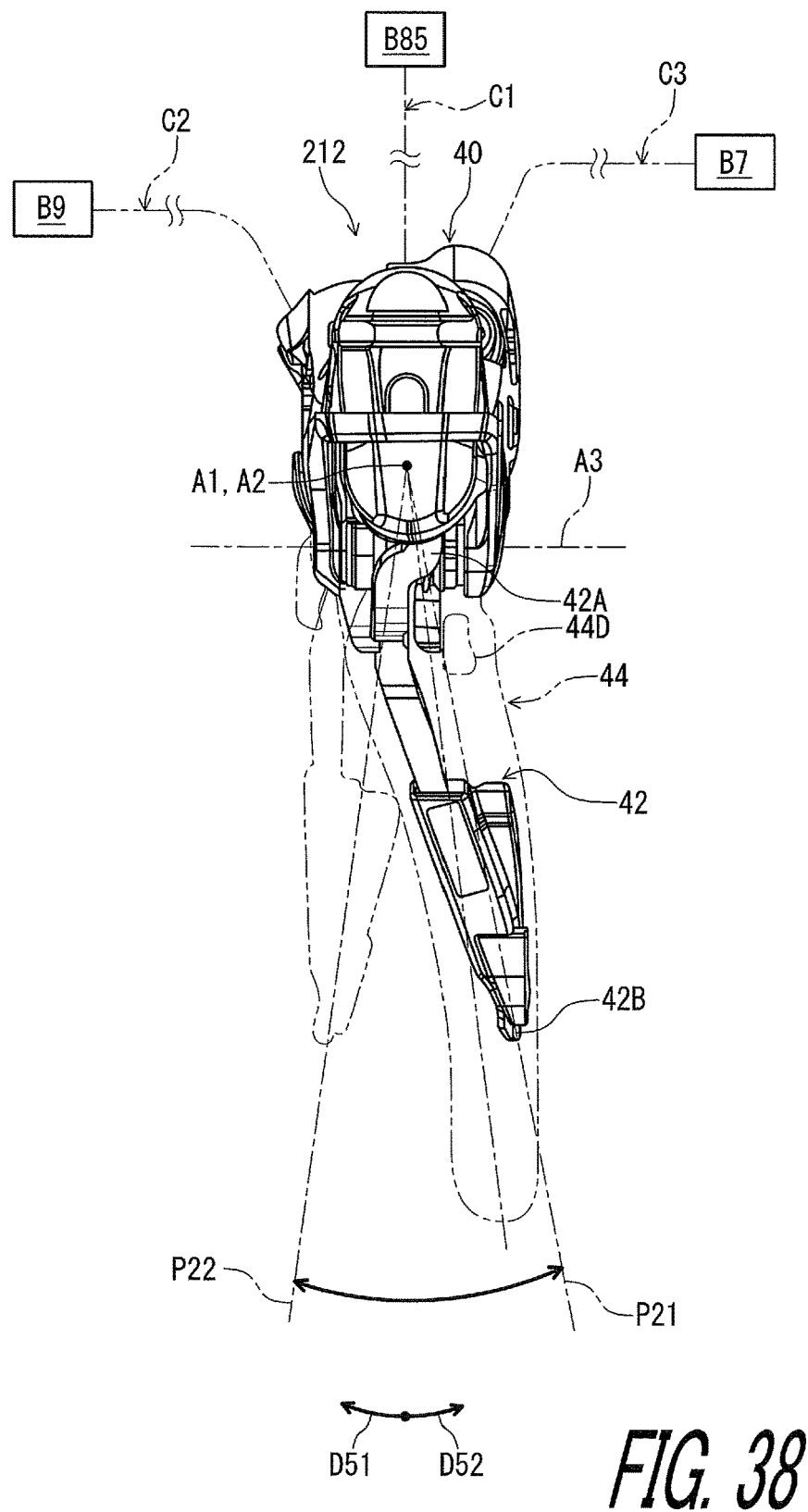
FIG. 38 is a front view of the bicycle operating device illustrated in FIG. 35, with a brake operating member omitted.

As seen in FIGS. 35 to 39, the bicycle operating device 212 comprises the base member 40, the first operating member 42, and the second operating member 44. As seen in FIG. 38, the first operating member 42 is movable relative to the base member 40 between the first rest position P21 and the first operated position P22 to actuate a first bicycle component. In this embodiment, the first operating member 42 is movable relative to the base member 40 between the first rest position P21 and the first operated position P22 to actuate the front derailleur B85 provided as the first bicycle component. However, the bicycle operating device 212 can be operatively coupled to other bicycle components such as the rear derailleur B84 and the adjustable seatpost assembly B9. In this embodiment, the front derailleur B85 can also be referred to as the first bicycle component B85.

Figure 39:
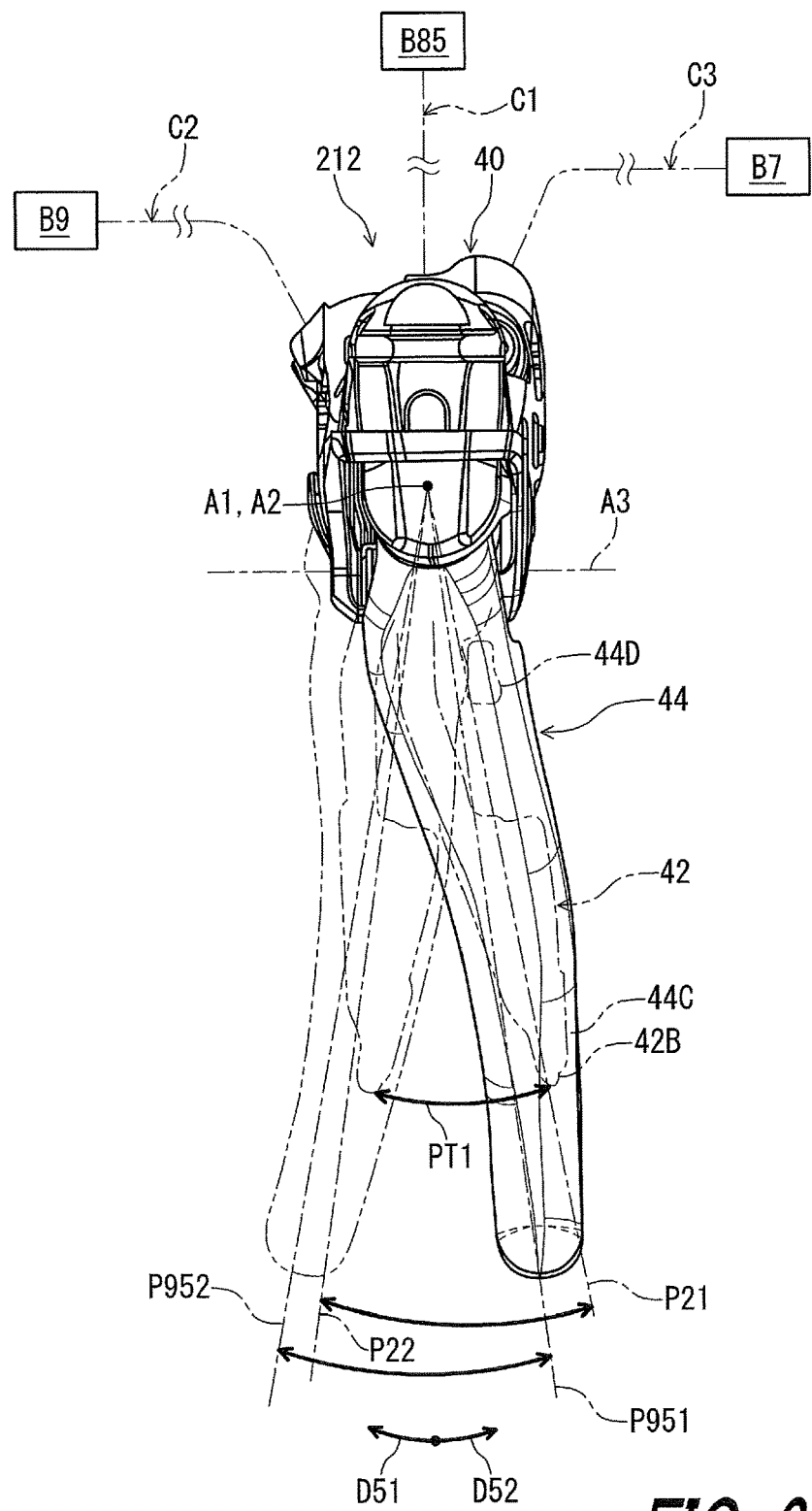
FIG. 39 is a cross-sectional view of the bicycle operating device illustrated in FIG. 35.

As seen in FIG. 39, the second operating member 44 is movable relative to the base member 40 between the second rest position P951 and the second operated position P952 to actuate a second bicycle component that is different from the first bicycle component B85. In this embodiment, the second operating member 44 is movable relative to the base member 40 between the second rest position P951 and the second operated position P952 to actuate the adjustable seatpost assembly B9 provided as the second bicycle component. However, the bicycle operating device 212 can be operatively coupled to other bicycle components such as the rear derailleur B84 and the front derailleur B85. In this embodiment, the adjustable seatpost assembly B9 can also be referred to as the second bicycle component B9.

As seen in FIG. 37, the bicycle operating device 212 comprises a switching structure 266. The switching structure 266 is configured to actuate the first bicycle component B85 in response to a movement of the first operating member 42. The switching structure 266 is configured to actuate the second bicycle component B9 in response to a simultaneous movement of the first and second operating members 42 and 44 resulting from an abutment between the first operating member 42 and the second operating member 44. In this embodiment, the switching structure 266 includes a mechanical structure. However, the switching structure 266 can include a hydraulic unit or an electrical component instead of or in addition to the mechanical structure.

In this embodiment, the bicycle operating device 212 comprises a first operating structure 268 and a second operating structure 270. The switching structure 266 includes a part of the first operating structure 268 and a part of the second operating structure 270. The first operating structure 268 and the second operating structure 270 are mounted on the third shaft 72. The first operating structure 268 and the second operating structure 270 are at least partly disposed in the internal space 40A. However, at least one of the first operating structure 268 and the second operating structure 270 can be disposed outside the internal space 40A.

Figure 40:
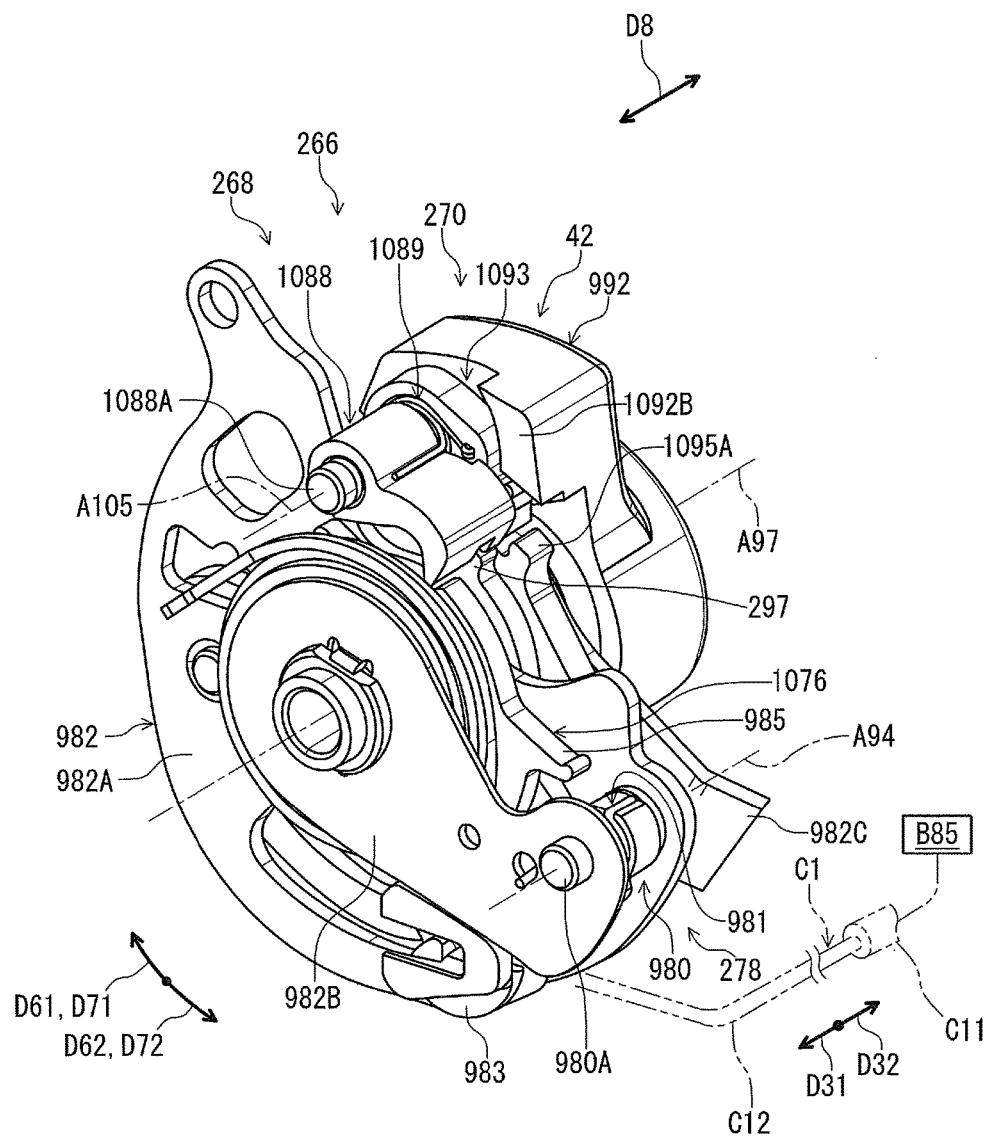
FIG. 40 is a perspective view of a cable operating structure of the bicycle operating device illustrated in FIG. 36.
Figure 41:
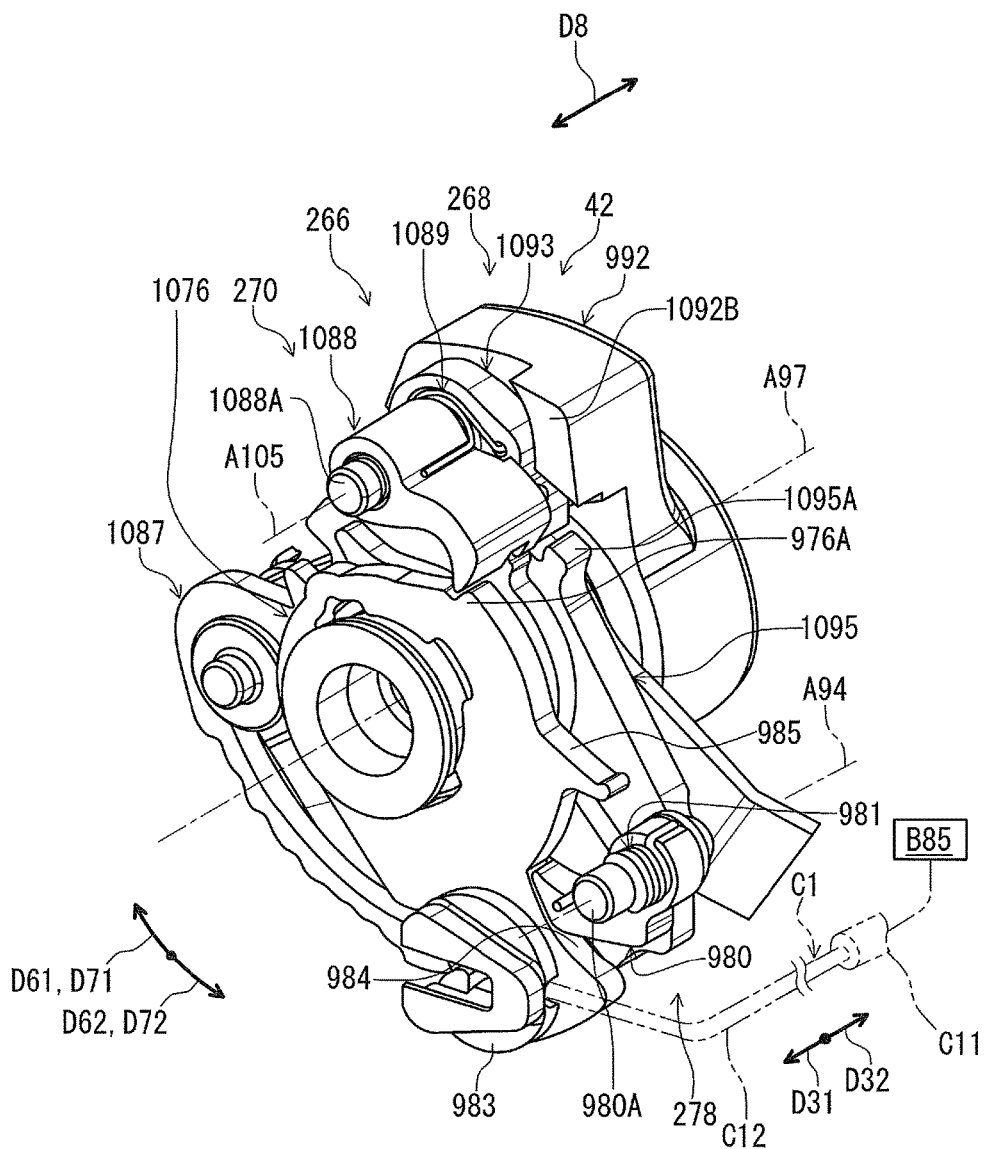
FIG. 41 is a perspective view of the cable operating structure of the bicycle operating device illustrated in FIG. 36, with a support structure omitted (first control position).
Figure 42:
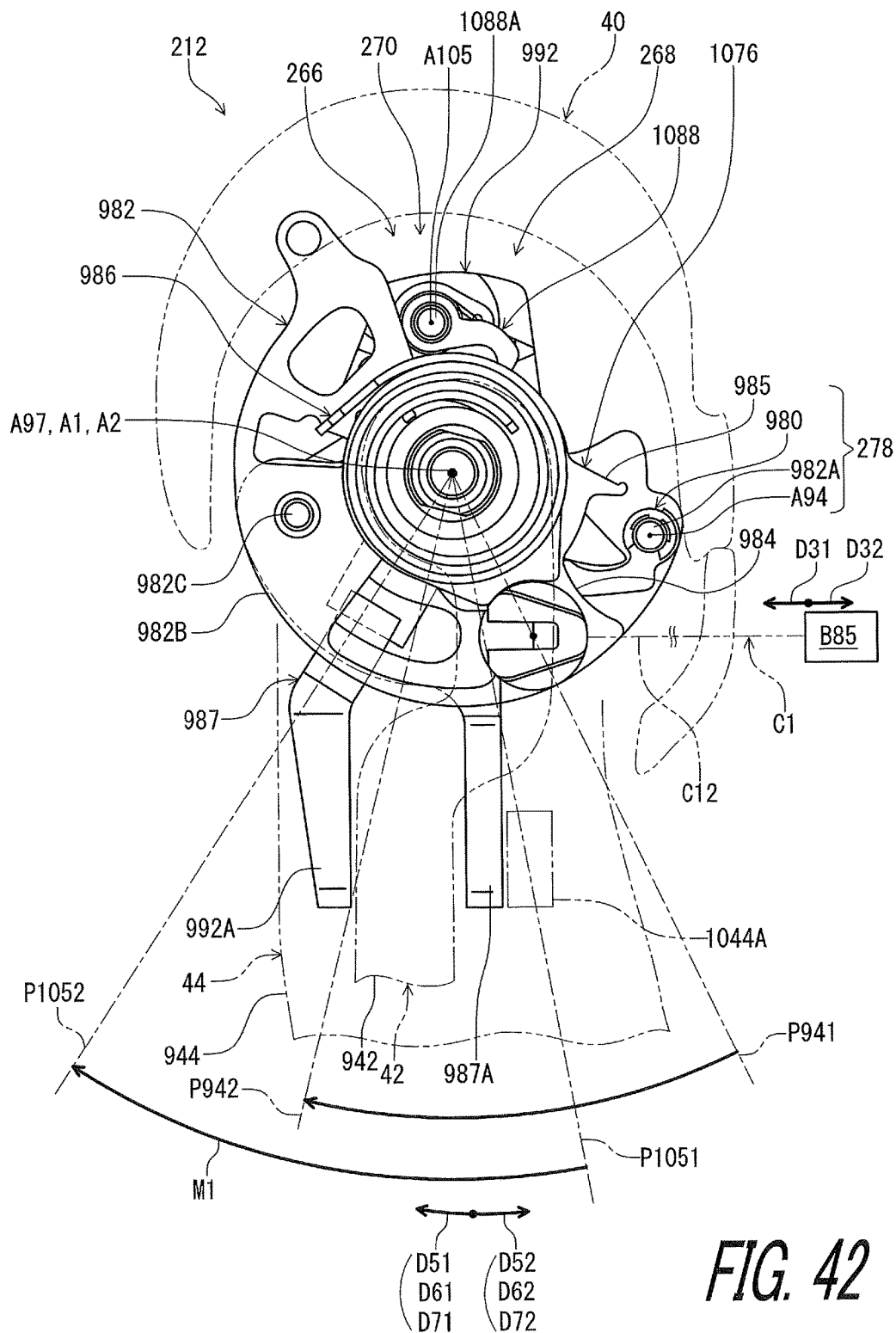
FIG. 42 is a front view of the cable operating structure of the bicycle operating device illustrated in FIG. 36.

As seen in FIGS. 40 to 42, the first operating structure 268 comprises a first take-up member 1076, the first operating member 42, and a first actuating member 1088. The first take-up member 1076 is movable relative to the base member 40 to move the first mechanical control cable C1 in the first pulling direction D31 and the first releasing direction D32 opposite to the first pulling direction D31. In this embodiment, the first take-up member 1076 is coupled to the first operating member 42 to move the first mechanical control cable C1 relative to the base member 40 in the first pulling direction D31 and the first releasing direction D32 opposite to the first pulling direction D31 in response to the movement of the first operating member 42. An end of the inner wire C12 of the first mechanical control cable C1 is coupled to the first take-up member 1076.

In this embodiment, the first take-up member 1076 is rotatably coupled to the base member 40 about the rotational axis A97. However, the first take-up member 1076 can be rotatably coupled to the base member 40 about another rotational axis different from the rotational axis A97.

The first take-up member 1076 has substantially the same structure as that of the second take-up member 976 of the first embodiment. Specifically, the first take-up member 1076 includes the cable attachment part 983, the first positioning abutment 984, the second positioning abutment 985, the control biasing element 986, the actuation abutment 976A, the first contact surface 976B, and the second contact surface 976C. Thus, they will not be described in detail here for the sake of brevity.

As seen in FIGS. 40 and 41, the first actuating member 1088 is operatively coupled with the first take-up member 1076 to actuate the first take-up member 1076 to move in at least one of the first pulling actuation direction D71 and the first releasing actuation direction D72. In this embodiment, the first actuating member 1088 is operatively coupled with the first take-up member 1076 to actuate the first take-up member 1076 to move in the first pulling actuation direction D71. However, the first actuating member 1088 can be operatively coupled with the first take-up member 1076 to actuate the first take-up member 1076 to move in the first releasing actuation direction D72 or both the first pulling actuation direction D71 and the first releasing actuation direction D72.

Figure 43:
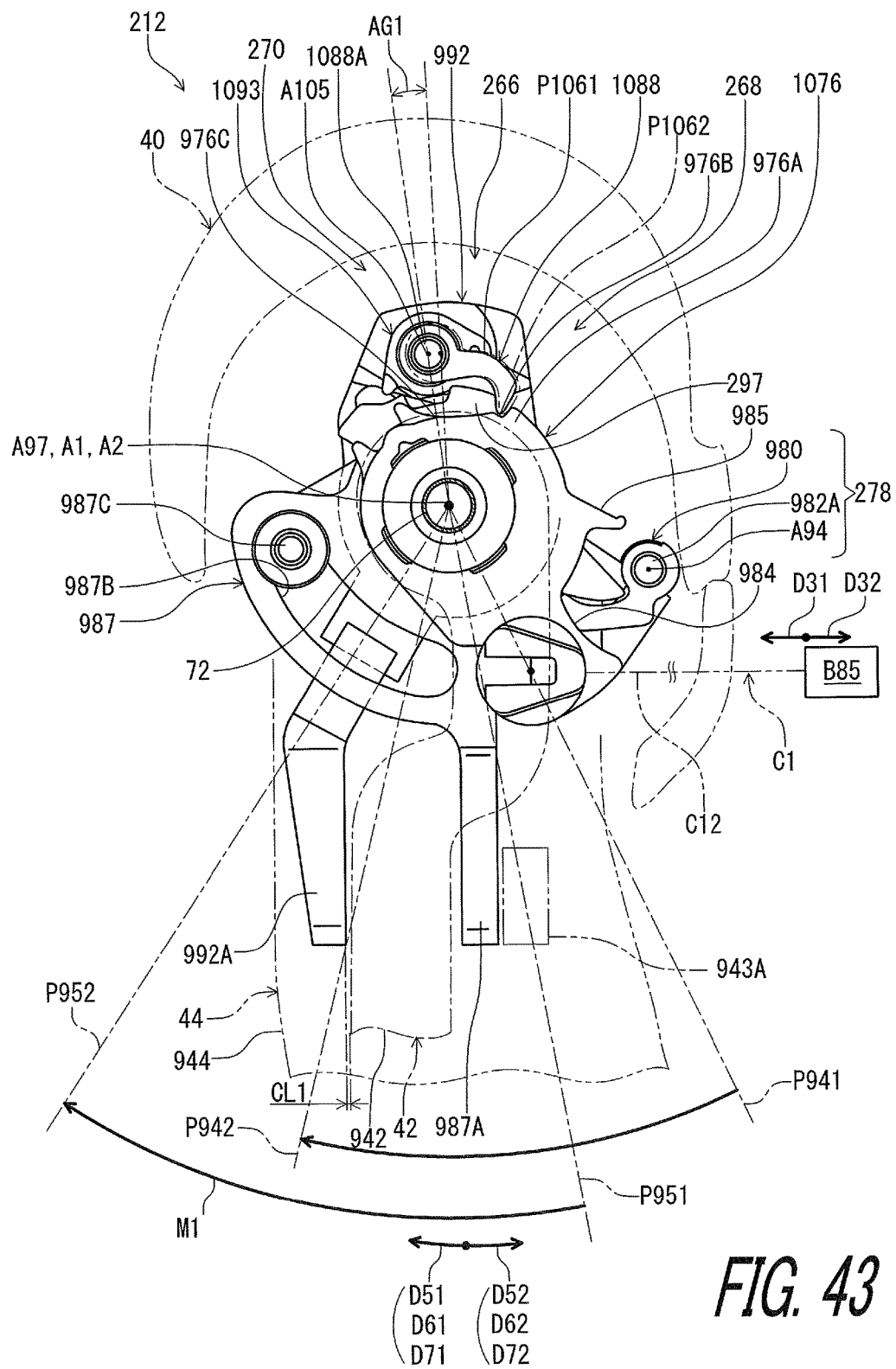
FIG. 43 is a front view of the cable operating structure of the bicycle operating device illustrated in FIG. 36, with the support structure omitted.

As seen in FIG. 43, the first actuating member 1088 is movable relative to the first operating member 42 between a first actuation position P1061 and a first non-actuation position P1062. At the first actuation position P1061, the movement of the first operating member 42 is transmitted to the first take-up member 1076 via the first actuating member 1088. At the first non-actuation position P1062, the movement of the first operating member 42 is not transmitted to the first take-up member 1076 via the first actuating member 1088. The first non-actuation position P1062 is farther from the first take-up member 1076 than the first actuation position P1061.

As seen in FIGS. 41 and 42, the first actuating member 1088 is attached to the first operating member 42. The first actuating member 1088 is pivotally coupled to the first operating member 42 about an actuation pivot axis A105. In this embodiment, the first actuating member 1088 is pivotally coupled to the first input member 992 about the actuation pivot axis A105. Specifically, the first actuating member 1088 is pivotally coupled to the first input member 992 about the actuation pivot axis A105 via a pivot pin 1088A. The first actuating member 1088 includes a first actuation pawl contactable with the first take-up member 1076. The first operating structure 268 includes an actuation biasing member 1089. The actuation biasing member 1089 is mounted to the first input member 992 to bias the first actuating member 1088 to keep in contact with the first take-up member 1076.

As seen in FIGS. 42 and 43, the first operating structure 268 includes a first positioning structure 278 to position the first take-up member 1076 at a plurality of control positions. The first positioning structure 278 is configured to selectively maintain the first take-up member 1076 at the plurality of control positions.

The first positioning structure 278 is coupled to the first take-up member 1076 to position the first take-up member 1076 relative to the base member 40 at each of the first control position P941 and the second control position P942 relative to the base member 40. In this embodiment, the first positioning structure 278 is coupled to the first take-up member 1076 to position the first take-up member 1076 relative to the base member 40 at each of only two control positions (the first control position P941 and the second control position P942) relative to the base member 40. However, the total number of the control positions is not limited to this embodiment and it can be three and more.

The inner wire C12 is pulled relative to the outer casing C11 and the base member 40 when the first take-up member 1076 is pivoted relative to the base member 40 about the rotational axis A97 from the first control position P941 to the second control position P942. The inner wire C12 is released (returned) relative to the outer casing C11 and the base member 40 when the first take-up member 1076 is returned relative to the base member 40 about the first pivot axis A1 from the second control position P942 to the first control position P941.

As seen in FIG. 43, the first take-up member 1076 is configured to pull the first mechanical control cable C1 when the first operating member 42 is moved relative to the base member 40 in the first direction D51. The first take-up member 1076 is configured to release the first mechanical control cable C1 when the first operating member 42 is moved relative to the base member 40 in the first direction D51. In other words, a movement direction of the first operating member 42 to pull the first mechanical control cable C1 is the same as a movement direction of the first operating member 42 to release the first mechanical control cable C1. However, the movement directions of the first operating member 42 to pull and release the first mechanical control cable C1 can be different from each other. For example, the movement direction of the first operating member 42 to pull the first mechanical control cable C1 can be the first direction D51 and the movement direction of the first operating member 42 to release the first mechanical control cable C1 can be the second direction D52.

Specifically, the first positioning structure 278 is coupled to the first operating member 42 to move the first take-up member 1076 such that the first mechanical control cable C1 is moved in the second pulling direction D41 and the second releasing direction D42 alternatingly in response to the first movement M1 of the first operating member 42.

As seen in FIGS. 40 to 43, the first positioning structure 278 has substantially the same structure as that of the second positioning structure 78 of the first embodiment. Specifically, the first positioning structure 278 includes the positioning member 980, the first biasing element 981, and the release member 990. Thus, they will not be described in detail here for the sake of brevity.

Figure 44:
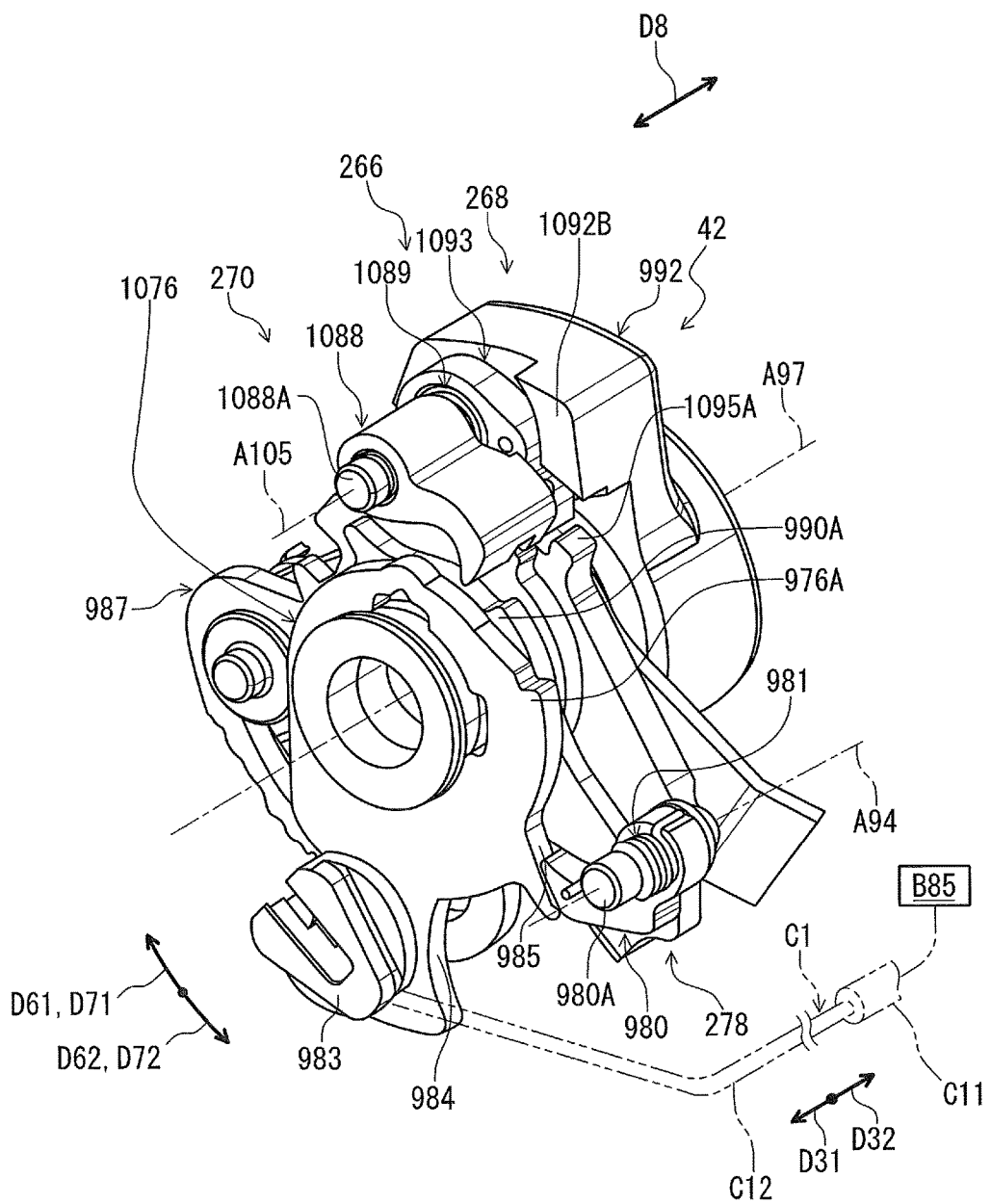
FIG. 44 is a perspective view of the cable operating structure of the bicycle operating device illustrated in FIG. 36, with the support structure omitted (second control position).
Figure 45:
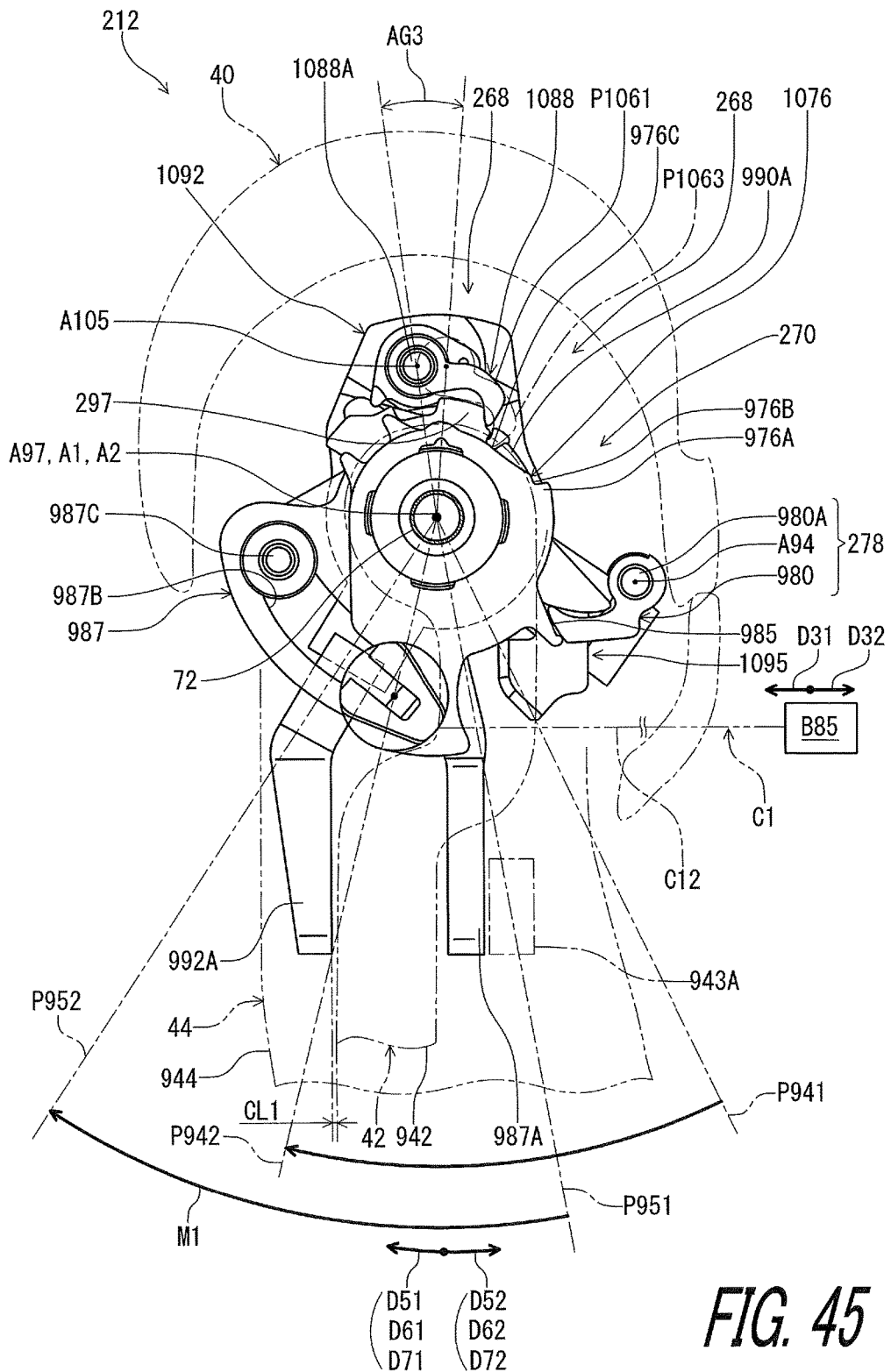
FIG. 45 is a front view of the cable operating structure of the bicycle operating device illustrated in FIG. 36, with the support structure omitted (second control position).

As seen in FIGS. 41 and 43, the first take-up member 1076 is positioned at the first control position P941 in a state where the positioning member 980 is in contact with the first positioning abutment 984. As seen in FIGS. 44 and 45, the first take-up member 1076 is positioned at the second control position P942 in a state where the positioning member 980 is in contact with the second positioning abutment 985. The actuation biasing member 1089 biases the first actuating member 1088 toward the first take-up member 1076.

As seen in FIGS. 41 and 43, the first actuating member 1088 keeps in contact with the first contact surface 976B in a state where the first take-up member 1076 is positioned at the first control position P941 because of a biasing force of the actuation biasing member 1089. The first actuating member 1088 is positioned at the first actuation position P1061 in a state where the first actuating member 1088 is in contact with the first contact surface 976B. The first actuating member 1088 is contactable with the actuation abutment 976A in a state where the first actuating member 1088 is positioned at the first actuation position P1061. In this state, the first movement M1 of the first operating member 42 is transmitted to the first take-up member 1076 via the second input member 987 and the first actuating member 1088.

As seen in FIGS. 44 and 45, the first actuating member 1088 keeps in contact with the second contact surface 976C of the first take-up member 1076 in a state where the first take-up member 1076 is positioned at the second control position P942 because of the biasing force of the actuation biasing member 1089. The first actuating member 1088 is positioned at the first non-actuation position P1062 in a state where the first actuating member 1088 is in contact with the second contact surface 976C. The first actuating member 1088 is not contactable with the actuation abutment 976A in a state where the first actuating member 1088 is positioned at the first non-actuation position P1062 because of an enough distance between the first actuating member 1088 and the actuation abutment 976A. In this state, the first movement M1 of the first operating member 42 is not transmitted to the first take-up member 1076 via the second input member 987 and the first actuating member 1088.

Figure 46:
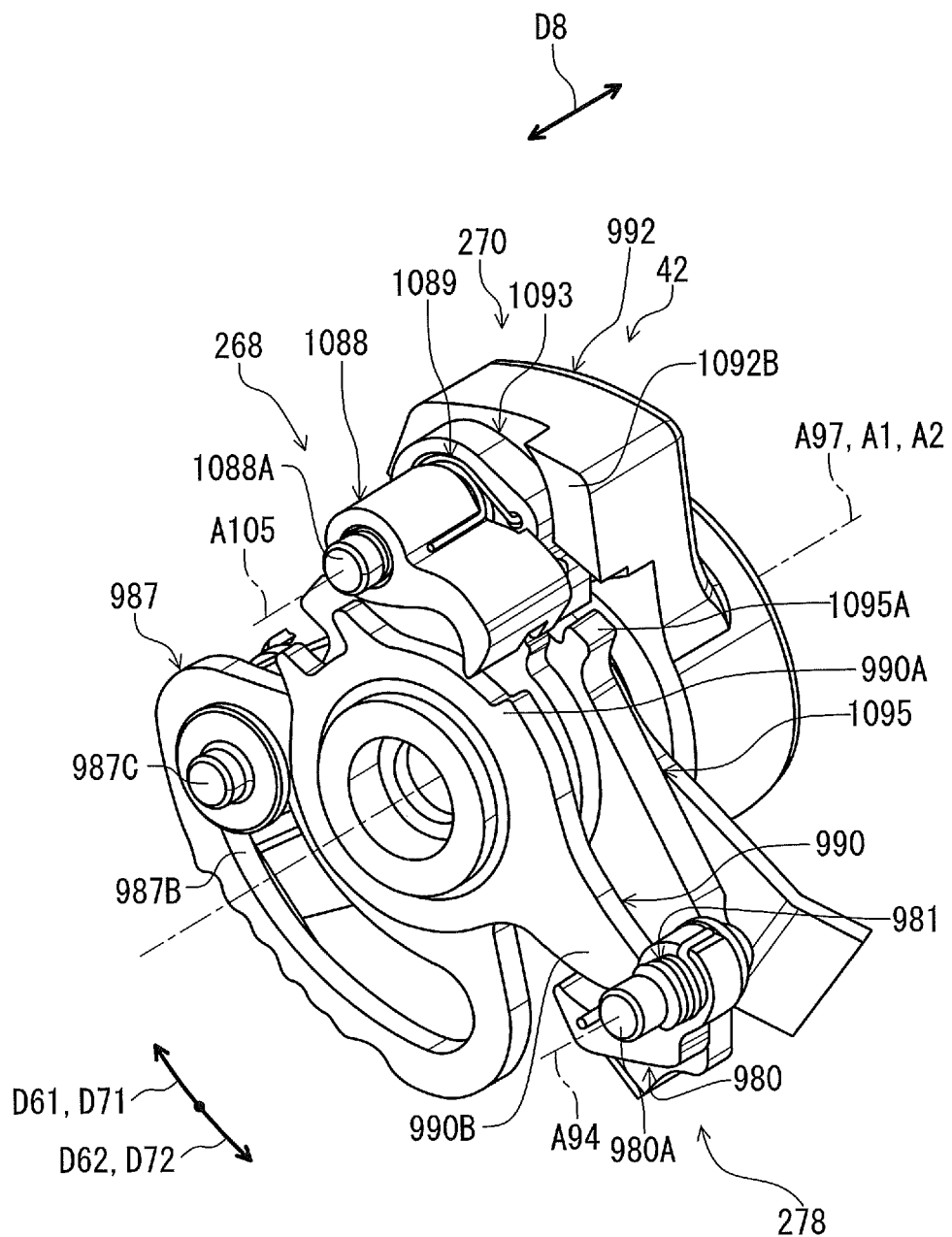
FIG. 46 is a perspective view of the cable operating structure of the bicycle operating device illustrated in FIG. 36, with the support structure and a cable control body omitted.
Figure 47:
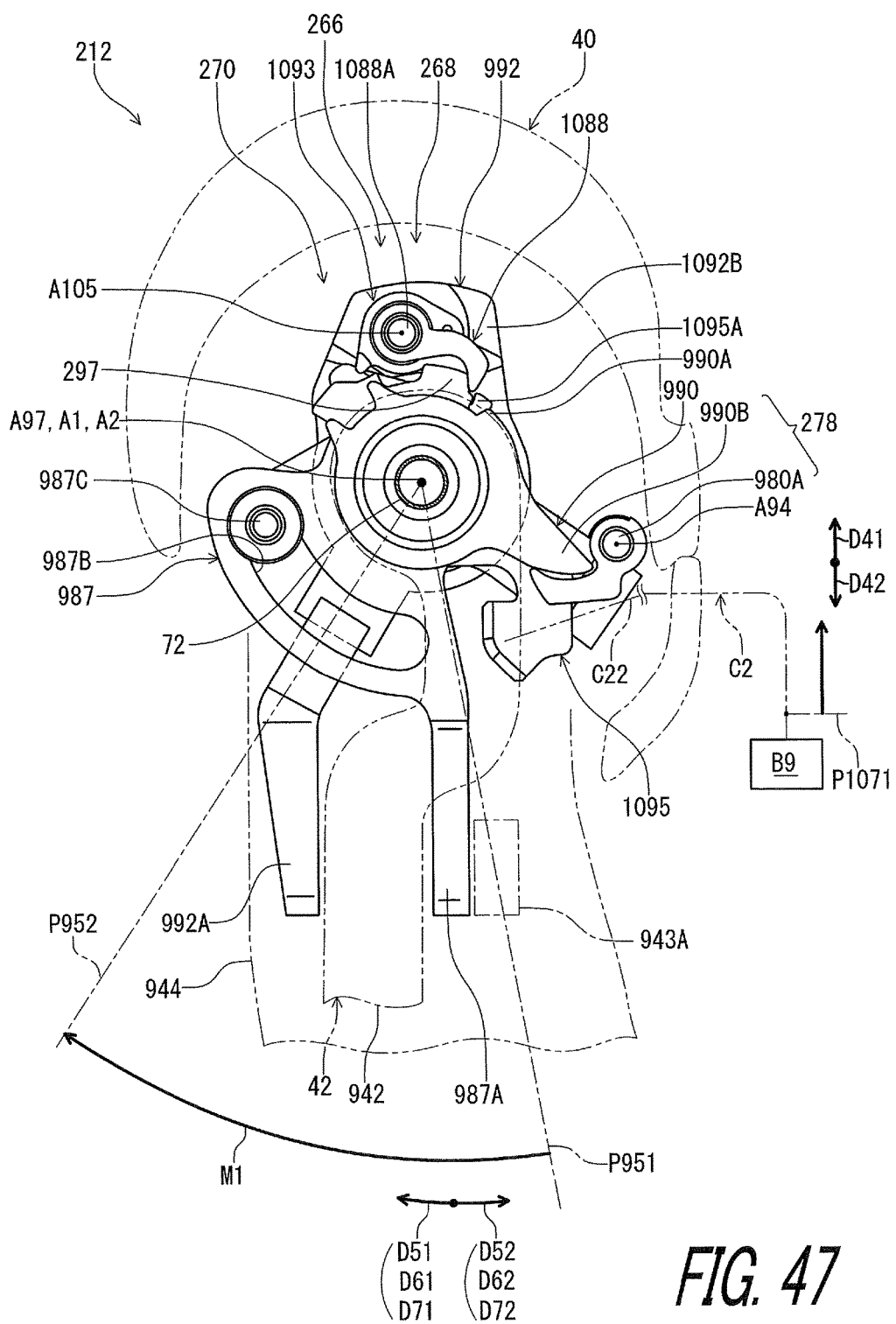
FIG. 47 is a front view of the cable operating structure of the bicycle operating device illustrated in FIG. 36, with the support structure and the cable control body omitted.

As seen in FIGS. 46 and 47, the first actuating member 1088 is contactable with the release abutment 990A in a state where the first actuating member 1088 is positioned at the first non-actuation position P1062. The release pawl 990B is contactable with the positioning member 980 in a state where the first actuating member 1088 is engaged with one of the first positioning abutment 984 and the second positioning abutment 985. In this state, the first movement M1 of the first operating member 42 is transmitted to the release member 990 via the first operating member 42 and the first actuating member 1088. This pivots the positioning member 980 about the positioning pivot axis A94 against a biasing force of the first biasing element 981 to move away from the first take-up member 1076. The positioning member 980 is not contactable with the second positioning abutment 985 in a state where the release pawl 990B moves the positioning member 980 away from the first take-up member 1076. However, the positioning member 980 is contactable with the first positioning abutment 984 in the state where the release pawl 990B moves the positioning member 980 away from the first take-up member 1076.

The first actuating member 1088 is spaced apart from the actuation abutment 976A in a state where the first take-up member 1076 is positioned at the second control position P942. The first actuating member 1088 is not contactable with the actuation abutment 976A in the state where the first actuating member 1088 is positioned at the first actuation position P1061. In this state, the first movement M1 of the first operating member 42 is not transmitted to the first take-up member 1076 via the second input member 987 and the first actuating member 1088.

Figure 48:
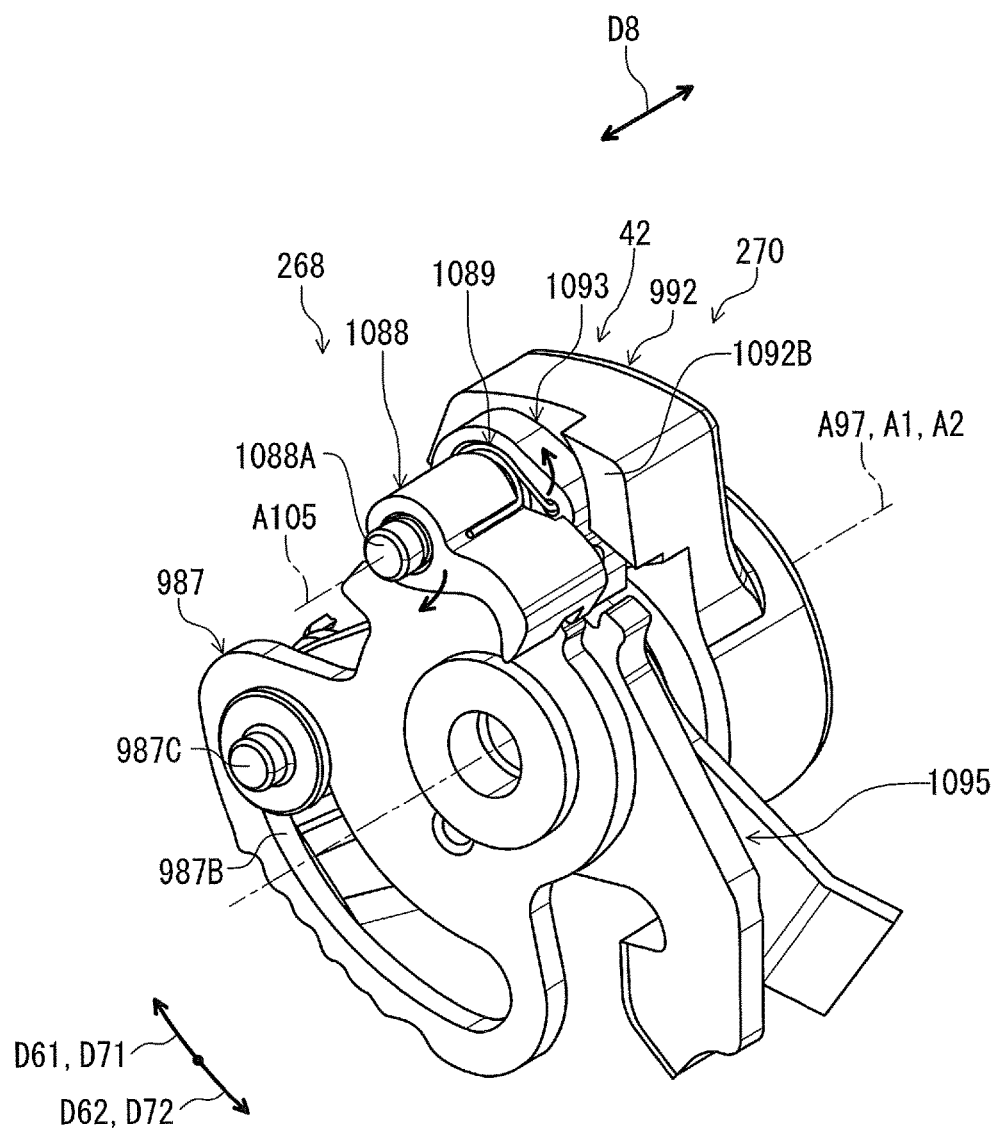
FIG. 48 is a perspective view of the cable operating structure of the bicycle operating device illustrated in FIG. 36, with the support structure, the cable control body, and a release member omitted.
Figure 51:
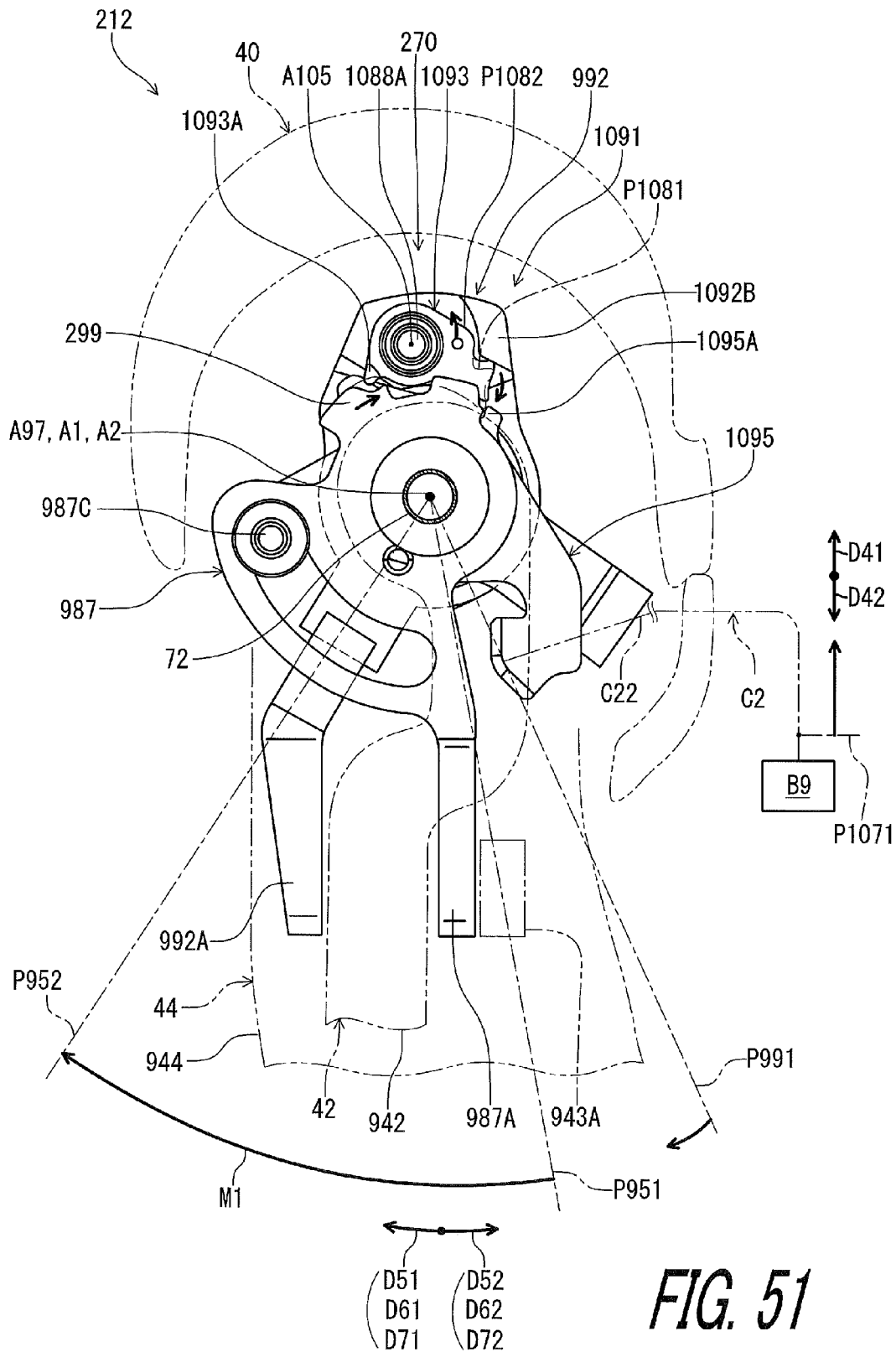
FIG. 51 is a front view of the cable operating structure of the bicycle operating device illustrated in FIG. 36, with the support structure, the cable control body, the release member, and the first actuation member omitted.

As seen in FIGS. 48 and 51, the second operating structure 270 comprises a second take-up member 1095, the second operating member 44, and a second actuating member 1093. The second take-up member 1095 is movable relative to the base member 40 to move the second mechanical control cable C2 in the second pulling direction D41 and the second releasing direction D42 opposite to the second pulling direction D41. In this embodiment, the second take-up member 1095 is coupled to the second operating member 44 to move the second mechanical control cable C2 relative to the base member 40 in the second pulling direction D41 and the second releasing direction D42 opposite to the second pulling direction D41 in response to the movement of the second operating member 44. An end of the inner wire C22 of the second mechanical control cable C2 is coupled to the second take-up member 1095.

In this embodiment, the second take-up member 1095 is rotatably coupled to the base member 40 about the rotational axis A97. As seen in FIG. 37, the rotational axis A97 coincides with the first pivot axis A1 and the second pivot axis A2 in the state where the second operating member 44 is at the brake rest position P31. However, the rotational axis A97 can be offset from the first pivot axis A1 and the second pivot axis A2 in the state where the second operating member 44 is at the brake rest position P31. In this embodiment, the second take-up member 1095 has substantially the same structure as that of the first take-up member 995 of the first embodiment.

As seen in FIG. 48, the second actuating member 1093 is operatively coupled with the second take-up member 1095 to actuate the second take-up member 1095 to move in at least one of the second pulling actuation direction D61 and the second releasing actuation direction D62. In this embodiment, the second actuating member 1093 is operatively coupled with the second take-up member 1095 to actuate the second take-up member 1095 to move in the second pulling actuation direction D61 and the second releasing actuation direction D62. However, the second actuating member 1093 can be operatively coupled with the second take-up member 1095 to actuate the second take-up member 1095 to move in one of the second pulling actuation direction D61 and the second releasing actuation direction D62.

As seen in FIGS. 48 to 51, the second operating structure 270 is configured such that the second take-up member 1095 is movable relative to the base member 40 between the second rest position P951 and the second operated position P952 without mechanically positioning the second mechanical control cable C2 relative to the base member 40 during the movement of the second operating member 44 between the second rest position P951 and the second operated position P952.

The second operating structure 270 moves the second mechanical control cable C2 from a second cable rest position P1071 relative to the base member 40 in response to a simultaneous movement of the first and second operating members 42 and 44. In this embodiment, the second operating structure 270 moves the second mechanical control cable C2 from the second cable rest position P1071 relative to the base member 40 in response to the simultaneous movement of the first and second operating members 42 and 44.

As seen in FIG. 51, the second actuating member 1093 is movable relative to the first operating member 42 between a second actuation position P1082 and a second non-actuation position P1081. At the second actuation position P1082, the movement of the second operating member 44 is transmitted to the second take-up member 1095 via the second actuating member 1093. At the second non-actuation position P1081, the movement of the second operating member 44 is not transmitted to the second take-up member 1095 via the second actuating member 1093. The second non-actuating position P1081 is farther from the second take-up member 1095 than the second actuation position P1082.

The second actuating member 1093 is operatively coupled with the second take-up member 1095 to actuate the second take-up member 1095 to move in at least one of the second pulling actuation direction D61 and the second releasing actuation direction D62. In this embodiment, the second actuating member 1093 is operatively coupled with the second take-up member 1095 to actuate the second take-up member 1095 to move in the second pulling actuation direction D61. However, the second actuating member 1093 can be operatively coupled with the second take-up member 1095 to actuate the second take-up member 1095 to move in the second releasing actuation direction D62 or both the second pulling actuation direction D61 and the second releasing actuation direction D62.

The first actuating member 1088 and the second actuating member 1093 are attached to the first operating member 42. The second actuating member 1093 is pivotally coupled to the first operating member 42 about the actuation pivot axis A105. In this embodiment, the second actuating member 1093 is pivotally coupled to the first input member 992 about the actuation pivot axis A105 via the pivot pin 1088A. Namely, the first actuating member 1088 and the second actuating member 1093 are pivotally coupled to the first input member 992 about the actuation pivot axis A105 via the pivot pin 1088A.

Figure 50:
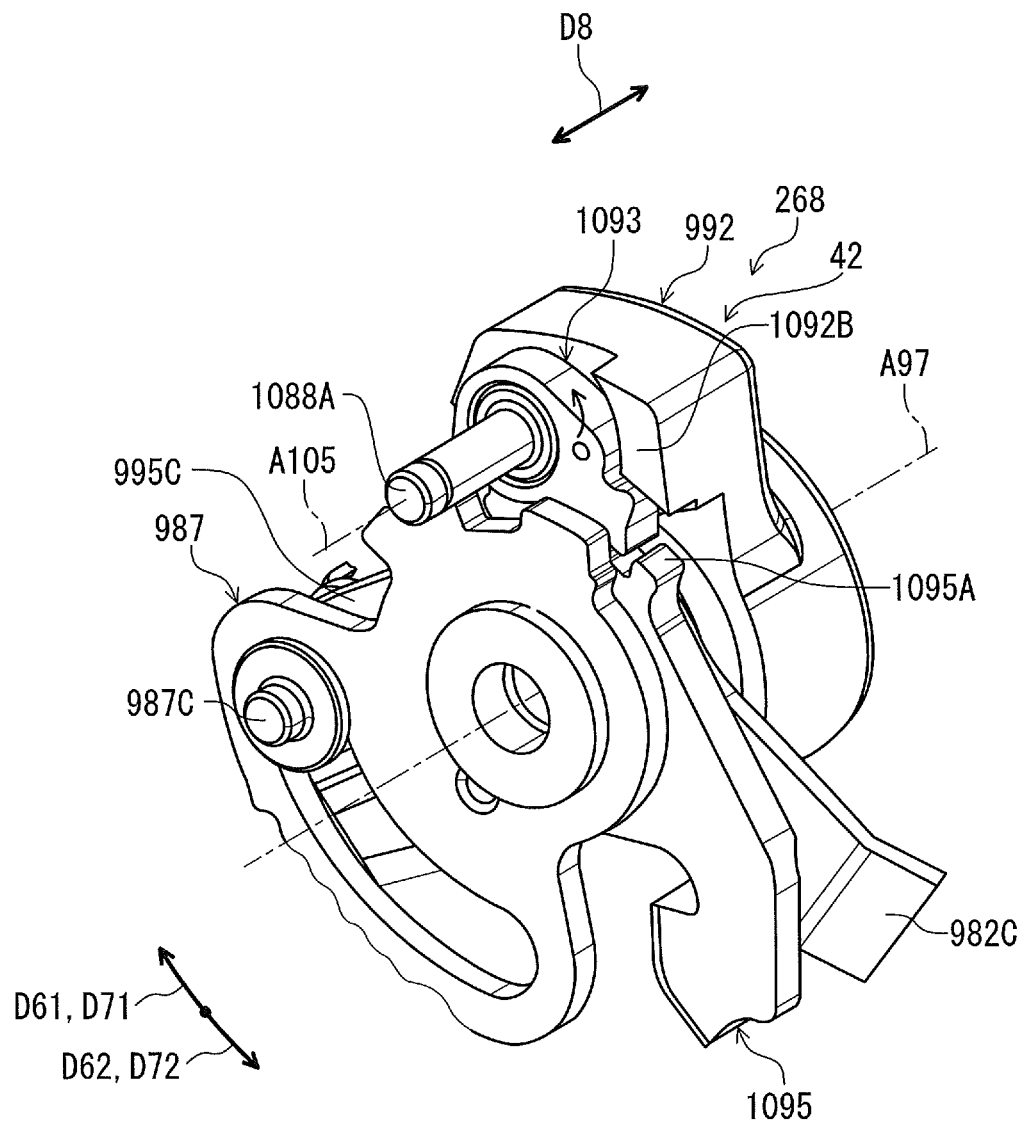
FIG. 50 is a perspective view of the cable operating structure of the bicycle operating device illustrated in FIG. 36, with the support structure, the cable control body, the release member, and a first actuation member omitted.

As seen in FIG. 50, the second actuating member 1093 includes a first actuation pawl contactable with the second take-up member 1095. The actuation biasing member 1089 is mounted to the first operating member 42 to bias the first actuation member 1088 toward the first actuation position P1061 and to bias the second actuating member 1093 toward the second non-actuation position P1081. Namely, the second operating structure 270 includes the actuation biasing member 1089 to bias the second actuating member 1093 toward the second non-actuation position P1081. The actuation biasing member 1089 is shared by the first operating structure 268 and the second operating structure 270.

Figure 49:
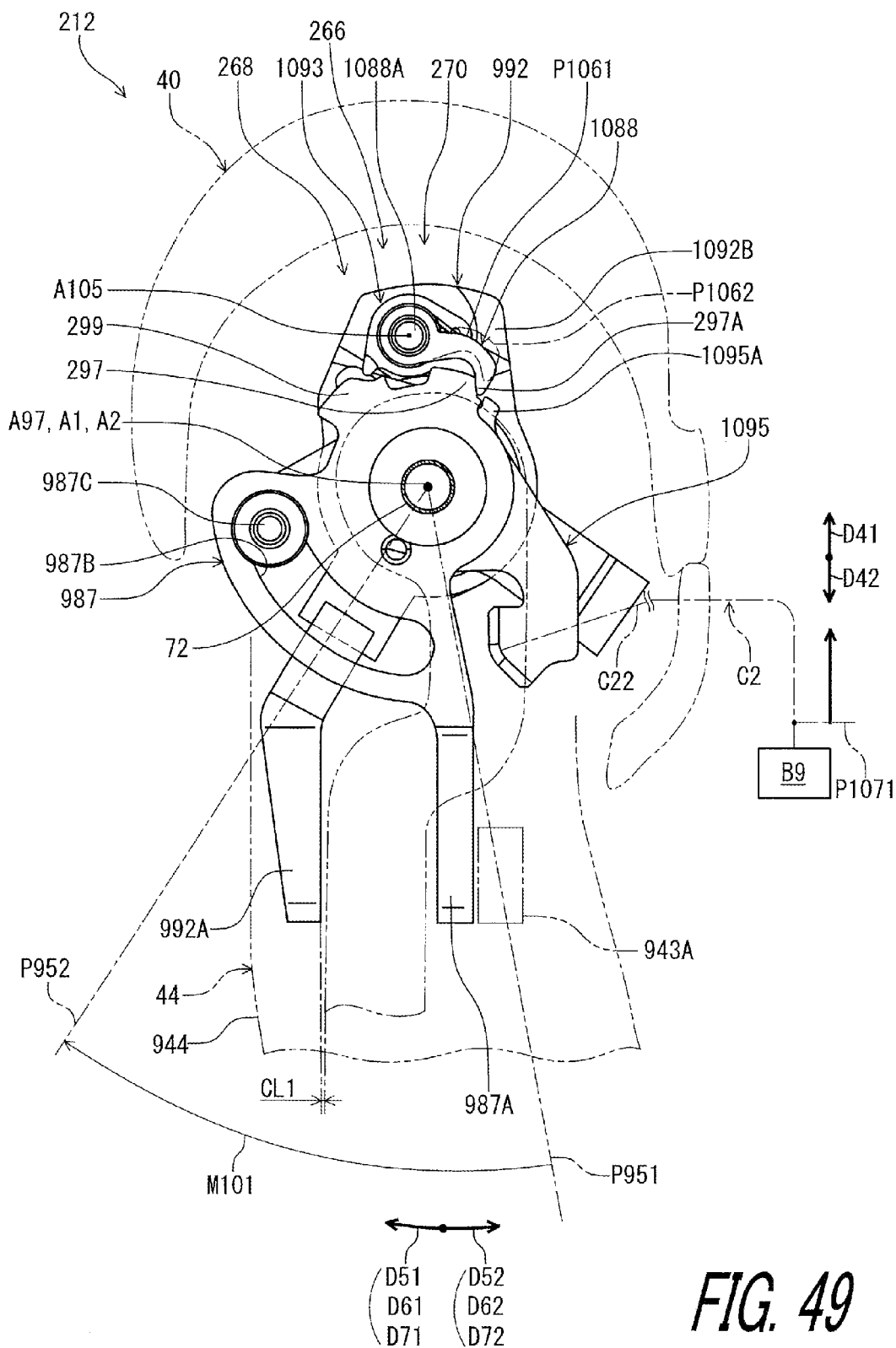
FIG. 49 is a front view of the cable operating structure of the bicycle operating device illustrated in FIG. 36, with the support structure, the cable control body, and the release member omitted.

As seen in FIGS. 48 and 49, the bicycle operating device 212 comprises a prevention member 297. The prevention member 297 is configured to move together with the second operating member 44 to prevent the first actuating member 1088 from actuating the first take-up member 1076 to move in at least one of the first pulling actuation direction D71 and the first releasing actuation direction D72 during a movement of the first operating member 42 from the first rest position P21 toward the first operated position P22. In this embodiment, the prevention member 297 is configured to move together with the second operating member 44 to prevent the first actuating member 1088 from actuating the first take-up member 1076 to move in the first pulling actuation direction D71 during the movement of the first operating member 42 from the first rest position P21 toward the first operated position P22. The prevention member 297 is in contact with the first actuating member 1088.

As seen in FIG. 49, the prevention member 297 includes a first cam 297A to move the first actuating member 1088 from the first actuation position P1061 to the first non-actuation position P1062 in response to the movement of the second operating member 44 from the second rest position P951 toward the second operated position P952. The first cam 297A is provided at the second operating member 44. In this embodiment, the first cam 297A is provided at the second input member 987 of the second operating member 44.

As seen in FIG. 40, the prevention member 297 is partly disposed between the first actuating member 1088 and the second actuating member 1093. In this embodiment, the prevention member 297 is partly provided between the first actuating member 1088 and the second actuating member 1093 in the axial direction D8.

As seen in FIG. 49, the prevention member 297 pivots the first actuating member 1088 relative to the first input member 992 about the actuation pivot axis A105 when the second input member 987 is pivoted relative to the first input member 992 about the rotational axis A97. The prevention member 297 keeps the first actuating member 1088 at the first non-actuation position P1062 when the second input member 987 is pivoted relative to the first input member 992 by the pivotal angle AG1. The first actuating member 1088 is not contactable with the actuation abutment 976A (FIG. 45) even when the first input member 992 is pivoted about the rotational axis A97 in a state where the first actuating member 1088 is positioned at the first non-actuation position P1062 by the prevention member 297.

Namely, the first take-up member 1076 is stationary relative to the base member 40 when the first operating member 42 and the second operating member 44 are pivoted together relative to the base member 40 about the first pivot axis A1. Thus, the first mechanical control cable C1 is not pulled when the first operating member 42 and the second operating member 44 are pivoted together relative to the base member 40 about the first pivot axis A1. The first mechanical control cable C1 is pulled when only the first operating member 42 is pivoted relative to the base member 40 about the first pivot axis A1.

As seen in FIGS. 50 and 51, the first input member 992 includes a stopper 1092B. The actuation biasing member 1089 biases the second actuating member 1093 to keep in contact with the stopper 1092B. In this state, the stopper 1092B positions the second actuating member 1093 at the second non-actuation position P1081 (FIG. 51).

The second take-up member 1095 includes an actuation abutment 1095A. The second actuating member 1093 is provided radially outward of the actuation abutment 1095A in a state where the second actuating member 1093 is at the second non-actuation position P1081. Thus, the second actuating member 1093 is not contactable with the actuation abutment 1095A in a state where the second actuating member 1093 is at the second non-actuation position P1081 even if the first input member 992 is pivoted relative to the base member 40 in the first direction D51. Thus, the first mechanical control cable C1 is pulled when the first operating member 42 is pivoted relative to the base member 40 about the first pivot axis A1 without a pivotal movement of the second operating member 44. The first mechanical control cable C1 is released (returned) when the first operating member 42 is returned to the first rest position P21.

Figure 52:
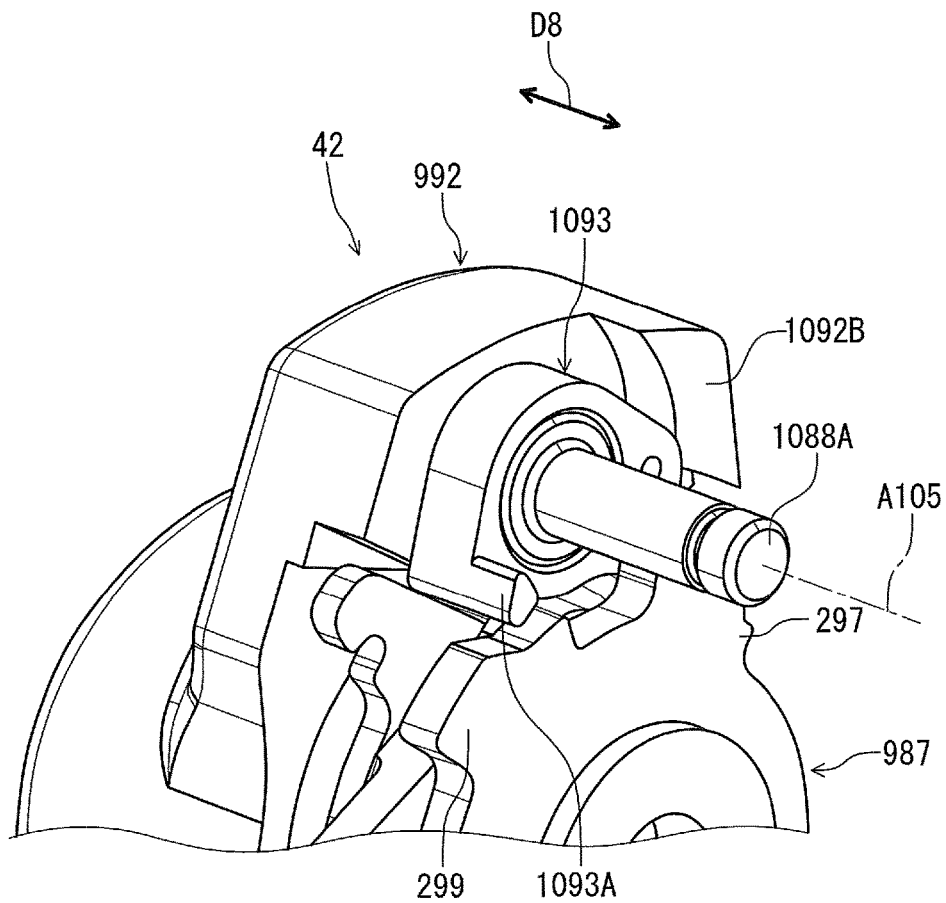
FIG. 52 is another perspective view of the cable operating structure of the bicycle operating device illustrated in FIG. 36, with the support structure, the cable control body, the release member, and the first actuation member omitted.

As seen in FIG. 52, the second operating structure 270 includes a second cam 299 to move the second actuating member 1093 to the second actuation position P1082. In this embodiment, the second cam 299 is provided at the second operating member 44. However, the second cam 299 can be provided at other members other than the second operating member 44. The second cam 299 is provided at the second operating member 44 to move the second actuating member 1093 in response to the movement of the relative movement between the first operating member 42 and the second operating member 44.

The second actuating member 1093 includes an actuated part 1093A. The second cam 299 is spaced apart from the actuated part 1093A in a state where the first and second operating members 42 and 44 are respectively positioned at the first and second rest positions P21 and P951. The second cam 299 pushes the actuated part 1093A when the second input member 987 is pivoted relative to the first input member 992 by the pivotal angle AG1. This pivots the second actuating member 1093 relative to the first input member 992 about the actuation pivot axis A105 from the second non-actuation position P1081 to the second actuation position P1082 (FIG. 51). The second actuating member 1093 is contactable with the actuation abutment 1095A in a state where the second actuating member 1093 is at the second actuation position P1082.

As seen in FIG. 49, the first cam 297A moves the first actuating member 1088 away from the first take-up member 1076 when the second input member 987 is pivoted relative to the first input member 992 by the pivotal angle AG1. This pivots the first actuating member 1088 relative to the first input member 992 about the actuation pivot axis A105 from the first actuation position P1061 to a first additional actuation position P1063. The first actuating member 1088 is provided radially outward of the actuation abutment 976A. Thus, the first actuating member 1088 is not contactable with the actuation abutment 976A when the second input member 987 is pivoted relative to the first input member 992 by the pivotal angle AG1.

As seen in FIG. 45, the first actuating member 1088 comes into contact with the second contact surface 976C because of the biasing force of the actuation biasing member 1089 when the first input member 992 is pivoted relative to the second input member 987 by a pivotal angle AG3 in the first direction D51 in a state where the first take-up member 1076 is positioned at the second control position P942. In this state, the first actuating member 1088 is positioned at the first actuation position P1061. For example, the pivotal angle AG3 is larger than the pivotal angle AG1 (FIG. 49).

As seen in FIGS. 46 and 47, the first actuating member 1088 is contactable with the release abutment 990A before the first actuating member 1088 comes into contact with the actuation abutment 976A in a state where the first actuating member 1088 is positioned at the first actuation position P1061 (FIG. 45). In this state, the first movement M1 of the second operating member 44 is transmitted to the release member 990 via the first input member 992 and the first actuating member 1088. This pivots the positioning member 980 about the positioning pivot axis A94 against a biasing force of the first biasing element 981 to move away from the first take-up member 1076.

Figure 53:
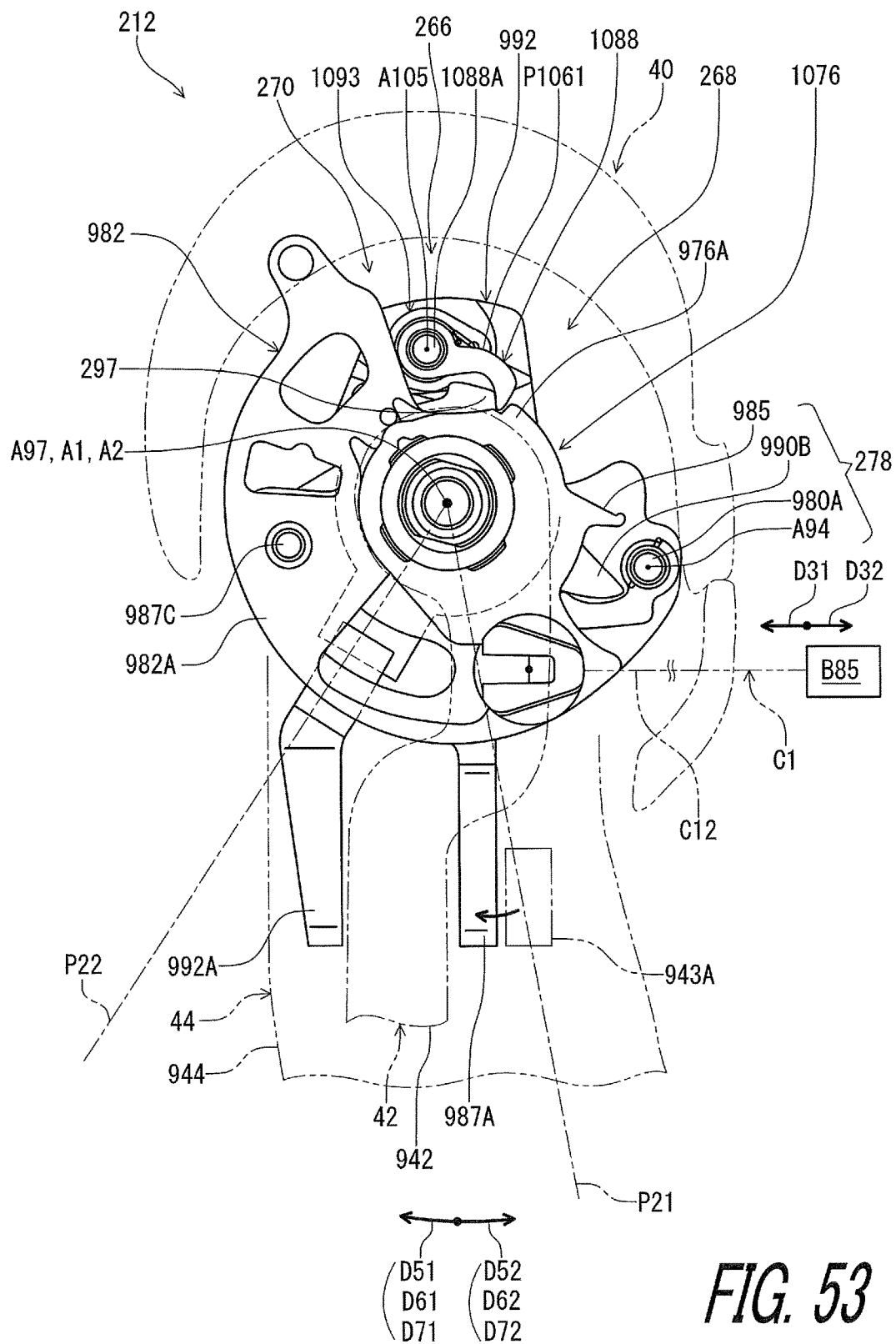
FIGS. 53 to 57 are front views of the cable operating structure of the bicycle operating device illustrated in FIG. 36 to show pulling and releasing operation of the bicycle operating device for the first mechanical control cable.

The pulling and releasing operation of the bicycle operating device 212 for the second mechanical control cable C2 will be described in detail below referring to FIGS. 53 to 58. FIG. 53 shows the bicycle operating device 212 in a non-operated state where the illustrated parts are in their rest positions. FIGS. 53 to 58 show the parts of the bicycle operating device 212 that are sequentially moved as the second operating member 44 is pivoted from the second rest position P951 to the second operated position P952 to perform the pulling operation of the second mechanical control cable C2.

Figure 54:
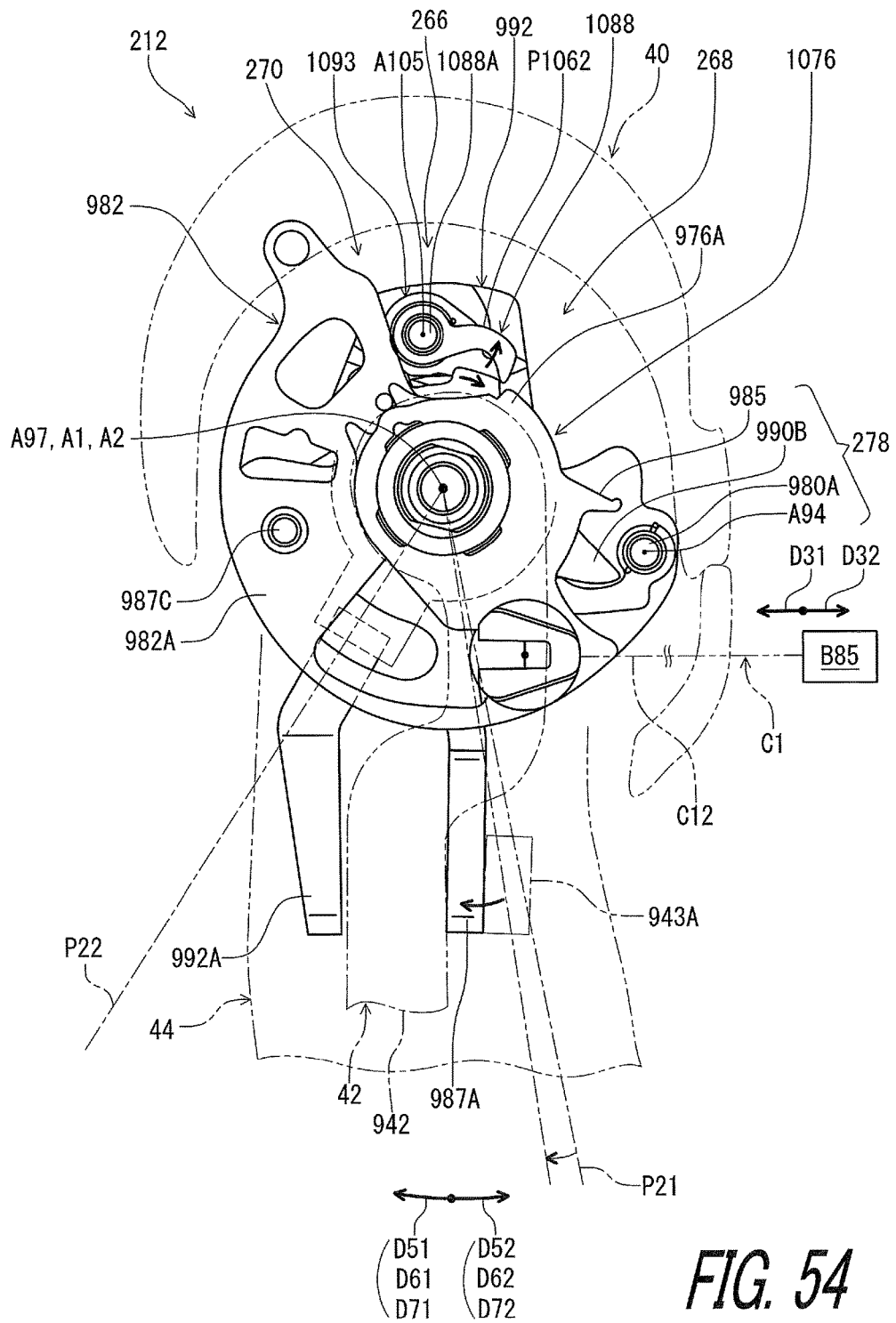

Specifically, as seen in FIGS. 53 and 54, when the second operating member 44 is pivoted by the user relative to the base member 40 about the second pivot axis A2 from the second rest position P951 toward the second operated position P952, the second transmission part 987A of the second input member 987 is pushed toward the first operating member 42 by the additional operating abutment 943A of the second operating member 44. At this time, the second input member 987 is pivoted relative to the first input member 992 about the rotational axis A97 in the first direction D51 by the pivotal angle AG1 (FIG. 49). This pivots the first actuating member 1088 from the first actuation position P1061 to the first non-actuation position P1062. This prevents the first actuating member 1088 from being engaged with the actuation abutment 976A of the first take-up member 1076 even if the first input member 992 is pivoted relative to the first take-up member 1076 in the first direction D51.

Figure 55:
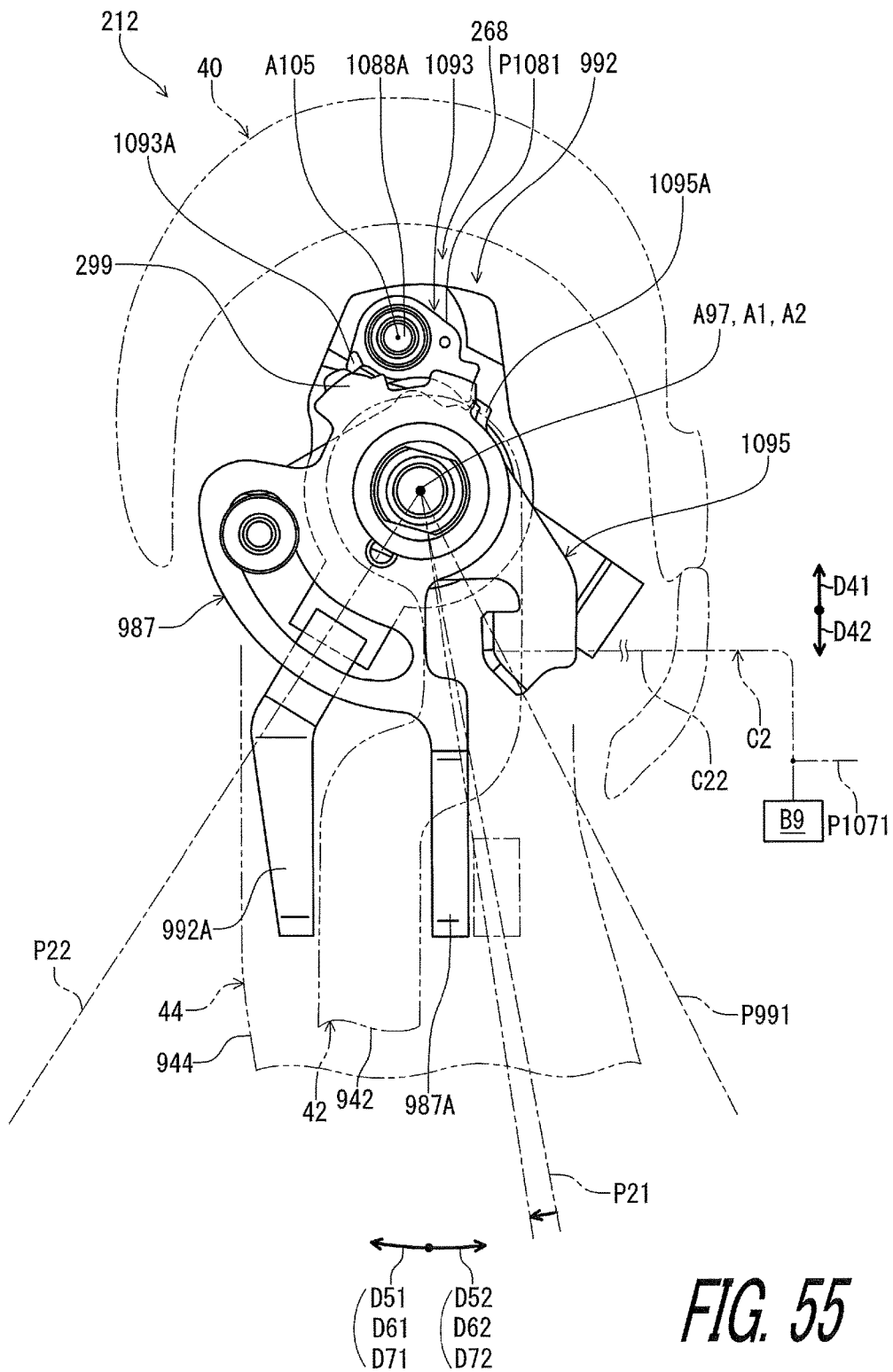

Furthermore, as seen in FIG. 55, the second cam 299 moves the actuated part 1093A to pivot the second actuating member 1093 when the second input member 987 is pivoted relative to the first input member 992 about the rotational axis A97 in the first direction D51 by the pivotal angle AG1 (FIG. 43). This allows the second actuating member 1093 to be engaged with the actuation abutment 1095A when the first input member 992 is pivoted relative to the base member 40 in the first direction D51.

Figure 56:
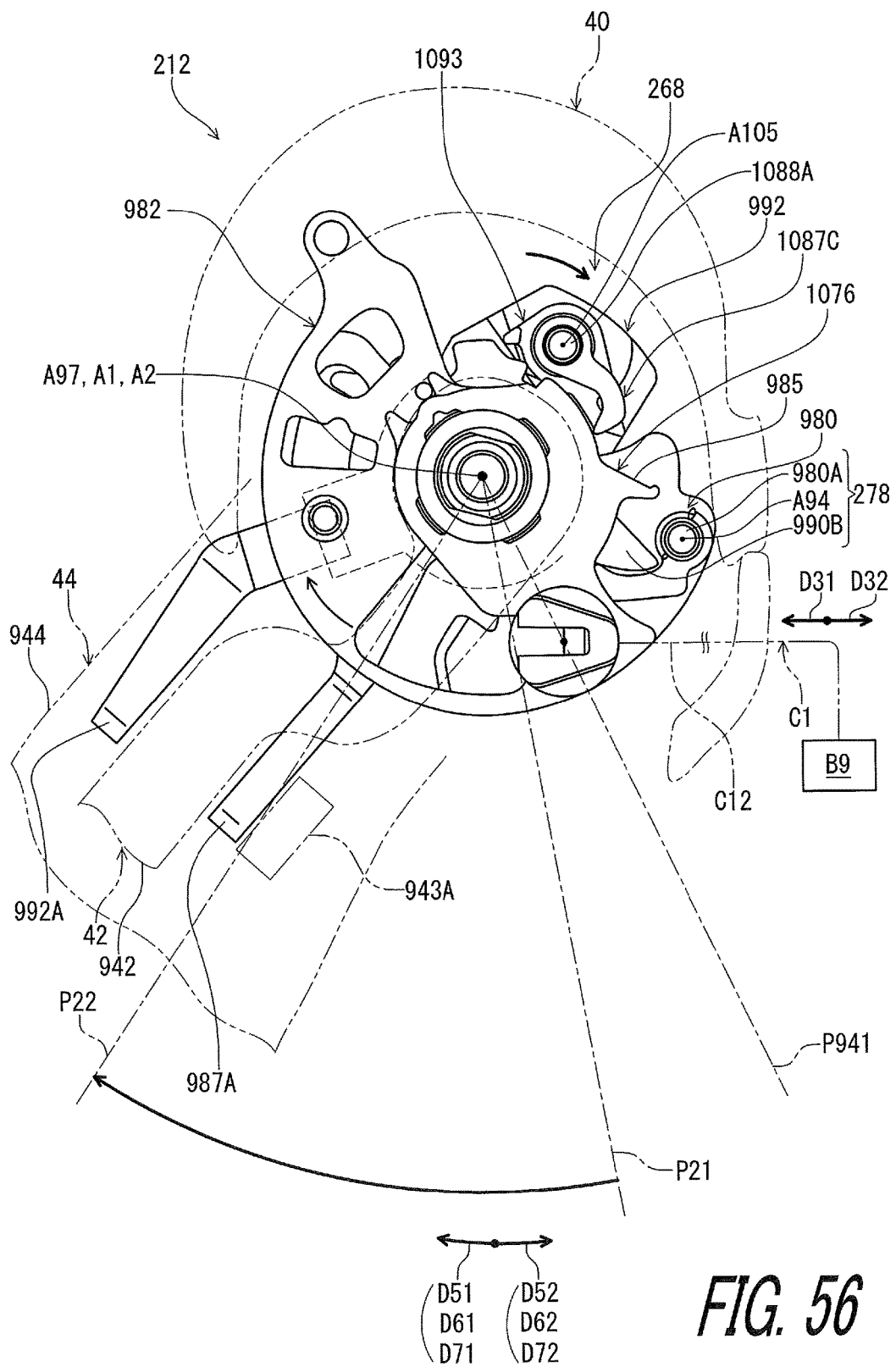
Figure 57:
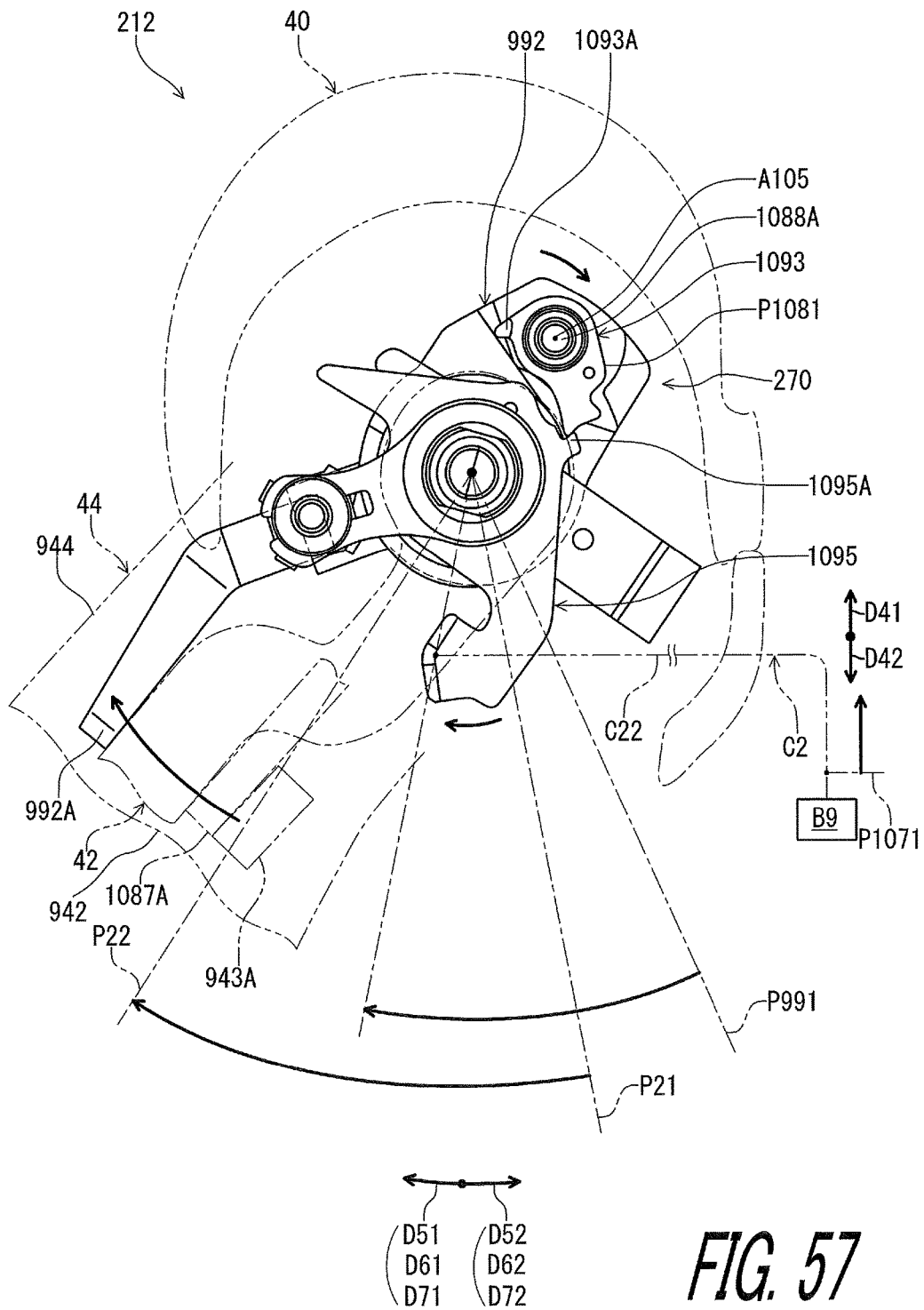

As seen in FIGS. 56 and 57, the second input member 987, the first input member 992, and the second operating member 44 are integrally pivoted relative to the base member 40 together with the first operating member 42 in the first direction D51 when the first operating member 42 is further pivoted relative to the base member 40 about the first pivot axis A1 in the first direction D51. This pivots the second take-up member 1095 relative to the base member 40 from the additional rest position P991 in the first direction D51 while the first take-up member 1076 is at the first control position P941. Thus, the inner wire C22 of the second mechanical control cable C2 is pulled when the second operating member 44 and the first operating member 42 are pivoted together relative to the base member 40 about the first pivot axis A1. When the second operating member 44 is returned to the second rest position P951 by removing or reducing an operation force applied from the user to the second operating member 44, the inner wire C22 of the second mechanical control cable C2 is released (returned) to the second cable rest position P1071.

The pulling operation of the bicycle operating device 212 for the first mechanical control cable C1 will be described in detail below referring to FIGS. 43 and 58 to 60. FIG. 43 shows the bicycle operating device 212 in a non-operated state where the illustrated parts are in their rest positions. FIGS. 58 to 63 show the parts of the bicycle operating device 212 that are sequentially moved as the first operating member 42 is pivoted from the first rest position P21 to the first operated position P22 and then back to the first rest position P21 to perform the pulling operation of the first mechanical control cable C1.

Figure 58:
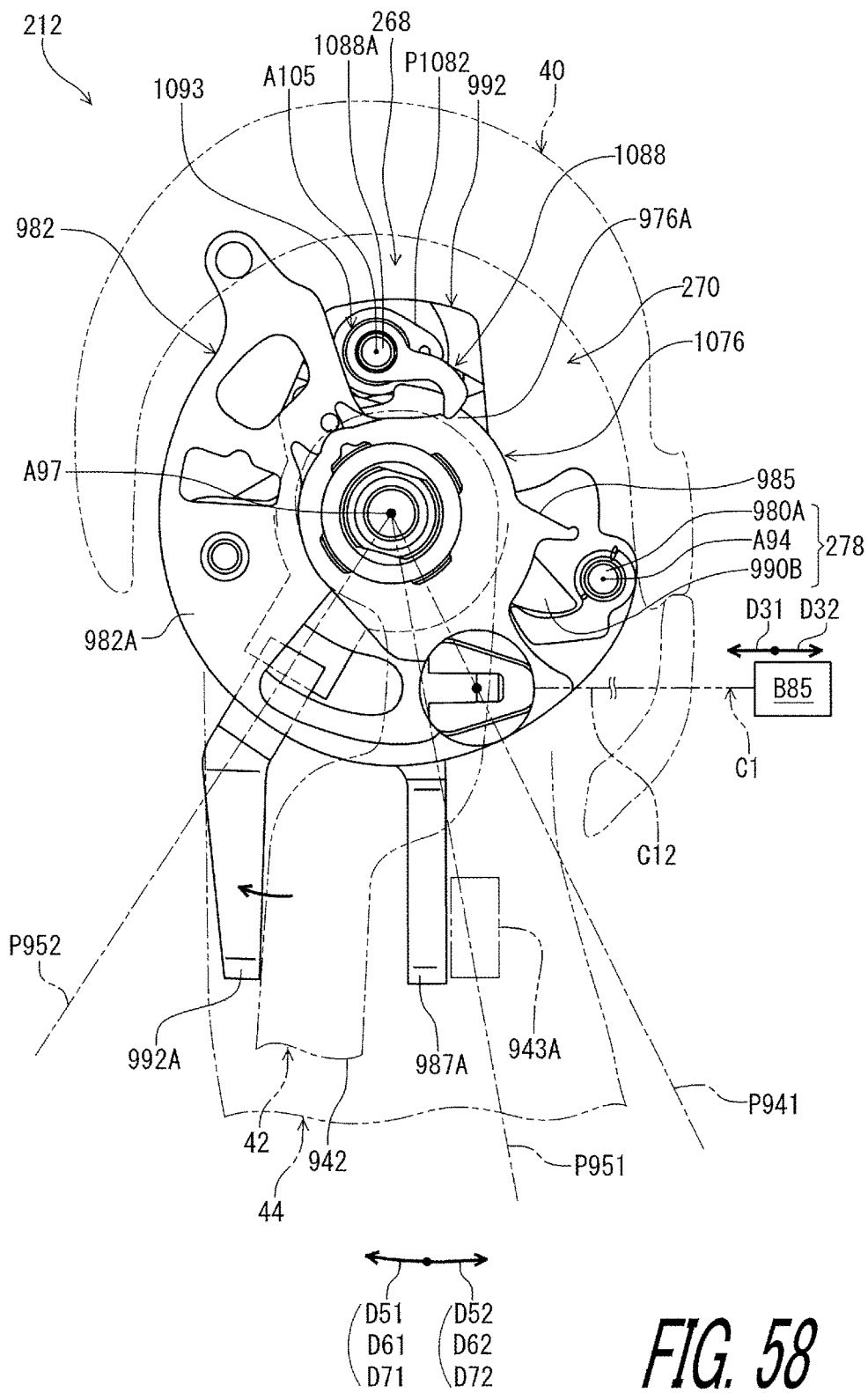
FIGS. 58 to 59 are front views of the cable operating structure of the bicycle operating device illustrated in FIG. 36 to show pulling operation of the bicycle operating device for the second mechanical control cable.

As seen in FIGS. 43 and 58, when the first operating body 942 is pivoted by the user relative to the base member 40 about the first pivot axis A1 from the first rest position P21 toward the first operated position P22, the first transmission part 992A of the first input member 992 is pushed by the first operating body 942. Thus, the first input member 992 is pivoted relative to the base member 40 about the rotational axis A97 in the first direction D51 while the second operating member 44 (i.e., the second operating body 944 and the second input member 987) are stationary relative to the base member 40. This brings the first actuating member 1088 into engagement with the actuation abutment 976A of the first take-up member 1076.

Figure 59:
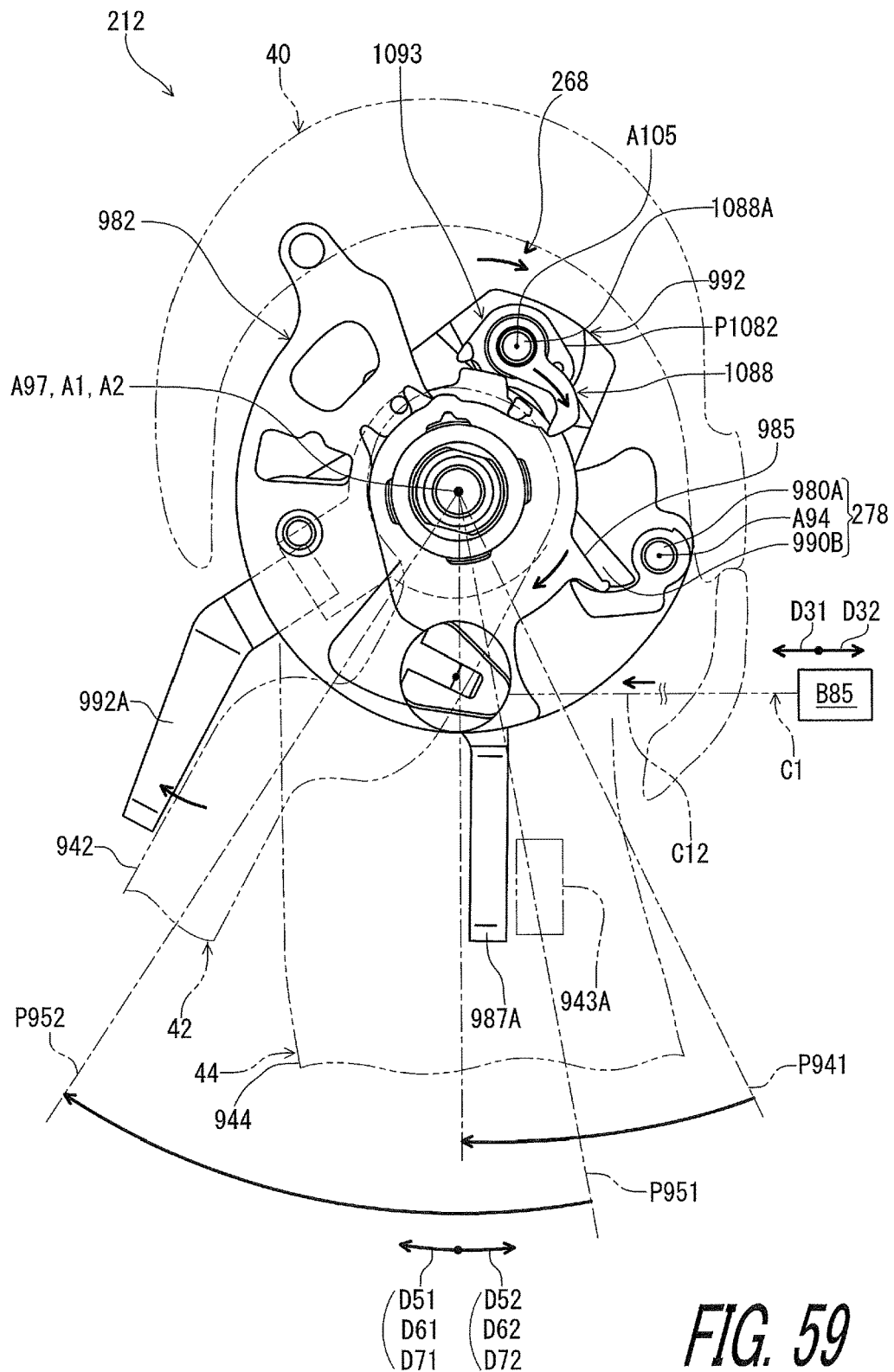
Figure 60:
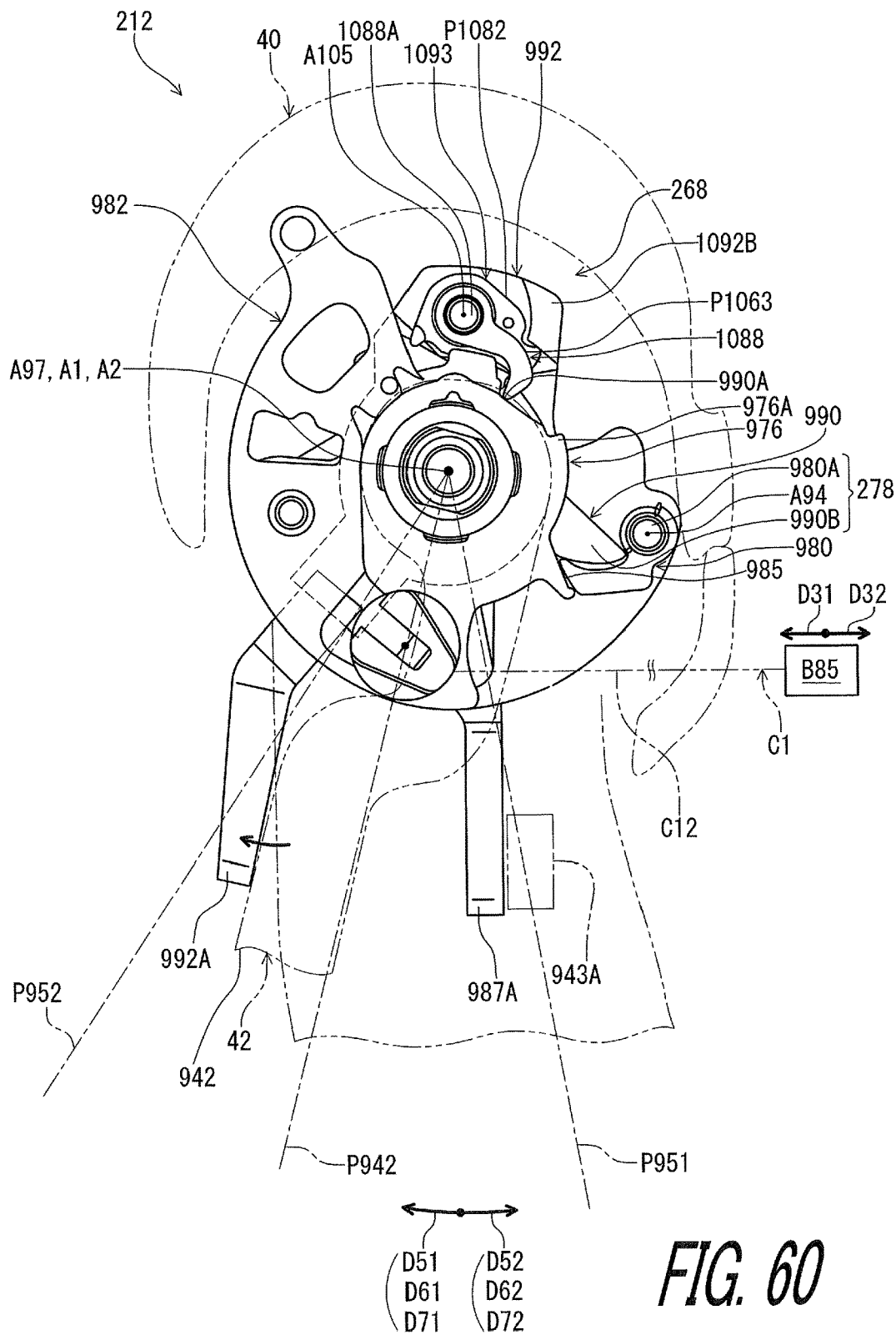
FIGS. 60 to 63 are front views of the cable operating structure of the bicycle operating device illustrated in FIG. 36 to show releasing operation of the bicycle operating device for the second mechanical control cable.

As seen in FIGS. 59 and 60, when the first operating member 42 (i.e., the first operating body 942 and the first input member 992) is further pivoted relative to the base member 40 about the rotational axis A97 in the first direction D51, the first take-up member 1076 is pivoted relative to the base member 40 about the rotational axis A97 in the first direction D51. Thus, the inner wire C12 of the first mechanical control cable C1 is pulled in response to the pivotal movement of the first operating member 42. The first take-up member 1076 is positioned at the second control position P942 relative to the base member 40 by the positioning member 980 and the second positioning abutment 985. This positions the inner wire C12 of the first mechanical control cable C1 at a cable operated position.

The releasing operation of the bicycle operating device 212 for the first mechanical control cable C1 will be described in detail below referring to FIGS. 60 to 63. As seen in FIG. 60, the first actuating member 1088 is positioned at the first actuation position P1061 by the second contact surface 976C in a state where the first take-up member 1076 is at the second control position P942. This allows the first actuating member 1088 to come into contact with the release abutment 990A of the release member 990 when the first operating member 42 and the first input member 992 are pivoted relative to the base member 40 in the first direction D51.

Figure 61:
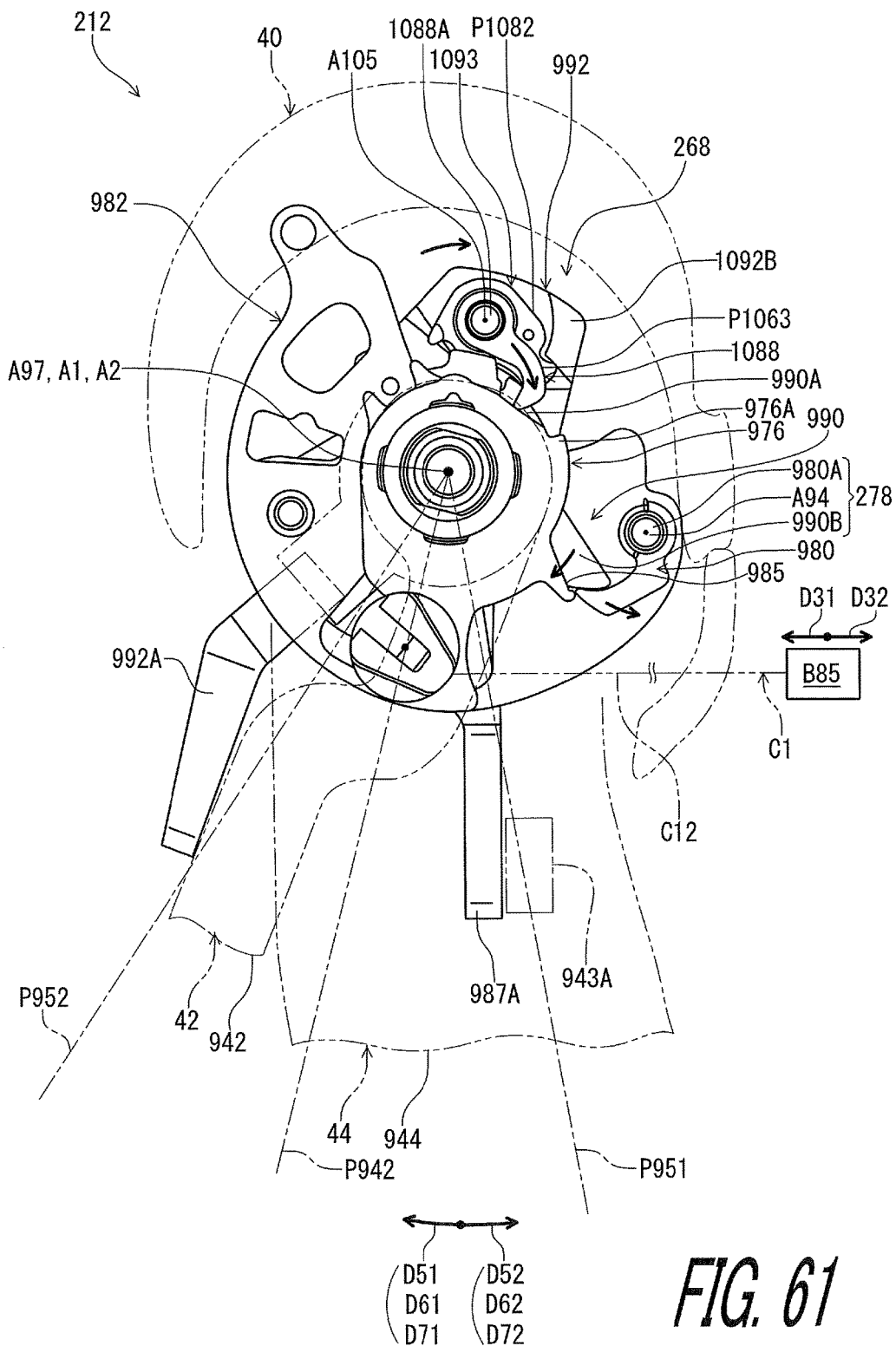

As seen in FIG. 61, the release member 990 is pivoted relative to the base member 40 in the first direction D51 when the first operating member 42 and the first input member 992 are pivoted relative to the base member 40 in the first direction D51. At this time, the first actuating member 1088 is not engaged with the actuation abutment 976A.

Figure 62:
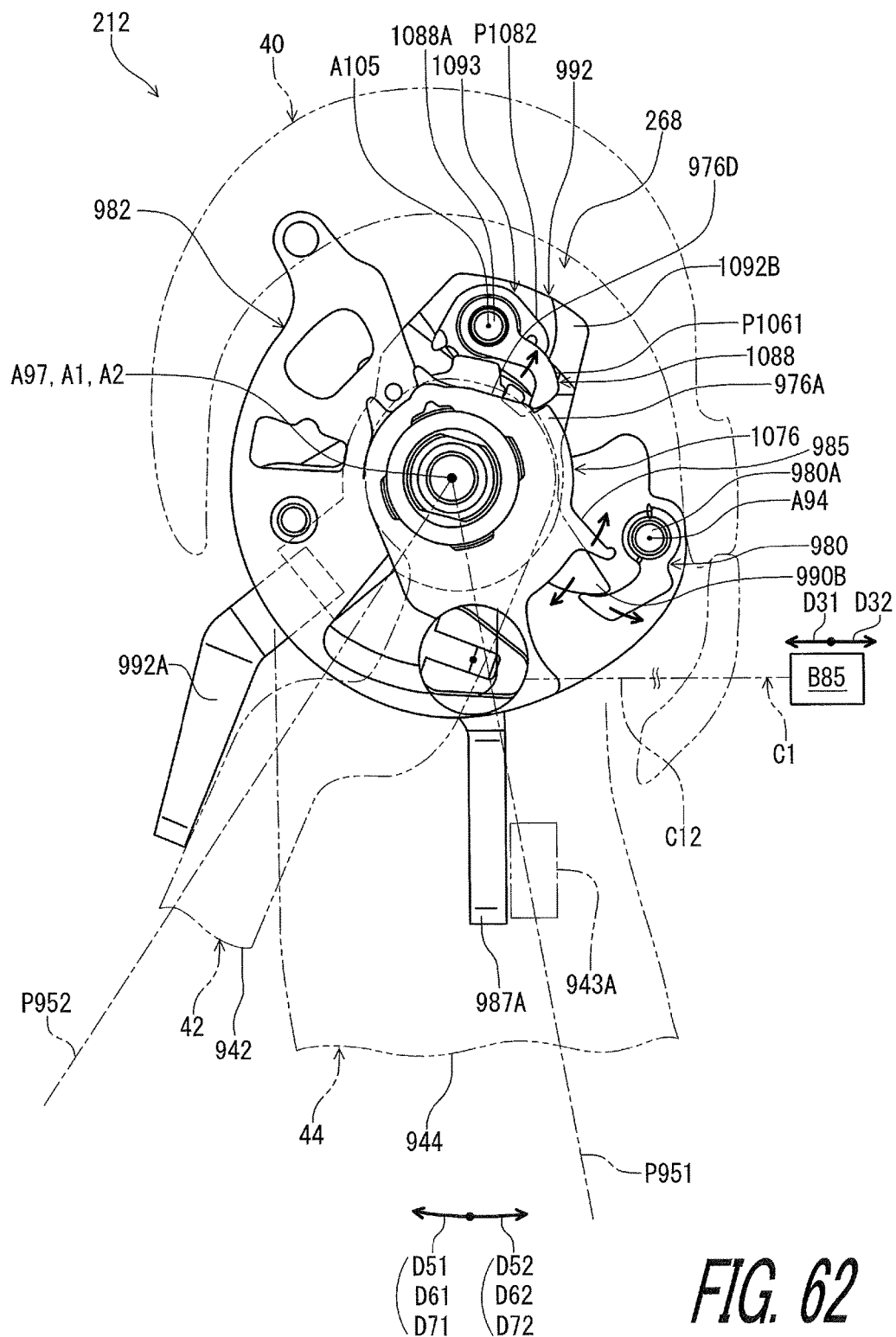

As seen in FIGS. 61 and 62, the positioning member 980 is pivoted relative to the base member 40 to move away from the second positioning abutment 985 when the first operating member 42 is further pivoted relative to the base member 40 in the first direction D51. This allows the first take-up member 1076 to pivot relative to the base member 40 in the second direction D52 by the biasing force of the control biasing element 986 (FIG. 42). Thus, a guide surface 276D of the first take-up member 1076 guides the first actuating member 1088 to the first actuation position P1061 in response to the pivotal movement of the first take-up member 1076. This brings the first actuating member 1088 into engagement with the actuation abutment 976A to stop the pivotal movement of the first take-up member 1076.

Figure 63:
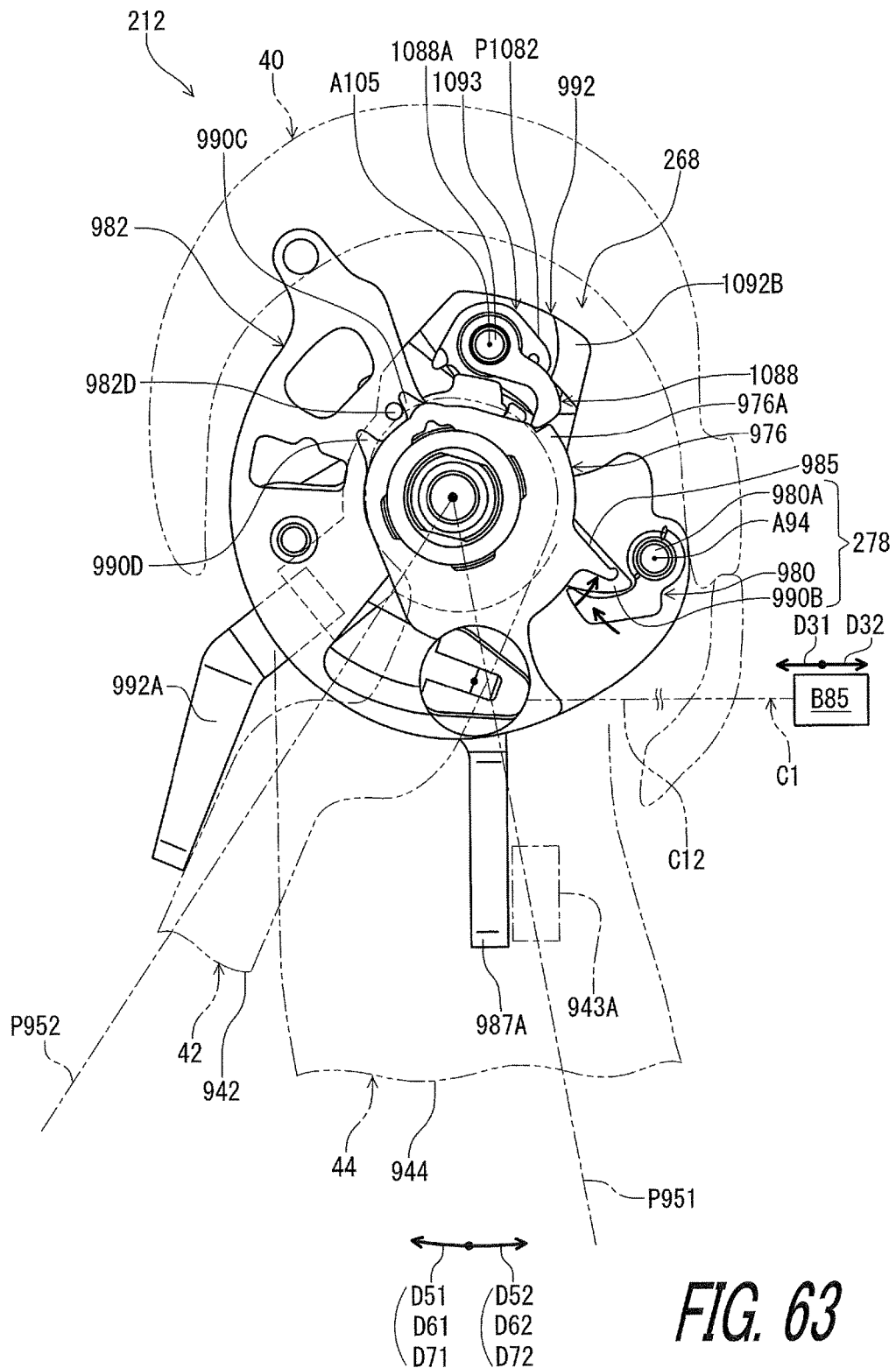

As seen in FIG. 63, the positioning member 980 is disengaged from the release abutment 990A when the first actuating member 1088 is pivoted to the first actuation position P1061. This allows the release member 990 to return to the rest position by the biasing force of the first biasing element 981 via the positioning member 980. The release member 990 is stopped by the first protrusion 990C and the stop pin 987C at the rest position.

As seen in FIGS. 53 and 63, the second input member 987, the first operating body 942, and the first input member 992 are returned to their rest positions when the second operating body 944 is returned to the second rest position P951. At this time, the first take-up member 1076 is pivoted relative to the base member 40 in the second direction D52, bringing the positioning member 980 into engagement with the first positioning abutment 984. Thus, the first take-up member 1076 is positioned at the first control position P941 relative to the base member 40, positioning the inner wire C12 of the first mechanical control cable C1 at a cable rest position.

The bicycle operating device 212 includes the following features.

(1) The prevention member 297 is configured to move together with the second operating member 44 to prevent the first actuating member 1088 from actuating the first take-up member 1076 to move in at least one of the first pulling actuation direction D71 and the first releasing actuation direction D72 during the movement of the first operating member 42 from the first rest position P21 toward the first operated position P22. When the second operating member 44 is moved relative to the base member 40, the prevention member 297 is moved together with the second operating member 44 relative to the base member 40. Thus, the prevention member 297 prevents the first actuating member 1088 from actuating the first take-up member 1076 to move in the at least one of the first pulling actuation direction D71 and the first releasing actuation direction D72 during the movement of the first operating member 42 from the first rest position P21 toward the first operated position P22. Accordingly, it is possible to separately operate the first bicycle component B85 and the second bicycle component B9 via the first mechanical control cable C1 and the second mechanical control cable C2 even when the first operating member 42 and the second operating member 44 are simultaneously moved relative to the base member 40. This improves operability of the bicycle operating device 212.

(2) The first take-up member 1076 is rotatably coupled to the base member 40 about the rotational axis A97. The second take-up member 1095 is rotatably coupled to the base member 40 about the rotational axis A97. Accordingly, it is possible to make the bicycle operating device 212 compact since the first take-up member 1076 and the second take-up member 1095 are rotatable relative to the base member 40 about the same rotational axis A97.

(3) The first operating structure 268 and the second operating structure 270 are at least partly disposed in the internal space 40A. The base member 40 protects the first operating structure 268 and the second operating structure 270.

(4) The first actuating member 1088 is movable relative to the first operating member 42 between the first actuation position P1061 at which the movement of the first operating member 42 is transmitted to the first take-up member 1076 via the first actuating member 1088, and the first non-actuation position P1062 at which the movement of the first operating member 42 is not transmitted to the first take-up member 1076 via the first actuating member 1088. The first non-actuation position P1062 is farther from the first take-up member 1076 than the first actuation position P1061. Accordingly, it is possible to transmit the movement of the first operating member 42 to the first take-up member 1076 via the first actuating member 1088 and to prevent the movement of the first operating member 42 from being transmitted to the first take-up member 1076 via the first actuating member 1088 in accordance with a position of the first actuating member 1088.

(5) The prevention member 297 includes the first cam 297A to move the first actuating member 1088 from the first actuation position P1061 to the first non-actuation position P1062 in response to the movement of the second operating member 44 from the second rest position P951 toward the second operated position P952. Accordingly, it is possible to change the position of the first actuating member 1088 by using the first cam 297A of the prevention member 297. Thus, the prevention member 297 and the first actuating member 1088 can prevent the movement of the first operating member 42 from being transmitted to the first take-up member 1076 in response to the movement of the second operating member 44.

(6) The first cam 297A is provided at the second operating member 44. Accordingly, it is possible to simplify the structure of the first operating member 42 and the prevention member 297.

(7) The second operating structure 270 includes the second actuating member 1093 operatively coupled with the second take-up member 1095 to actuate the second take-up member 1095 to move in at least one of the second pulling actuation direction D61 and the second releasing actuation direction D62. The first actuating member 1088 and the second actuating member 1093 are attached to the first operating member 42. Accordingly, it is possible to simplify the structure of at least one of the first operating member 42, the first actuating member 1088, and the second actuating member 1093.

(8) The first actuating member 1088 is pivotally coupled to the first operating member 42 about the actuation pivot axis A105. The second actuating member 1093 is pivotally coupled to the first operating member 42 about the actuation pivot axis A105. Accordingly, it is possible to simplify the structure of at least one of the first operating member 42, the first actuating member 1088, and the second actuating member 1093.

(9) The prevention member 297 is partly disposed between the first actuating member 1088 and the second actuating member 1093. Accordingly, it is possible to make the bicycle operating device 212 compact.

(10) The second actuating member 1093 is movable relative to the first operating member 42 between the second actuation position P1082 at which the movement of the second operating member 44 is transmitted to the second take-up member 1095 via the second actuating member 1093, and the second non-actuation position P1081 at which the movement of the second operating member 44 is not transmitted to the second take-up member 1095 via the second actuating member 1093. The second non-actuating position P1081 is farther from the second take-up member 1095 than the second actuation position P1082. Accordingly, it is possible to transmit the movement of the second operating member 44 to the second take-up member 1095 via the second actuating member 1093 and to prevent the movement of the second operating member 44 from being transmitted to the second take-up member 1095 via the second actuating member 1093 in accordance with a position of the second actuating member 1093.

(11) The second operating structure 270 includes the actuation biasing member 1089 to bias the second actuating member 1093 toward the second non-actuation position P1081. Accordingly, it is possible to stabilize the position of the second operating member 44 at the second non-actuation position P1081.

(12) The second operating member 44 includes the second cam 299 to move the second actuating member 1093 to the second actuation position P1082. Accordingly, it is possible to change the position of the second actuating member 1093 in response to the movement of the second operating member 44.

(13) The second cam 299 is provided at the second operating member 44. Accordingly, it is possible to simplify the structure of the second operating member 44.

(14) The first operating structure 268 includes the first positioning structure 278 to position the first take-up member 1076 at a plurality of control positions. The second operating structure 270 is configured such that the second take-up member 1095 is movable relative to the base member 40 between the second rest position P951 and the second operated position P952 without mechanically positioning the second mechanical control cable C2 relative to the base member 40 during the movement of the second operating member 44 between the second rest position P951 and the second operated position P952. Accordingly, it is possible to separately operate a first bicycle component B85 having a plurality of actuated positions and a second bicycle component B9 having only two actuated positions.

(15) The switching structure 266 configured to actuate the first bicycle component B85 in response to the movement of the first operating member 42 and to actuate the second bicycle component B9 in response to the simultaneous movement of the first and second operating members 42 and 44 resulting from an abutment between the first operating member 42 and the second operating member 44. Accordingly, it is possible to separately operate the first bicycle component B85 and the second bicycle component B9 by using the first operating member 42 and the second operating member 44.

Third Embodiment

A bicycle operating device 312 in accordance with a third embodiment will be described below referring to FIGS. 64 to 67. The bicycle operating device 312 has the same structures as those of the bicycle operating device 12 except for the base member, the first operating member, and the second operating member. Thus, elements having substantially the same function as those in the above embodiments will be numbered the same here, and will not be described and/or illustrated again in detail here for the sake of brevity.

Figure 64:
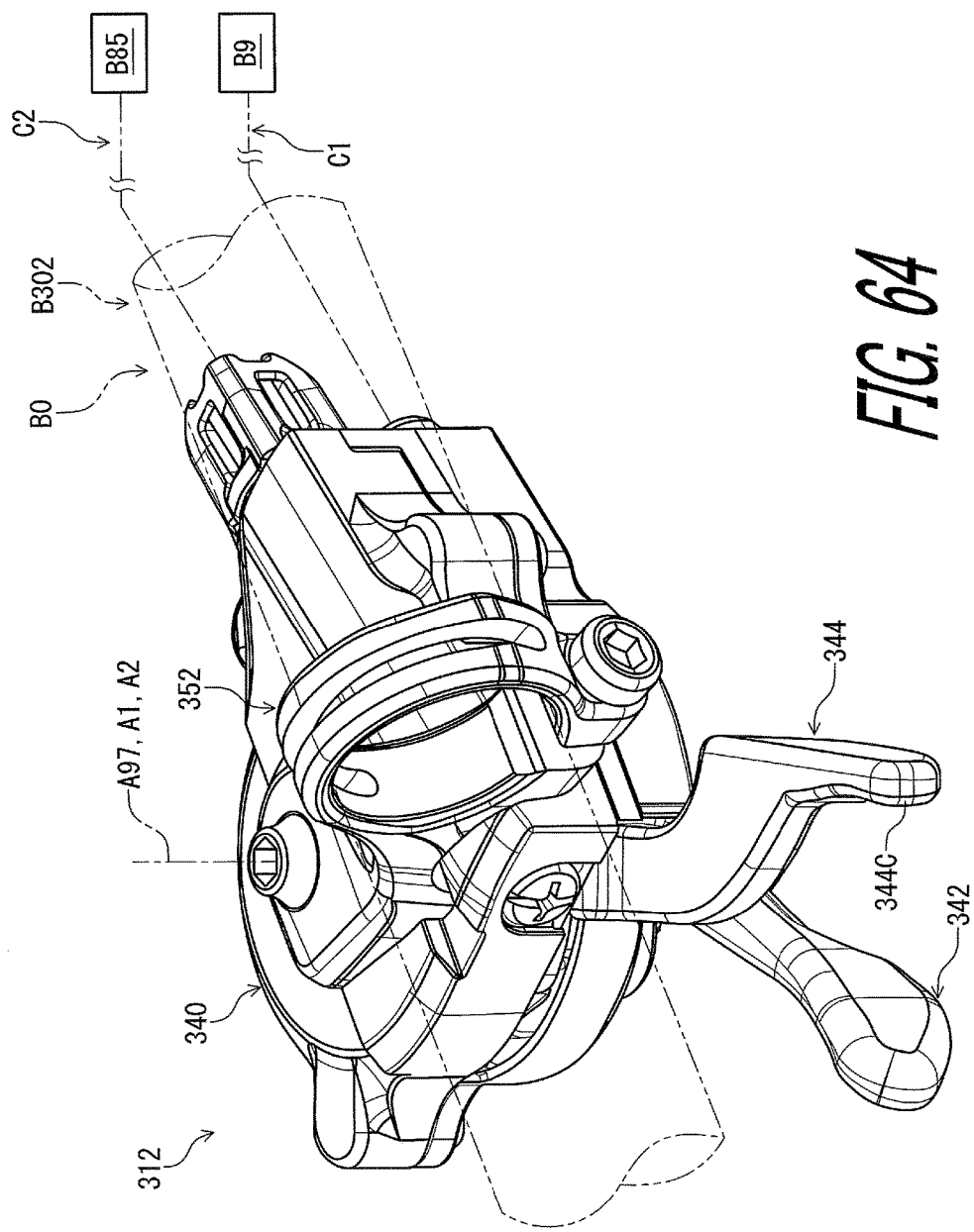
FIG. 64 is a perspective view of a bicycle operating device in accordance with a third embodiment.
Figure 65:
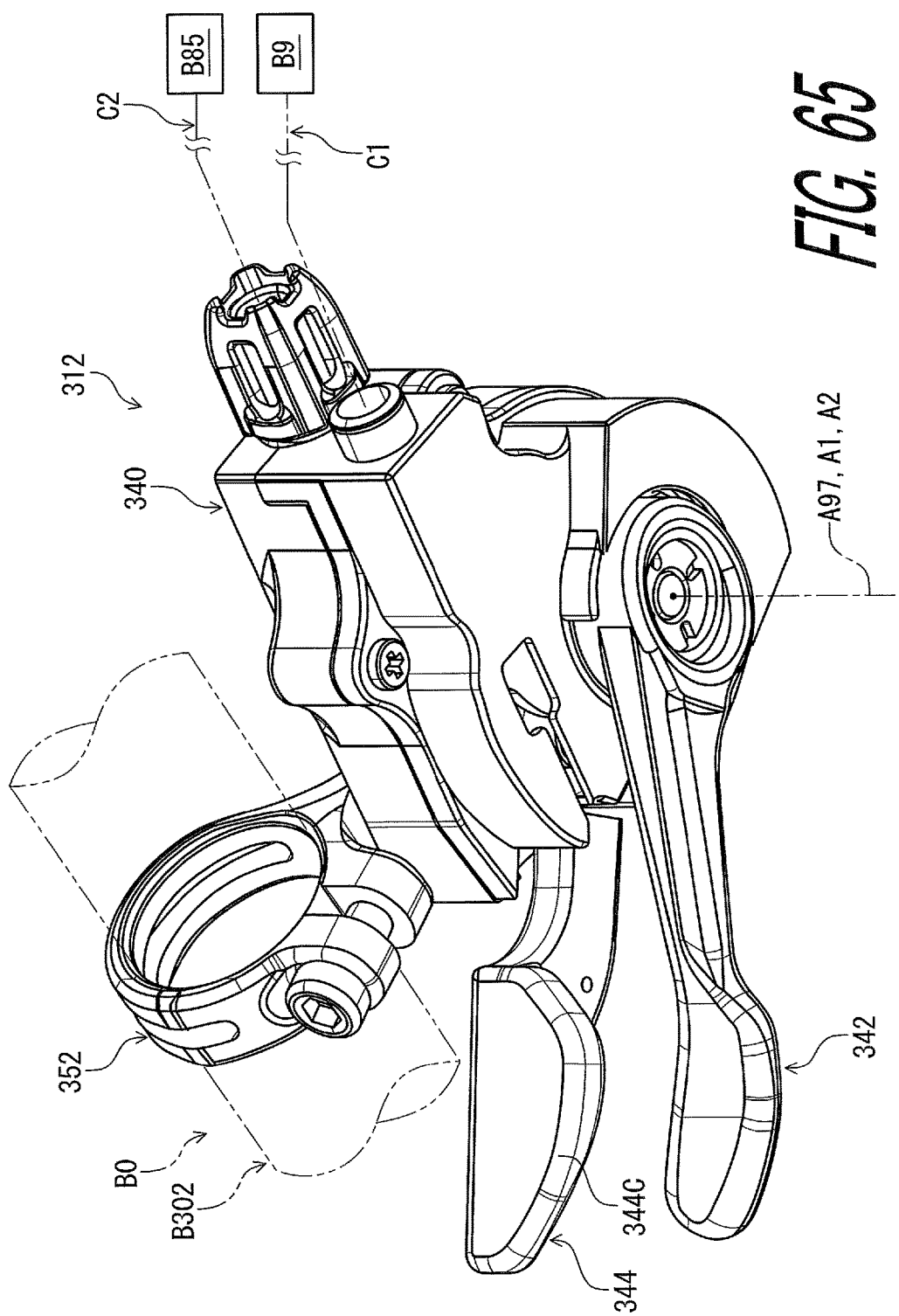
FIG. 65 is another perspective view of the bicycle operating device illustrated in FIG. 64.

As seen in FIGS. 64 and 65, the bicycle operating device 312 comprises a base member 340, a first operating member 342, and a second operating member 344. The base member 340 is configured to be mounted to the bicycle body B0. In this embodiment, the base member 340 is configured to be mounted to a handlebar B302 of the bicycle body B0. The handlebar B302 is a flat handlebar. The base member 340 includes a mounting structure 352. The base member 340 is mounted to the handlebar B302 via the mounting structure 352. The base member 340 is a stationary member when mounted to the handlebar B302. The mounting structure 352 preferably includes a band clamp or similar structure that is used in a road shifter for mounting to the flat handlebar.

The first operating member 342 movable relative to the base member 340 between the first rest position P21 and the first operated position P22 to actuate the first bicycle component B9. In the bicycle operating device 12 of the first embodiment, the first operating member 42 includes the first operating body 942 and the first input member 992 which is separately movable relative to the first operating body 942. However, the first operating member 342 is integrally movable relative to the base member 340. Specifically, the first operating member 342 is pivotally coupled to the base member 340 about the first pivot axis A1.

The second operating member 344 is movable relative to the base member 340 between the second rest position P951 and the second operated position P952 to actuate the second bicycle component B85 that is different from the first bicycle component B9. In the bicycle operating device 12 of the first embodiment, the second operating member 44 includes the second operating body 944 and the second input member 987 which is separately movable relative to the second operating body 944. However, the second operating member 344 is integrally movable relative to the base member 340. Specifically, the second operating member 344 is pivotally coupled to the base member 340 about the second pivot axis A2. In this embodiment, the function of the brake operating lever is omitted from the second operating member 344. Thus, the first pivot axis A1 and the second pivot axis A2 always coincide with the rotational axis A97.

Figure 66:
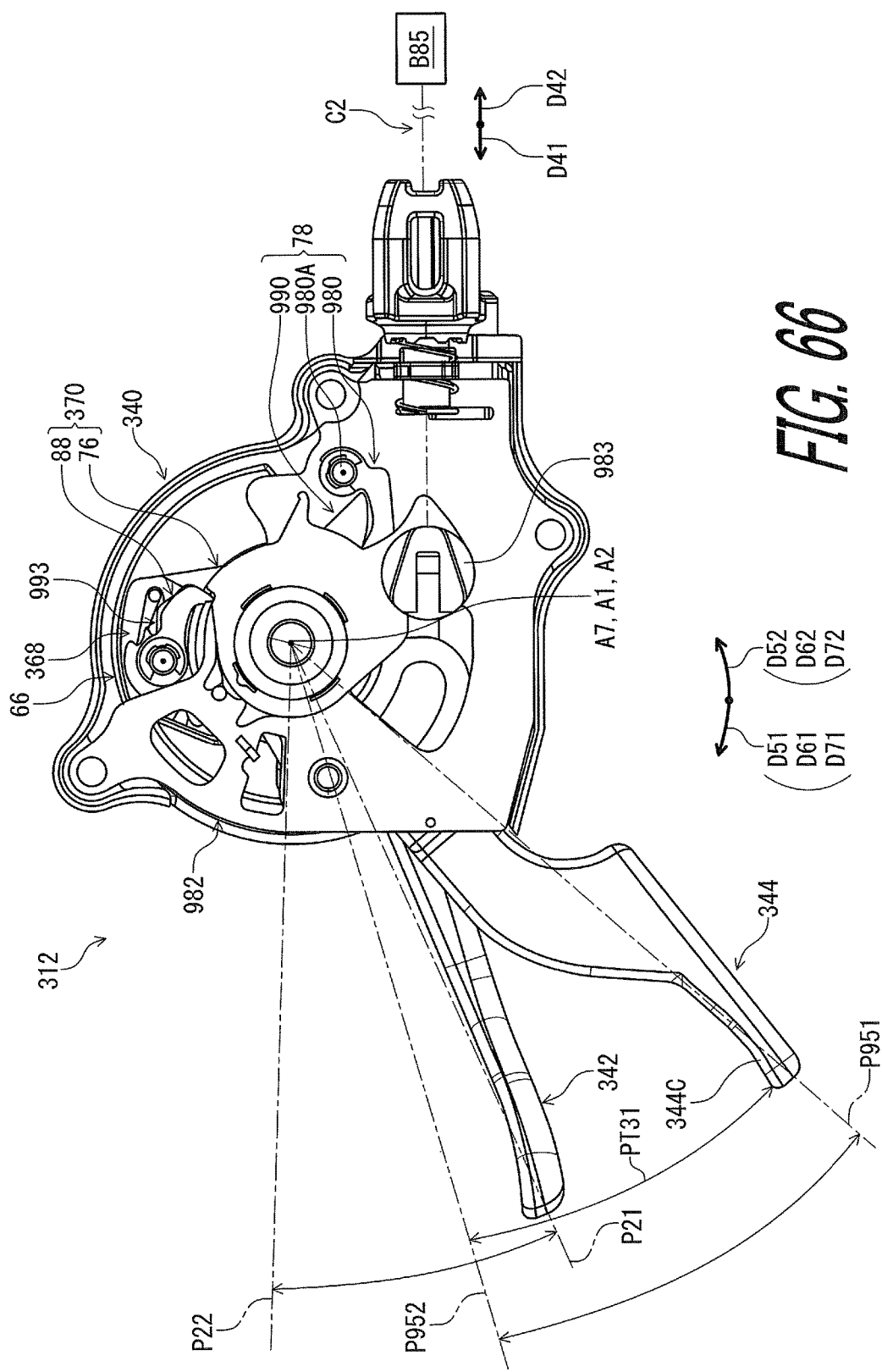
FIG. 66 is a top view of a cable operating structure of the bicycle operating device illustrated in FIG. 64.
Figure 67:
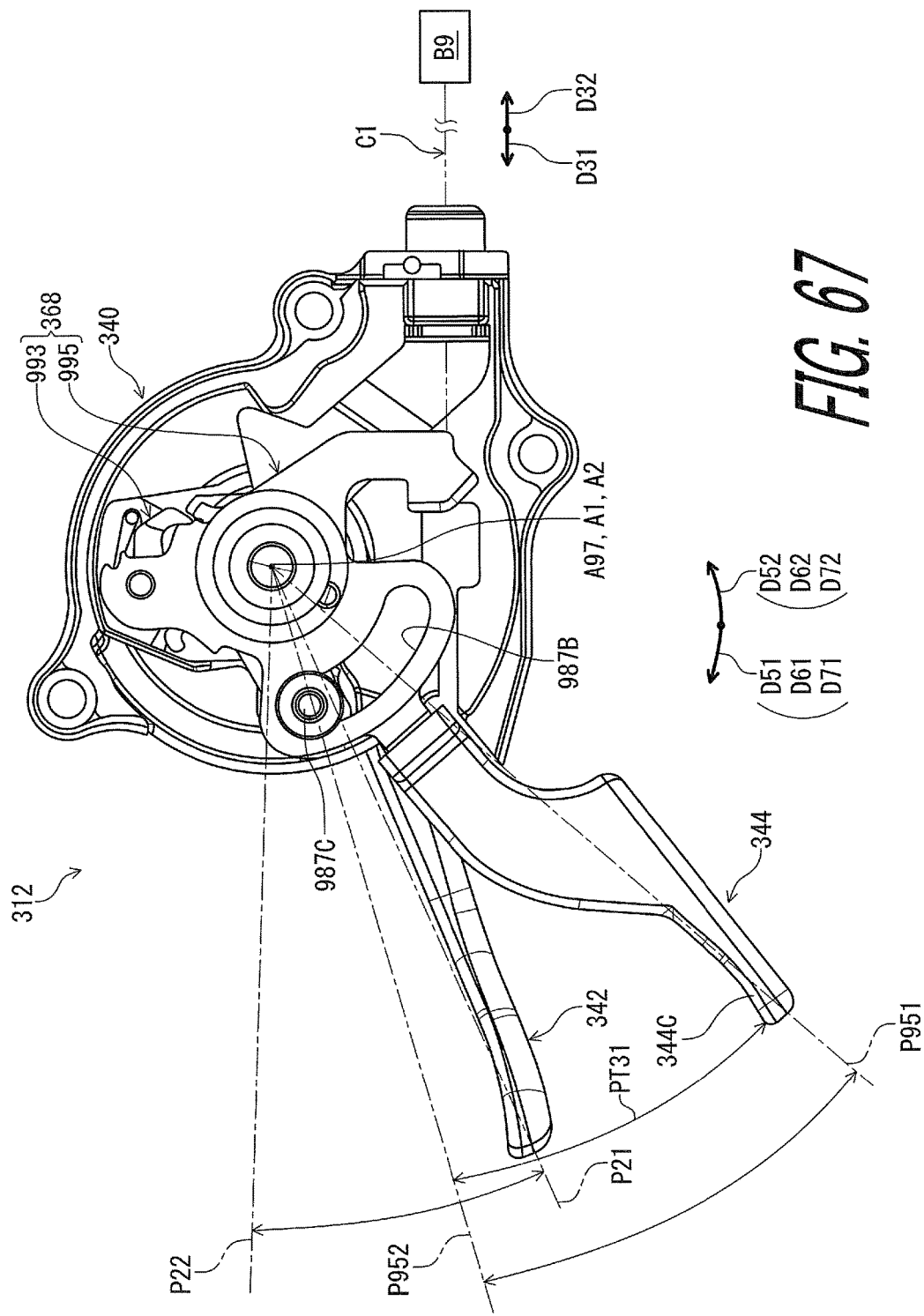
FIG. 67 is another top view of the cable operating structure of the bicycle operating device illustrated in FIG. 64.

As seen in FIGS. 66 and 67, the bicycle operating device 312 comprises the switching structure 66 configured to actuate the first bicycle component B9 in response to a movement of the first operating member 342 and to actuate the second bicycle component B85 in response to a simultaneous movement of the first and second operating members 342 and 344 resulting from an abutment between the first operating member 342 and the second operating member 344.

The bicycle operating device 312 comprises a first operating structure 368 and a second operating structure 370. The first operating structure 368 comprises the first take-up member 995, the first operating member 342, and the first actuating member 993. The first operating structure 368 has substantially the same structure as that of the first operating structure 68 of the first embodiment except for the first operating member 342. Thus, they will not be described in detail here for the sake of brevity.

The second operating structure 370 comprises the second take-up member 976, the second operating member 344, and the second actuating member 988. The second operating structure 370 has substantially the same structure as that of the second operating structure 70 of the first embodiment except for the second operating member 344. Thus, they will not be described in detail here for the sake of brevity.

The second operating member 344 includes an operating abutment 344C contactable with the first operating member 342. The operating abutment 344C has an abutment path PT31 defined from the second rest position P951 to the second operated position P952. The first operating member 342 is on the abutment path PT31 to come into contact with the operating abutment 344C during a movement of the second operating member 344 from the second rest position P951 to the second operated position P952.

The operating abutment 344C is disposed on an opposite side of the first operated position P22 of the first operating member 342 with respect to the first rest position P21 of the first operating member 342 in a state where the second operating member 344 is at the second rest position P951.

With the bicycle operating device 312, it is possible to obtain substantially the same effects as those of the bicycle operating device 12 of the first embodiment.

Furthermore, the operating abutment 344C is disposed on the opposite side of the first operated position P22 of the first operating member 342 with respect to the first rest position P21 of the first operating member 342 in a state where the second operating member 344 is at the second rest position P951. Accordingly, it is possible to move the prevention member 97 together with the second operating member 344 relative to the base member 340 before the first operating member 342 moves relative to the base member 340 in response to the movement of the second operating member 344. Thus, it is possible to certainly prevent the first actuating member 993 from actuating the first take-up member 995 to move in the at least one of the first pulling actuation direction D71 and the first releasing actuation direction D72 during the movement of the first operating member 342 from the first rest position P21 toward the first operated position P22.

Fourth Embodiment

A bicycle operating device 412 in accordance with a fourth embodiment will be described below referring to FIGS. 68 to 71. The bicycle operating device 412 has the same structures as those of the bicycle operating device 212 except for the base member, the first operating member, and the second operating member. Thus, elements having substantially the same function as those in the above embodiments will be numbered the same here, and will not be described and/or illustrated again in detail here for the sake of brevity.

Figure 68:
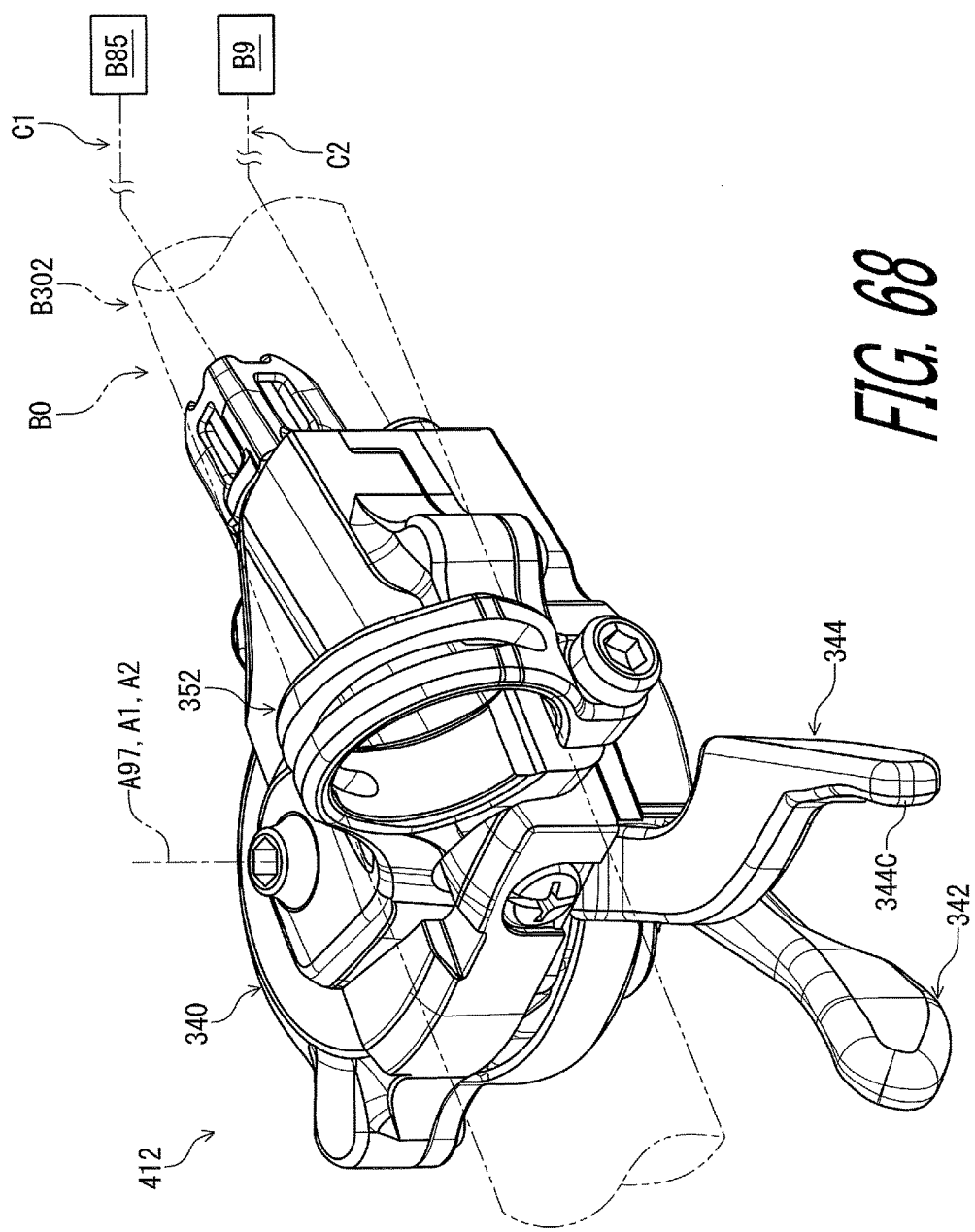
FIG. 68 is a perspective view of a bicycle operating device in accordance with a fourth embodiment.
Figure 69:
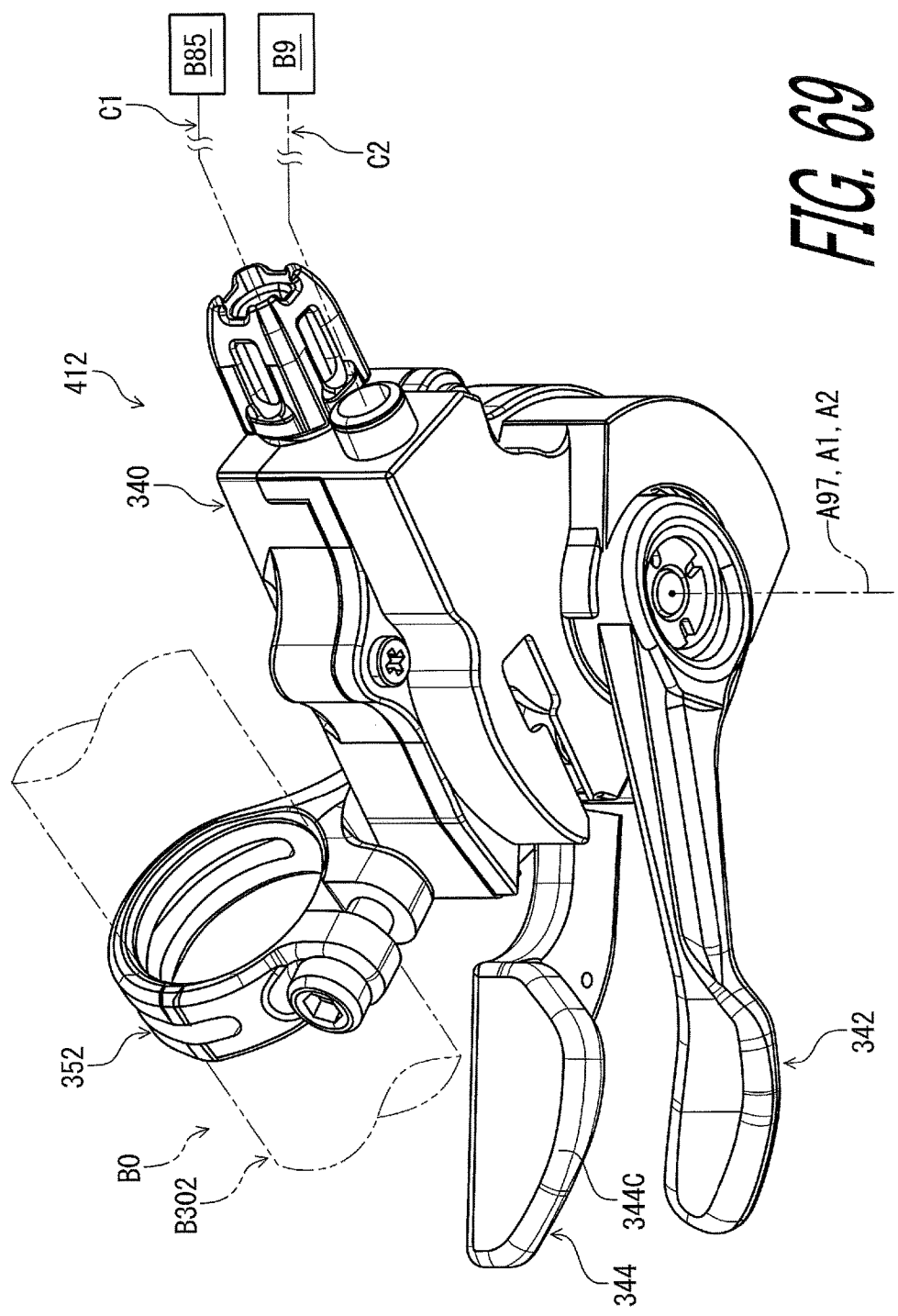
FIG. 69 is another perspective view of the bicycle operating device illustrated in FIG. 68.

As seen in FIGS. 68 and 69, the bicycle operating device 412 comprises the base member 340, the first operating member 342, and the second operating member 344. The base member 340 is configured to be mounted to the bicycle body B0.

Figure 70:
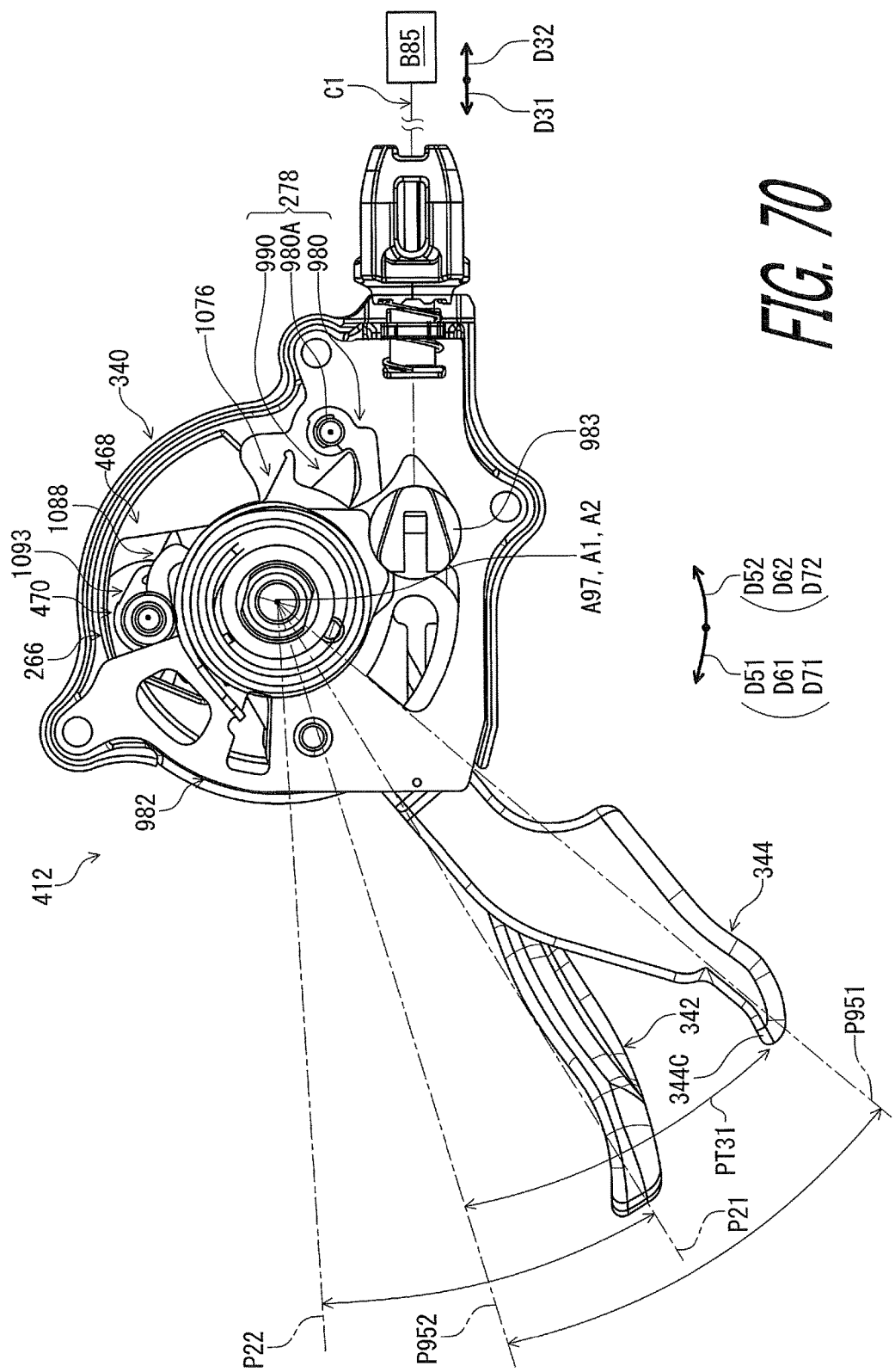
FIG. 70 is a top view of a cable operating structure of the bicycle operating device illustrated in FIG. 68.
Figure 71:
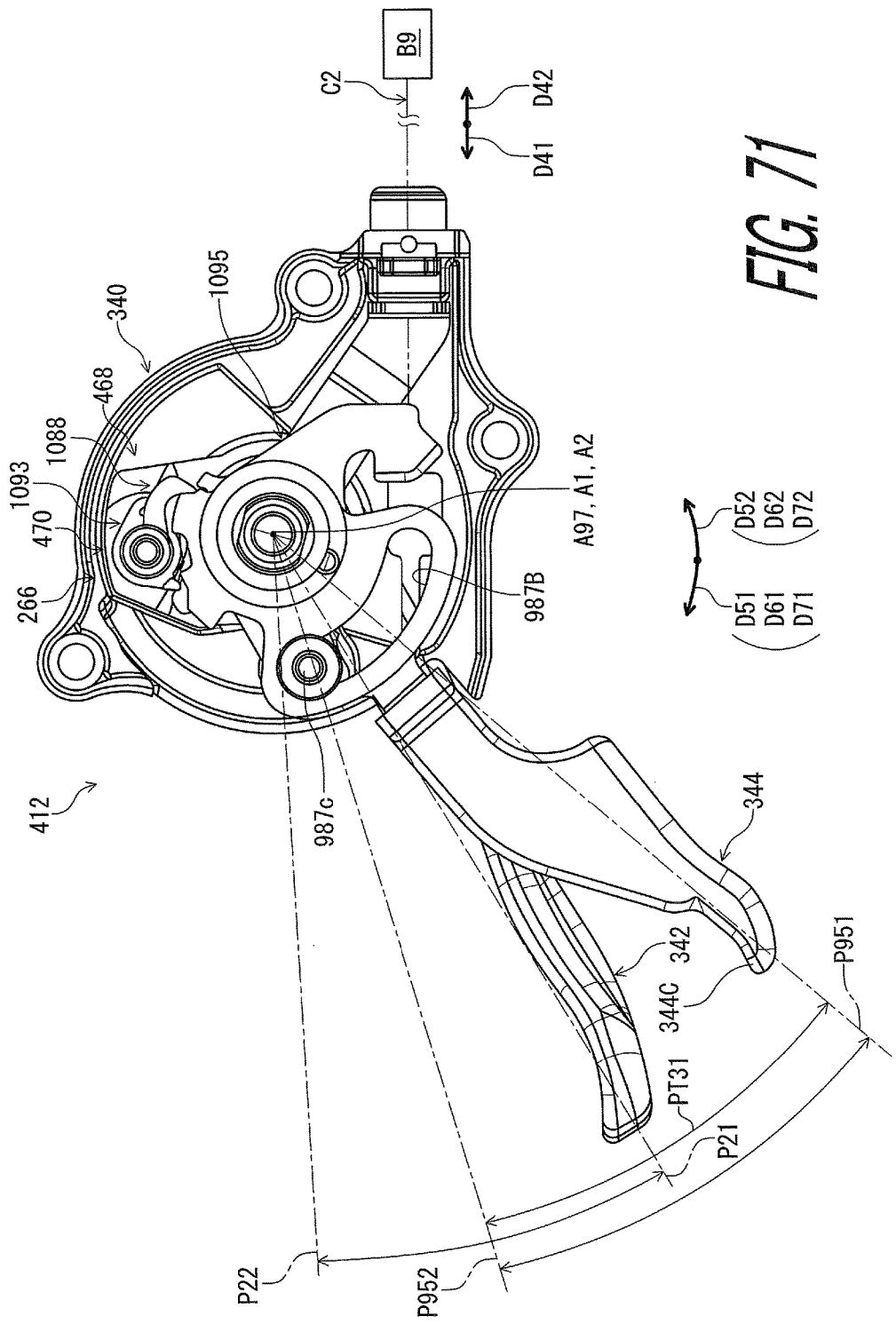
FIG. 71 is another top view of the cable operating structure of the bicycle operating device illustrated in FIG. 68.

As seen in FIGS. 70 and 71, the bicycle operating device 412 comprises a first operating structure 468 and a second operating structure 470. The first operating structure 468 comprises the first take-up member 1076, the first operating member 342, and the first actuating member 1088. The first operating structure 468 has substantially the same structure as that of the first operating structure 268 of the second embodiment except for the first operating member 342. Thus, they will not be described in detail here for the sake of brevity.

The second operating structure 470 comprises the second take-up member 1095, the second operating member 344, and the second actuating member 1093. The second operating structure 470 has substantially the same structure as that of the second operating structure 270 of the second embodiment except for the second operating member 344. Thus, they will not be described in detail here for the sake of brevity.

With the bicycle operating device 412, it is possible to obtain substantially the same effects as those of the bicycle operating device 212 of the second embodiment.

It will be apparent to those skilled in the bicycle field from the present disclosure that the constructions of the above embodiments can at least partly combined with each other if needed and/or desired. For example, the first operating structure 68 of the first embodiment can include the first positioning structure 278 to position the first take-up member 995 at a plurality of first control positions. Similarly, the second operating structure 270 of the second embodiment can include the second positioning structure 78 to position the second take-up member 976 at a plurality of second control positions.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member configured to be mounted to a bicycle body;
   a first operating structure comprising:
      a first take-up member movable relative to the base member to move a first mechanical control cable in a first pulling direction and a first releasing direction opposite to the first pulling direction;
      a first operating member movable relative to the base member between a first rest position and a first operated position; and
      a first actuating member operatively coupled with the first take-up member to actuate the first take-up member to move in at least one of a first pulling actuation direction and a first releasing actuation direction;
   a second operating structure comprising:
      a second take-up member movable relative to the base member to move a second mechanical control cable in a second pulling direction and a second releasing direction opposite to the second pulling direction; and
      a second operating member movable relative to the base member between a second rest position and a second operated position; and
   a prevention member configured to move together with the second operating member to prevent the first actuating member from actuating the first take-up member to move in at least one of the first pulling actuation direction and the first releasing actuation direction during a movement of the first operating member from the first rest position toward the first operated position.

2. The bicycle operating device according to claim 1, wherein
   the second operating member includes an operating abutment contactable with the first operating member, and
   the operating abutment has an abutment path defined from the second rest position to the second operated position.

3. The bicycle operating device according to claim 2, wherein
   the operating abutment is disposed on an opposite side of the first operated position of the first operating member with respect to the first rest position of the first operating member in a state where the second operating member is at the second rest position.

4. The bicycle operating device according to claim 1, wherein
   the second operating member includes an operating abutment contactable with the first operating member,
   the operating abutment has an abutment path defined from the second rest position to the second operated position, and
   the first operating member is on the abutment path to come into contact with the operating abutment during a movement of the second operating member from the second rest position to the second operated position.

5. The bicycle operating device according to claim 1, wherein
   the first take-up member is rotatably coupled to the base member about a rotational axis, and
   the second take-up member is rotatably coupled to the base member about the rotational axis.

6. The bicycle operating device according to claim 1, wherein
   the base member includes an internal space, and
   the first operating structure and the second operating structure are at least partly disposed in the internal space.

7. The bicycle operating device according to claim 1, wherein
   the first actuating member is movable relative to the first operating member between
      a first actuation position at which the movement of the first operating member is transmitted to the first take-up member via the first actuating member, and
      a first non-actuation position at which the movement of the first operating member is not transmitted to the first take-up member via the first actuating member, the first non-actuation position being farther from the first take-up member than the first actuation position.

8. The bicycle operating device according to claim 7, wherein
   the prevention member includes a first cam to move the first actuating member from the first actuation position to the first non-actuation position in response to a movement of the second operating member from the second rest position toward the second operated position.

9. The bicycle operating device according to claim 8, wherein
   the first cam is provided at the second operating member.

10. The bicycle operating device according to claim 1, wherein
the first actuating member is attached to the first operating member, and
the second operating structure includes a second actuating member operatively coupled with the second take-up member to actuate the second take-up member to move in at least one of a second pulling actuation direction and a second releasing actuation direction, the second actuating member being attached to the second operating member.

11. The bicycle operating device according to claim 10, wherein
the prevention member is partly provided between the first actuating member and the second actuating member.

12. The bicycle operating device according to claim 1, wherein
the first actuating member is pivotably coupled to the first operating member about a first actuation pivot axis, and
the first actuating member includes a contact part extending toward the prevention member in an axial direction parallel to the first actuation pivot axis.

13. The bicycle operating device according to claim 1, wherein
the second operating structure includes a second actuating member operatively coupled with the second take-up member to actuate the second take-up member to move in at least one of a second pulling actuation direction and a second releasing actuation direction, and
the first actuating member and the second actuating member are attached to the first operating member.

14. The bicycle operating device according to claim 13, wherein
the first actuating member is pivotally coupled to the first operating member about an actuation pivot axis, and
the second actuating member is pivotally coupled to the first operating member about the actuation pivot axis.

15. The bicycle operating device according to claim 13, wherein
the prevention member is partly disposed between the first actuating member and the second actuating member.

16. The bicycle operating device according to claim 13, wherein
the second actuating member is movable relative to the first operating member between
a second actuation position at which a movement of the second operating member is transmitted to the second take-up member via the second actuating member, and
a second non-actuation position at which the movement of the second operating member is not transmitted to the second take-up member via the second actuating member, the second non-actuating position being farther from the second take-up member than the second actuation position.

17. The bicycle operating device according to claim 16, wherein
the second operating structure includes an actuation biasing member to bias the second actuating member toward the second non-actuation position.

18. The bicycle operating device according to claim 16, wherein
the second operating structure includes a second cam to move the second actuating member to the second actuation position.

19. The bicycle operating device according to claim 1, wherein
the first operating structure includes a first positioning structure to position the first take-up member at a plurality of control positions, and
the second operating structure is configured such that the second take-up member is movable relative to the base member between the second rest position and the second operated position without mechanically positioning the second mechanical control cable relative to the base member during a movement of the second operating member between the second rest position and the second operated position.

20. The bicycle operating device according to claim 1, wherein
the second operating structure includes a second positioning structure to position the second take-up member at a plurality of control positions, and
the first operating structure is configured such that the first take-up member is movable relative to the base member between the first rest position and the first operated position without mechanically positioning the first mechanical control cable relative to the base member during a movement of the first operating member between the first rest position and the first operated position.

21. The bicycle operating device according to claim 1, wherein
the first operating structure includes a first positioning structure to position the first take-up member at a plurality of first control positions, and
the second operating structure includes a second positioning structure to position the second take-up member at a plurality of second control positions.

22. A bicycle operating device comprising:
a base member configured to be mounted to a bicycle body;
a first operating structure comprising:
a first take-up member movable relative to the base member to move a first mechanical control cable in a first pulling direction and a first releasing direction opposite to the first pulling direction;
a first operating member movable relative to the base member between a first rest position and a first operated position; and
a first actuating member operatively coupled with the first take-up member to actuate the first take-up member to move in at least one of a first pulling actuation direction and a first releasing actuation direction;
a second operating structure comprising:
a second take-up member movable relative to the base member to move a second mechanical control cable in a second pulling direction and a second releasing direction opposite to the second pulling direction; and
a second operating member movable relative to the base member between a second rest position and a second operated position; and
a prevention member configured to move together with the second operating member to prevent the first actuating member from actuating the first take-up member to move in at least one of the first pulling actuation direction and the first releasing actuation direction during a movement of the first operating member from the first rest position toward the first operated position, wherein the second operating member includes an operating abutment contactable with the first operating member, and
the operating abutment contacts the first operating member in a state where the second operating member is at the second rest position.

23. A bicycle operating device comprising:
a base member configured to be mounted to a bicycle body;
a first operating member movable relative to the base member between a first rest position and a first operated position to actuate a first bicycle component; and
a second operating member movable relative to the base member between a second rest position and a second operated position to actuate a second bicycle component that is different from the first bicycle component;
an abutment between the first operating member and the second operating member; and
a switching structure configured to actuate the first bicycle component in response to a movement of the first operating member and to actuate the second bicycle component in response to a simultaneous movement of the first and second operating members resulting from the abutment between the first operating member and the second operating member.

24. The bicycle operating device according to claim 23, wherein
the second operating member includes the abutment, the abutment being contactable with the first operating member,
the abutment has an abutment path defined from the second rest position to the second operated position, and
the first operating member is on the abutment path to come into contact with the abutment during a movement of the second operating member from the second rest position to the second operated position.

* * * * *